(12) United States Patent
Drost et al.

(10) Patent No.: US 10,619,890 B2
(45) Date of Patent: Apr. 14, 2020

(54) HIGH FLUX THERMAL RECEIVER AND METHOD OF USE

(71) Applicants: Monte Kevin Drost, Corvallis, OR (US); Sourabh Apte, Corvallis, OR (US); Thomas L'Estrange, Long Beach, CA (US); Vinod Narayanan, Davis, CA (US); Charles Rymal, Corvallis, OR (US); Eric Truong, Corvallis, OR (US); Erfan Rasouli, Davis, CA (US); Kyle Ryan Zada, Corvallis, OR (US); Brian M. Fronk, Corvallis, OR (US)

(72) Inventors: Monte Kevin Drost, Corvallis, OR (US); Sourabh Apte, Corvallis, OR (US); Thomas L'Estrange, Long Beach, CA (US); Vinod Narayanan, Davis, CA (US); Charles Rymal, Corvallis, OR (US); Eric Truong, Corvallis, OR (US); Erfan Rasouli, Davis, CA (US); Kyle Ryan Zada, Corvallis, OR (US); Brian M. Fronk, Corvallis, OR (US)

(73) Assignees: Oregon State University, Corvallis, OR (US); The Regents of the University of California, Oakland, CA (US)

(*) Notice: Subject to any disclaimer, the term of this patent is extended or adjusted under 35 U.S.C. 154(b) by 211 days.

(21) Appl. No.: 15/642,164

(22) Filed: Jul. 5, 2017

(65) Prior Publication Data

US 2018/0010824 A1 Jan. 11, 2018

Related U.S. Application Data

(60) Provisional application No. 62/359,087, filed on Jul. 6, 2016.

(51) Int. Cl.
*F24S 20/20* (2018.01)
*F24S 10/25* (2018.01)
(Continued)

(52) U.S. Cl.
CPC .............. *F24S 20/20* (2018.05); *F24S 10/25* (2018.05); *F24S 10/55* (2018.05); *F24S 10/72* (2018.05);
(Continued)

(58) Field of Classification Search
CPC .. F24S 10/55; F24S 80/30; F24S 80/20; F24S 70/30; F24S 10/25; F24S 23/70;
(Continued)

(56) References Cited

U.S. PATENT DOCUMENTS

2016/0319804 A1* 11/2016 Hyde ................. F24S 70/60

* cited by examiner

*Primary Examiner* — Alfred Basichas
(74) *Attorney, Agent, or Firm* — Klarquist Sparkman, LLP

(57) ABSTRACT

A thermal receiver, such as a solar flux thermal receiver, is disclosed comprising a modular arrangement of arrayed microchannels or micropins to heat a working fluid by heat transfer. Disclosed solar receivers provide a much higher solar flux and consequently a significant reduction in thermal losses, size, and cost, relative to known receivers. Unit cell receivers can be numbered up and combined in parallel to form modules, and modules combined to form full scale receivers.

28 Claims, 51 Drawing Sheets

(51) Int. Cl.
  *F24S 23/70*   (2018.01)
  *F24S 10/70*   (2018.01)
  *F24S 80/20*   (2018.01)
  *F24S 70/30*   (2018.01)
  *F24S 10/55*   (2018.01)
  *F24S 80/30*   (2018.01)

(52) U.S. Cl.
  CPC .............. *F24S 23/70* (2018.05); *F24S 70/30* (2018.05); *F24S 80/20* (2018.05); *F24S 80/30* (2018.05); *F28F 2260/02* (2013.01); *Y02E 10/41* (2013.01); *Y02E 10/44* (2013.01)

(58) Field of Classification Search
  CPC ........ F24S 10/72; F24S 20/20; F28F 2260/02; Y02E 10/41; Y02E 10/44
  See application file for complete search history.

1 mm 2 mm 3 mm 2 mm

HIGH FLUX THERMAL RECEIVER AND METHOD OF USE

CROSS REFERENCE TO RELATED APPLICATION

This application claims the benefit of U.S. Provisional Application No. 62/359,087, filed Jul. 6, 2016. The provisional application is incorporated herein in its entirety.

ACKNOWLEDGMENT OF GOVERNMENT SUPPORT

This invention was made with government support under Award Nos. DE-EE0005801 and DE-0007108 awarded by the United States Department of Energy. The government has certain rights in the invention.

FIELD

The present disclosure concerns thermal receivers, particularly solar thermal receivers, even more particularly microscale solar thermal receivers, that use supercritical fluids, molten salts or molten metals as working fluids, such as for use in solar thermal power cycles.

BACKGROUND

Current solar central receivers operate at solar fluxes between 300 and 1000 kW/m$^2$, or 30 to 100 W/cm$^2$. The status of advanced solar thermal central receiver technology was assessed by the U.S. Department of Energy in 2012. Two options for significantly improving the performance of solar thermal central receiver technology were identified: (1) using high temperature molten salt, which would allow using a supercritical Rankine power cycle; and (2) developing a sCO$_2$ combined cycle power plant.

The current status of molten salt technology, as represented by the Solar Two molten salt power plant, was assessed by Pacheco in 2002. This particular receiver was producing 565° C. molten salt and had a receiver efficiency of 88%, including absorptivity of 95% and an average flux of 43 W/cm$^2$. Kolb evaluated the possibilities for next generation high temperature molten salt power towers and estimated that currently available receiver technology could operate with an incident flux of about 80 W/cm$^2$. Kolb estimated that with a development effort, this could be increased to 100 W/cm$^2$ with a corresponding thermal efficiency of 94% (or 89% total receiver efficiency, which includes reflection losses based on an absorptivity of 95%). In 2011, Kolb discussed the impact of cyclic stresses and corrosion on receiver design. Kolb also reviewed options for improving the performance and cost of molten salt receivers and concluded that future advanced molten salt receivers would need to achieve operating temperatures of 650° C. and an incident flux of 100 W/cm$^2$.

While a number of papers reviewing sCO$_2$ power cycles were identified, no references are known that provide information concerning the design or evaluation of an sCO$_2$ receiver. The Sunshot program is funding the development of alternative sCO$_2$ receivers, based on published project summaries and presentations at Sunshot Annual Reviews. For example, one new design operates at 750° C. and will use a cavity and a low cost cover glass to reduce thermal losses. A second open receiver design was presented at the 2014 Sunshot Summit, although neither the predicted receiver efficiency for this design nor the incident flux on the receiver surfaces was reported.

Despite these prior and proposed designs, current receiver technology necessary to realize advanced power cycles is insufficiently developed. Accordingly, a need remains for improved receiver technology.

SUMMARY

Certain disclosed embodiments concern a microscale thermal receiver unit cell, comprising a flux absorber plate for receiving impinging thermal flux, particularly a solar flux, and a receiver plate that is positioned adjacent to the flux absorber plate. The receiver plate comprises a pin array, microchannels, or both a pin array and microchannels. Pin arrays comprise plural pins, with each pin having a diameter, a height, and defining a span between two adjacent pins. Heat transfer working fluid flows through the pin array and/or microchannels and adjacent the flux absorber plate for heat transfer from the flux absorber plate. Following heat transfer, the working fluid flows out of the receiver though a receiver outlet. The working fluid typically is selected from a molten salt, a supercritical fluid, particularly supercritical carbon dioxide, or a molten metal. The molten salt for working embodiments may be selected from metal halides and metal nitrates, such as potassium nitrate, sodium nitrate, lithium nitrate, calcium nitrate, sodium chloride, potassium chloride, zinc chloride, and combinations thereof. Certain embodiments configured for use with a molten salt working fluid utilized unit cells having a unit cell length of from about 0.01 meter to about 0.5 meter (1 centimeter to about 50 centimeters), whereas unit cells configured for use with supercritical carbon dioxide utilized unit cells having a length of from about 0.01 meter to about 0.16 meter (1 centimeter to about 16 centimeters). The unit cells may comprise one or more additional plates, such as a top cover plate. Working fluid distribution conduits and fluid distribution headers are associated with the plates to distribute working fluid to plates, between plates and/or to the microchannels or pin array. The plural plates are bonded together using any suitable method, such as by brazing, diffusion bonding, or a combination thereof, to form a unitary device.

Disclosed unit cells typically have significantly high heat flux capacities of from about 100 W/cm$^2$ to about 400 W/cm$^2$ (heat flux capacities typically are disclosed herein as W/cm$^2$, although a person of ordinary skill in the art will appreciate that other units can be used, such as W/m$^2$, such that heat flux capacities for disclosed cells are from about 1,000,000 W/m$^2$ to about 4,000,000 W/m$^2$). More particularly, unit cells configured for use with supercritical carbon dioxide have a heat flux of from about 100 W/cm$^2$ to about 130 W/cm$^2$, and when configured for use with a molten salt have a heat flux of from about 200 W/cm$^2$ to about 400 W/cm$^2$. The receiver unit cells are characterized by high thermal efficiencies, such as greater than 90%, with certain embodiments having a thermal efficiency of greater than 95%.

Materials for fabricating unit cells are selected for use under stringent construction and operating conditions. Fabrication materials include, by way of example and without limitation, stainless steel or superalloys, with particular fabrication materials being selected from Inconel 740H, 800H, 800HT, 750, 751, 718, Haynes 214, Haynes 230, Haynes 25, Haynes R41, Wasapaloy, 282, alloy 617, 316 stainless steel, and combinations thereof. The flux absorber plate also may include an optical coating material, such as Pyromark, and may include one or multiple layers of the optical coating, such as up to at least 50 optical coating layers, wherein the number of layers is selected to provide a desired optical coating thickness.

For unit cells comprising pin arrays, the pins may be fabricated to have particular structural features selected to optimize performance. For example, the pins may have: a pin diameter of from about 100 to about 1100 μm, preferably from about 200 to about 700 μm; a pin height of from about 50 μm to about 1200 μm, wherein pins configured for use with a supercritical carbon dioxide working fluid typically have a pin height of from about 50 μm to about 200 μm, and pins configured for use with a molten salt working fluid typically have a pin height of from 50 to 1200 μm; a pin span of from about 100 μm to about 1200 μm, wherein unit cells configured for use with a supercritical carbon dioxide working fluid typically have a pin span of from about 100 μm to about 400 μm, and unit cells configured for use with a molten salt working fluid typically have a pin span of from about 100 μm to about 1200 μm; and the pin diameter and span may define particular diameter-span ratios, with certain embodiments having a diameter-span ratio of about 1. The pins may have any cross-sectional shape, such as a shape selected from circular, triangular, square, rectangular, parallelogram, or combinations thereof, with working embodiments typically comprising circular cross-sections (i.e. cylindrical pins). The pins define an array having a pin density determined by the number of pins per unit area. The pin density is typically constant throughout a pin array, but may vary across the pin array, and may define a particular density gradient through the pin array.

Certain disclosed receiver unit cell embodiments further comprise a fluid distributer plate to distribute working fluid to plates or features of plates, such as microchannels or pin arrays. For example, in certain embodiments the distributer plate bifurcates fluid flow to separate fluid edges of a receiver plate. Accordingly, half of the total mass flow of the working fluid feeds to each edge of the receiver plate. The entire mass flow of working fluid flows through the pin array from the opposite edge inlets to a fluid outlet located in a central portion of the receiver plate.

Plural receiver unit cells may be assembled in parallel to form modules, such as modules having a heat flux of from about 1,000,000 W/m$^2$ to about 2,000,000 W/m$^2$. Modules configured for use with supercritical carbon dioxide may have a heat flux up to at least 1,300,000 W/m$^2$. Modules configured for use with molten salt may have a heat flux up to 2,000,000 W/m$^2$. Modules may comprise unit cell headers associated with each unit cell, such as headers associated with unit cells positioned on an edge of a module and middle unit cell headers positioned to distribute fluid flow to unit cells in a middle portion of the module. Certain disclosed modules had a unit cell length of about 8 centimeters, a width of about 1 meter and a total heat transfer area of about 1 m$^2$.

Plural modules, such as 2 to a 1,000 modules, may be assembled to form a solar receiver. The solar receiver includes associated conduits and headers for distributing heat transfer working fluid to each unit cell. Solar receivers may have a surface area tuned to a solar flux profile of a specific heliostat field.

Methods for making a receiver unit cell, a module comprising plural unit cells, or a receiver comprising plural modules, also are disclosed, as are methods for using unit cells, modules and receivers. Receiver unit cells are made by forming a flux absorber plate for receiving impinging thermal flux, a receiver plate that receives a flow of heat transfer working fluid, and any other desired plates, such as top plate or additional fluid distributer plates. A receiver plate, a flux absorber plate, and any other desired plates, are appropriately registered relative to one another for proper operation, and the plates are bonded together to form a unitary device. Fluid conduits may be bonded to the unitary device, such as by brazing, or may be integrally formed in the appropriate plate or plates. For certain embodiments, individual plates are formed having an edge boundary within which boundary no features are formed. The boundary dimensions are particularly selected to facilitate bonding during device fabrication and heat transfer during fabrication and/or operation. A method for making modules comprising assembling plural unit cells in parallel with associated fluid conduits and headers to form the module is described, as is a method for making a solar receiver comprising assembling plural modules together with associated fluid conduits and headers to form the receiver.

The foregoing and other objects, features, and advantages of the invention will become more apparent from the following detailed description, which proceeds with reference to the accompanying figures.

DETAILED DESCRIPTION

I. Definitions

Figure 1:
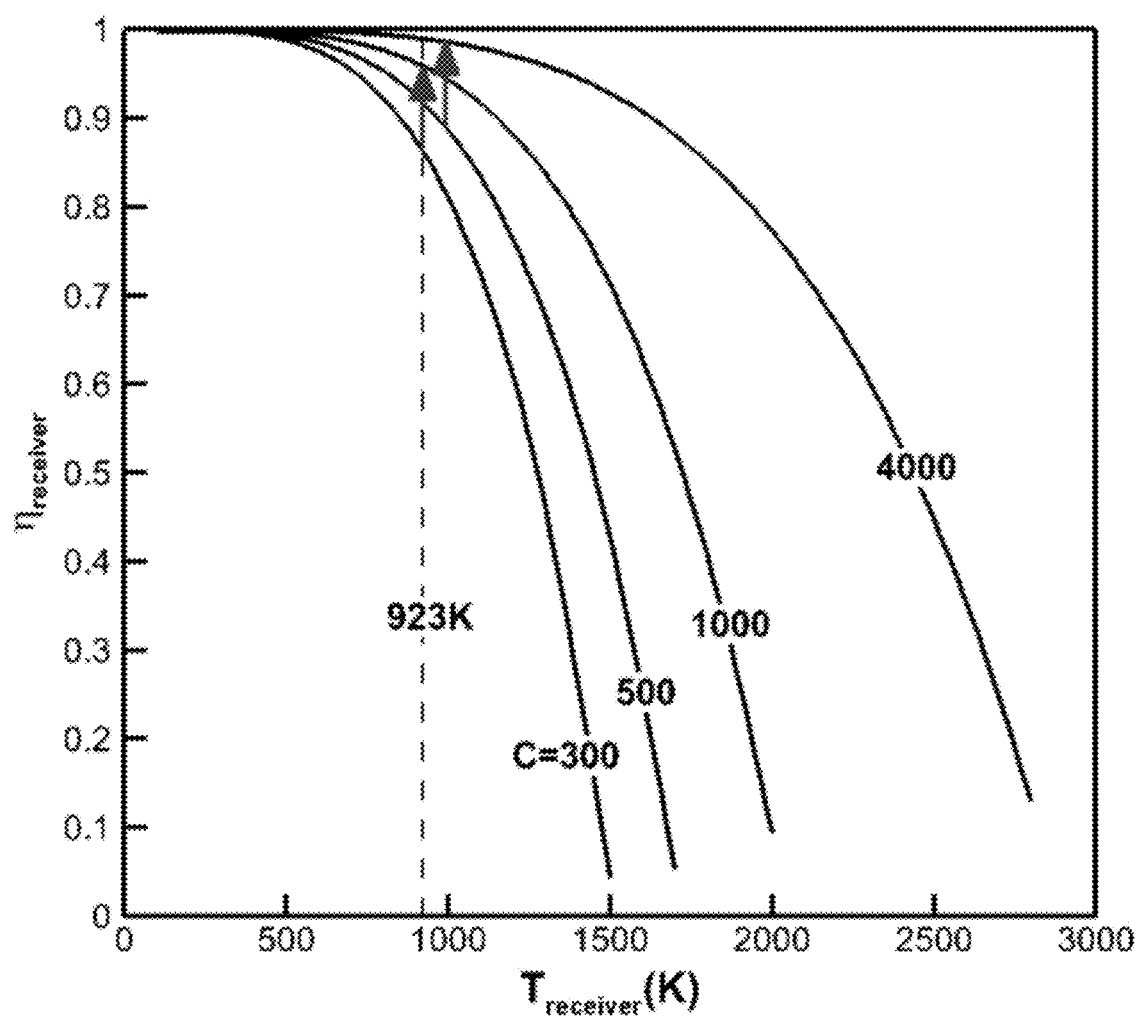
FIG. 1 is plot of temperature (K) versus receiver concentration ratios illustrating idealized receiver efficiency.

The following explanations of terms and methods are provided to better describe the present disclosure and to guide those of ordinary skill in the art in the practice of the present disclosure. The singular forms "a," "an," and "the" refer to one or more than one, unless the context clearly dictates otherwise. The term "or" refers to a single element of stated alternative elements or a combination of two or more elements, unless the context clearly indicates otherwise. As used herein, "comprises" means "includes." Thus, "comprising A or B," means "including A, B, or A and B," without excluding additional elements. All references, including patents and patent applications cited herein, are incorporated by reference.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is expressly recited.

Unless explained otherwise, all technical and scientific terms used herein have the same meaning as commonly understood to one of ordinary skill in the art to which this disclosure pertains. Although methods and materials similar or equivalent to those described herein can be used in the practice or testing of the present disclosure, suitable methods and materials are described below. The materials, methods, and examples are illustrative only and not intended to be limiting.

II. Introduction

In any diffusion-limited process, such as heat transfer, the residence time required for a fluid to come into equilibrium with the walls of a channel decreases as the square of the diffusion increases. Generally, the size of a heat transfer device is directly related to the residence time of the fluid being heated; hence, the size and cost of a device will decrease as the square of the diffusion length. This insight has led to the development of thermal receivers, particularly solar flux thermal receivers, comprising microchannels or pin arrays in a range of high flux heat transfer applications to take advantage of the extremely high heat transfer rates afforded by microchannels and pin arrays, capable of absorbing high thermal flux while using a variety of liquid and gaseous working fluids. The development of a high flux receiver has the potential to dramatically reduce the size and cost of thermal receivers, such as solar receivers, by minimizing re-radiation and convective losses, thereby increasing the receiver efficiency. One objective of disclosed embodiments was increasing incident flux by a factor of four for both a gas-like heat transfer fluid [super critical carbon dioxide ($sCO_2$)] and a liquid (molten solar salt), while not significantly increasing the surface temperature of the receiver. This reduces thermal losses by a factor of four. Disclosed receiver embodiments can be applied to a wide range of solar technologies, from dish concentrators to solar central receivers.

Figure 2:
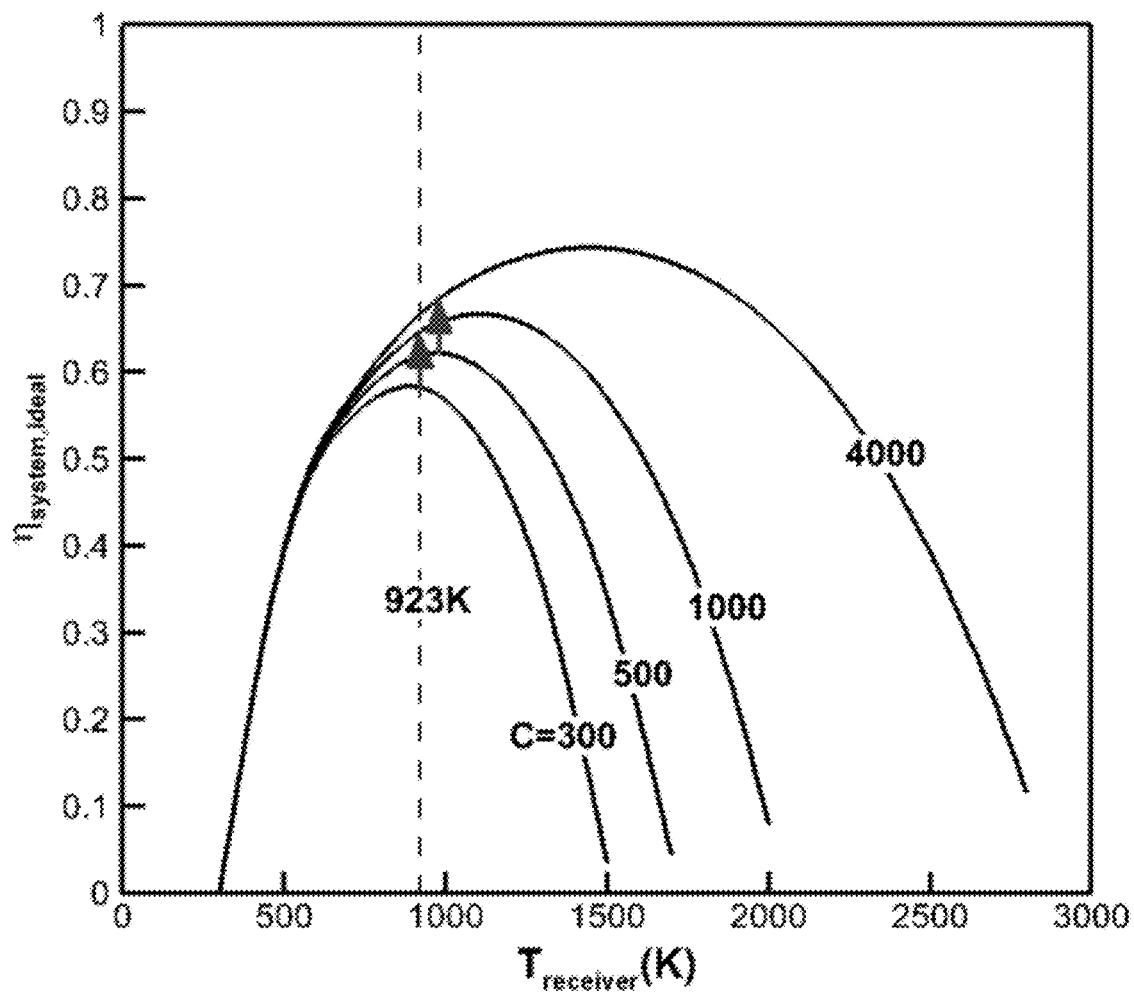
FIG. 2 is plot of temperature (K) versus receiver concentration ratios illustrating solar thermal cycle efficiency.

The ability of the microchannel solar receiver concept to reduce thermal losses is particularly important for high temperature applications. Since re-radiation losses are a function of temperature to the fourth power, relatively small increases in the surface temperature of the receiver can result in a large increase in thermal losses. See FIGS. 1 and 2, which show that higher concentration ratios (i.e., flux) increase both receiver efficiency and the optimum operating temperature of a solar thermal power plant, which in turn increases the efficiency of the power cycle. A first arrow in FIG. 1 represents the potential increase in efficiency at a receiver temperature of 650° C. (923 K) by moving from a C=300, which is on the upper end of the current gaseous receivers, to C=1000, which is achievable with disclosed receiver embodiments. A second arrow in FIGS. 1 and 2 represents the increase in efficiency in going from the current C=500 for a molten salt receiver to a C=4000, which is achievable with disclosed receiver embodiments.

Certain disclosed embodiments comprise a modular arrangement of arrayed microchannels (microchannel-based solar receivers may be referred to herein as an MSR) or pins to heat a working fluid in a concentrating solar receiver. This allows a much higher solar flux on the receiver and consequently a significant reduction in thermal losses, size, and cost. The ability to operate with a high incident flux is one factor that significantly improves receiver efficiency and allows using high temperature heat transfer fluids, which in turn improves the energy conversion efficiency of the power block. Two example designs, not intended to be limiting in any way, are disclosed. One uses typical liquid heat transfer fluids such as molten salts. The second uses gaseous heat transfer fluids, such as $sCO_2$. One disclosed molten salt embodiment absorbed an average heat flux of 400 $W/cm^2$ with the exit temperature of the solar salt limited to 550° C. A $sCO_2$ embodiment is disclosed where the test article has an average flux of 100 $W/cm^2$ with $sCO_2$ exiting at 650° C. The $sCO_2$ design can absorb 100 $W/cm^2$ of incident flux and have a receiver efficiency greater than 90% while heating $sCO_2$ to 650° C. The allowable incident flux is a factor of three or four higher than any previously reported for a gaseous heat transfer fluid. A disclosed molten salt design can absorb 400 $W/cm^2$ of incident flux and have a receiver efficiency greater than 94%. The molten salt design can operate at 400 $W/cm^2$ of incident flux and have a receiver efficiency greater than 94%. Materials and fabrication techniques have also been disclosed that allow the design and fabrication of exemplary receiver embodiments that can operate at at least 650° C. with internal pressures of 80 to 200 bars.

Attaining a high flux in a receiver preferably involves addressing two problems with current designs. First, heat transfer must be sufficiently high to eliminate the need for a large temperature difference between an irradiated surface of a receiver and the heat transfer fluid. Secondly, an increase in flux requires increasing the amount of heat transfer fluid flow per unit area of the receiver to remove the absorbed flux. An increase of allowable incident flux by a factor of four increases the flow of heat transfer fluid per unit area of receiver by a factor of four. If nothing is done to address this issue, the pressure drop increases by a factor of 16. Embodiments of the present invention address the first issue using small (e.g. centimeters) microchannels and micropins that reduce the diffusion barrier to heat transfer. The second issue is addressed by using large number of microchannel or pin array devices operating in parallel.

Figure 3:
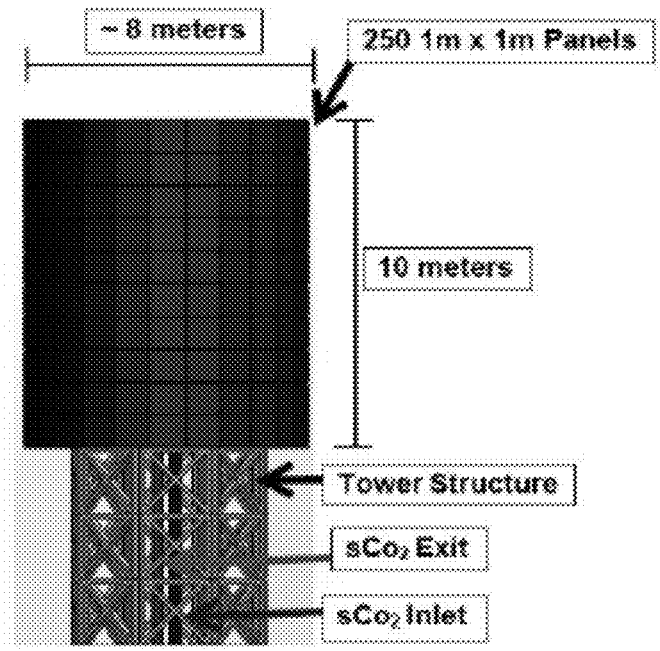
FIG. 3 is schematic representation of a 100 MWe open receiver.

Certain disclosed receiver embodiments use a modular arrangement of devices to heat a working fluid in a concentrating solar receiver. For example, an embodiment of an open solar central receiver may comprise an array of receiver panels in a roughly cylindrical arrangement. A 100-MWe receiver would require about 1-$m^2$ panels arranged in a cylinder approximately 10 meters high and 8 meters in diameter (FIG. 3). The receiver would include headers to provide heat transfer fluid to the modules and return hot fluid to the power block in addition to control valves or orifices to distribute flow to the modules. The receiver would also include structural supports where the modules would be attached. The design is inherently modular, with a large central receiver being assembled from identical 1-$m^2$ commercial panels. One key advantage of the modular design is the ability to independently vary the flow rates into the different receiver panels, ensuring a uniform exiting temperature of the heat transfer fluid.

Figure 4:
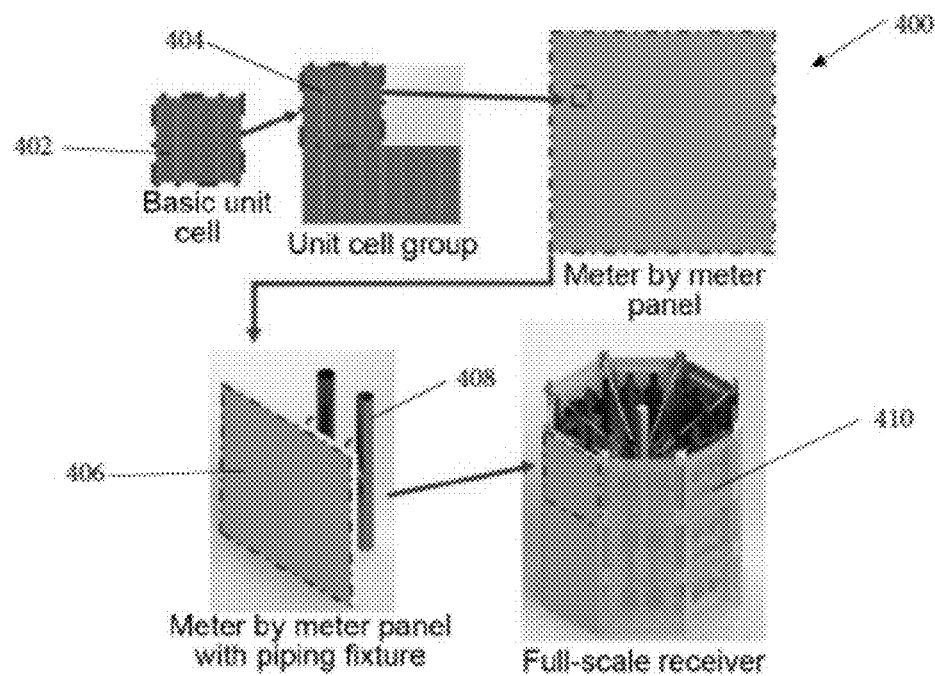
FIG. 4 illustrates a 1-m$^2$ panel header showing flow distribution from the global inlet and outlet to individual 2 centimeter×2 centimeter unit cells.

Individual receiver panels for certain disclosed embodiments comprise a thin absorbing plate comprising plural, relatively short microchannels of channel dimensions on the order of hundreds of micrometers through which working fluid flows to absorb incident solar radiation. Absorption of solar radiation can be facilitated using a high absorptivity coating. The microchannels are arranged into identical unit cells with a header system to distribute heat transfer fluid to each unit cell (FIG. 4). For certain disclosed embodiments, the plate could be bonded to a second distribution plate comprising headers that distribute the working fluid to the unit cells, collect the heated working fluid and return it to a larger header for transport to the power block. An individual panel can be fabricated using chemical etching or sinker Electric Discharge Machining (EDM) to form flow features into thin laminae of substrate material. Etched laminae are stacked and bonded to produce a thin receiver panel that includes the complex set of microchannels.

Figure 5:
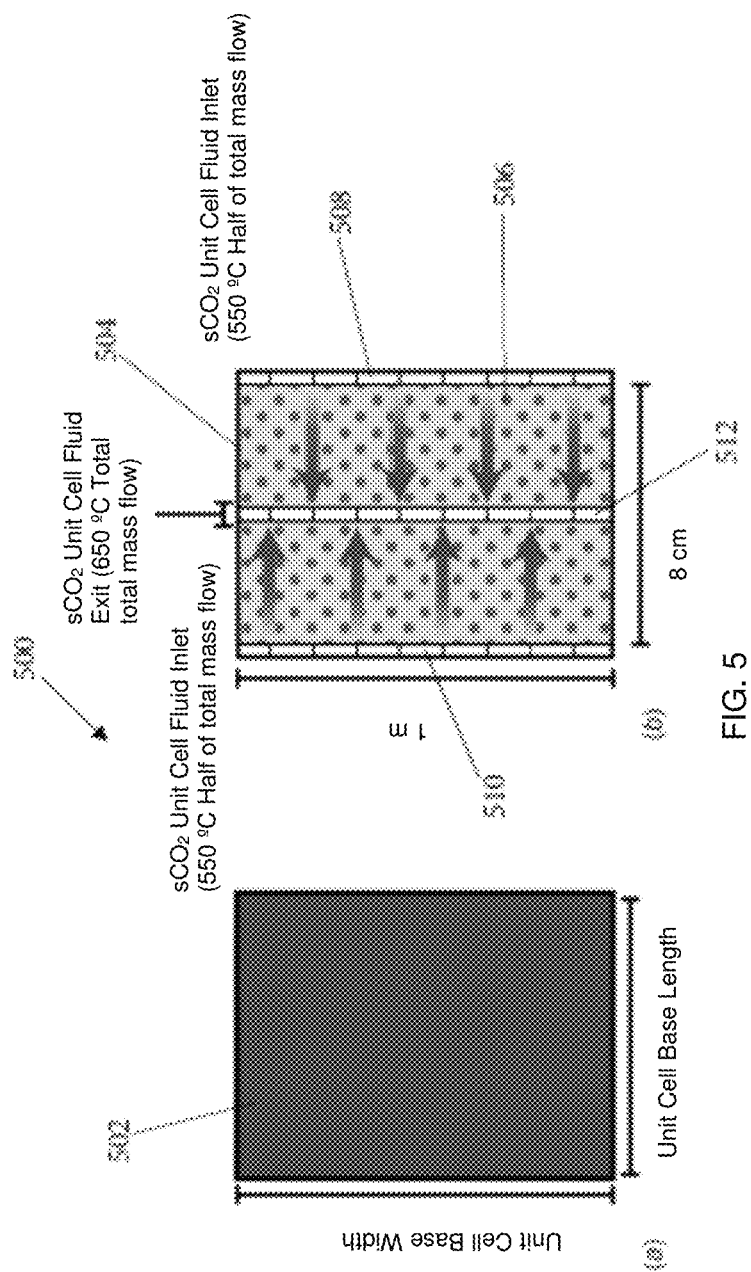
FIG. 5 is a schematic drawing illustrating dimensions of certain unit cell embodiments, as well as embodiments comprising edge inlet headers and a central exit header.

FIGS. 4 and 5 illustrate nomenclature and representative dimensions used herein to refer to certain disclosed features of the present invention. For example, the lowest level architecture is referred to as a unit cell (402 FIG. 4; 502 FIG. 5). A unit cell can have any desired dimension, such as on the order of centimeters to at least one meter. The flow length of certain exemplary unit cells is on the order of centimeters, such as from 2 to 20 centimeters, more typically 2 to 15 centimeters, with certain embodiments having flow lengths being from 2 to 8 centimeters. Particular working embodiments of sCO2 unit cells had a length of about 8 centimeters (0.08 meter) and a width of about 100 centimeters (1 meter), whereas molten salt unit cells had a length of about 50 centimeters (0.5 meter) and a width of 100 centimeters (1 meter). These unit cell dimensions provide certain benefits, such as minimizing pressure drop. For certain embodiments, the unit cell comprises a thin flat flux plate coated with high absorptivity material. The inside of the unit cell comprises a flow passage defined by microchannels or micropin arrays.

A unit cell may comprise plural inlet headers. Certain disclosed embodiments include two inlet headers, such as left and right edge inlet headers, and a central outlet header. For example, FIG. 5 illustrates a plate 504 of a unit cell having edge headers 508 and 510, and a central outlet header 512. Working fluid, such as molten salt, supercritical $CO_2$ (also $sCO_2$) or molten metal enters from both sides, is heated to the desired outlet temperature, and leaves through the central outlet header.

Certain disclosed unit cell embodiments comprise micropins, such as micropins 512, in an array that define a flow field as opposed to microchannels. Micropin arrays yield high working fluid convective heat transfer coefficients while still maintaining a relatively low-pressure drop and satisfactory flow distribution. For certain embodiments, a working fluid such as $sCO_2$ fluid enters the unit cell at both the left and right edge slots. $sCO_2$ fluid may enter at a first temperature and pressure, such as a temperature of at 550° C. and pressure of 200 bar. Supercritical $CO_2$ flows through the pin array absorbing heat from an incident thermal flux, such as a solar fluid, and then exits the unit cell at a second temperature higher than the first temperature, such as a temperature of 650° C., through the central outlet of the unit cell.

Figure 6:
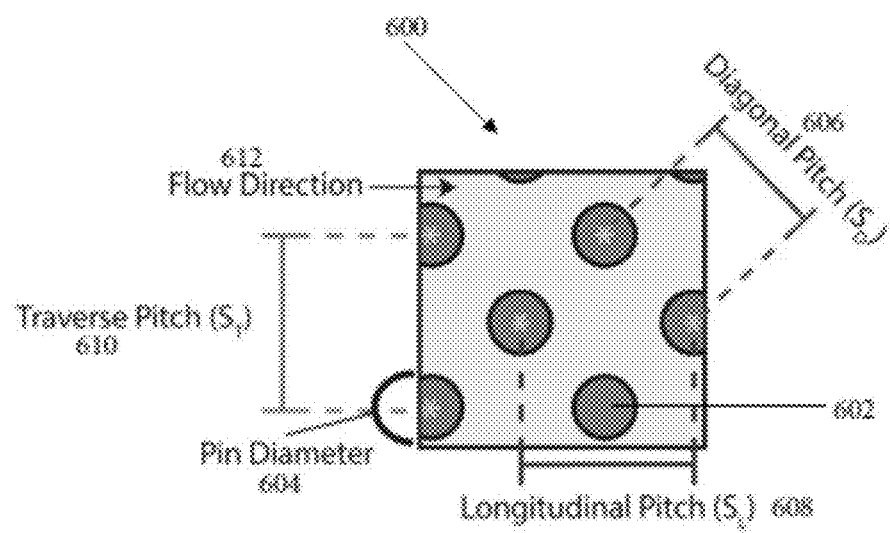
FIG. 6 is a schematic view of a pin array illustrating certain features of disclosed arrays.

FIG. 6 is a schematic view illustrating certain features of a pin array comprising plural pins 602, including pin diameter 604, diagonal pitch 606, longitudinal pitch 608, traverse pitch 610 and the flow direction 612 of a working fluid through the flow field. A person of ordinary skill in the art will appreciate that the values of each of these features may differ for different embodiments. However, solely by way of example, Table 1 provides dimensions of an exemplary unit cell pinfin geometry.

TABLE 1

Unit Cell Pin Fin Geometry for Certain Disclosed Embodiments

| | |
|---|---|
| Coversheet thickness | 580 μm |
| Pin diameter | 700 μm |
| Pin Height | 360 μm |
| Longitudinal Pitch | 1050 μm |
| Transverse Pitch | 1820 μm |
| Diagonal Pitch | 1050 μm |

A thin (580 μm for this particular embodiment) flux plate covers the pin-fin array to minimize conduction resistance. To accommodate the high working temperature and pressure, unit cells are fabricated from certain select materials, such as superalloys, as discussed in more detail throughout this disclosure. One suitable fabrication material is Haynes 230 Ni—Cr alloy, coated with a highly absorptive surface ($\alpha$=0.95).

With reference to FIG. 4, plural adjacently arranged unit cells 404 can be referred to as a group, or can be arranged to form a module. A module is defined as multiple unit cells connected in parallel. Certain disclosed module embodiments have a total heat transfer area of approximately 1 m². For 8 centimeters long by 100 centimeters (1 meter) wide unit cells, an exemplary module comprised approximately 12 unit cells connected in parallel. Working fluid, such as $sCO_2$, is supplied to the module at a first temperature from a central plant and is evenly distributed to the unit cells via an internal headering system. The working fluid is heated to a second higher outlet temperature, and then returned to a central plant. FIG. 4 shows one module 406 associated with headers 408.

Multiple modules can be further arranged into full-scale receivers 410, the highest level architecture. Certain disclosed exemplary modeled central receivers comprised 250 modules. The modular design allows for the mass flow rate of working fluid, such as a molten salt or $sCO_2$, to each module to be controlled to maintain a specified temperature increase. Modules also can be arranged to tune the receiver surface area to a given heliostat field as discussed in more detail below, thereby allowing for increased absorption of solar thermal energy.

While a number of bonding methods exist, commercial production of disclosed receivers may advantageously be produced using diffusion bonding. Diffusion bonding is generally limited to 1-m² substrates, thus producing individual modules of approximately 1 m². A typical unit cell 502 is shown in FIG. 5a. The illustrated unit cell 502 may include a plate 504 comprising plural microscale pins arrays of microscale pins 506 located between edge inlet headers 508 and 510 and a central outlet header 512. Heat transfer fluid is distributed by the headers and flows through the array of microscale pins where the fluid is heated. The heated fluid leaves the unit cell 502 through the outlet header 512. For certain embodiments, the pressure drop across the array of pins is at least ten times the pressure drop in the headers, which evenly distributes fluid through the pin array. The length of the pin array is fixed by the allowable pressure drop, which for $sCO_2$ is on the order of 3 to 8 centimeters. The length of the unit cell is fixed by pressure drop in the header that preferably should be kept to 10% of the pressure drop in the pin array.

The modular approach to disclosed receiver embodiments maintains a reasonable pressure drop in a high flux receiver application. The assembly of the full-scale receiver for commercial modules that has been assembled from unit cells allows a geometry with a very large number of short microscale flow paths operating in a parallel arrangement.

Using microscale pin arrays for heat transfer reduces the temperature difference between the receiver surface and the heat transfer fluid. Disclosed receiver embodiments are the first application of microchannels or microscale pin technology to central receiver power generation.

Disclosed embodiments provide an example of a "numbering up" approach, rather than a scaling up approach. Numbering up involves developing one standard module to conduct a unit operation. Capacity is then increased by increasing the number of identical modules. The advantage of numbering up is that it avoids scaling up the process to larger capacity. For disclosed receiver embodiments, if the performance of one 1-m² module is known, the performance of a complete commercial-scale solar receiver can be known because the performance of each module, as a function of incident flux, is identical.

Certain features of the disclosed technology include:

1. Re-radiation losses are a function of temperature to the fourth power. As a result, relatively small increases in the surface temperature of a receiver can result in a large increase in thermal losses. Higher concentration ratios (i.e., flux) increase both receiver efficiency and the optimum operating temperature of a solar thermal power plant, which in turn increase the efficiency of the power cycle. At a $sCO_2$ temperature of 650° C., increasing the flux from 30 W/cm$^2$ to 100 W/cm$^2$ increases the receiver efficiency from 86% to 96% and the ideal system efficiency from 57% to 65%. Similarly, at a molten salt temperature of 600° C., increasing the flux from 100 W/cm$^2$ to 400 W/cm$^2$ increases the receiver efficiency from 90% to 98% and the ideal system efficiency from 61% to 68%.

2. As alluded to previously, disclosed embodiments of thermal receivers, such as solar receivers, can be operated with gases ($sCO_2$, helium, etc.) or with liquids, such as molten salt or liquid metal. Given the high pressure associated with $sCO_2$, its use demonstrates a "worst case" scenario, and the successful development of technology for this application establishes development of a technology also applicable to a range of other heat transfer fluids.

3. The reduction in receiver size caused by high allowable incident flux will reduces receiver cost and weight. When using expensive high temperature metals, the cost of the receiver will be a strong function of the amount of high temperature metal used in the device which is directly related to the size of the receiver.

4. Disclosed embodiments demonstrate, via results from separate effects tests, that a 1 cm-by-1 cm molten salt receiver test article can achieve >95% thermal efficiency (where receiver efficiency is defined as the ratio of thermal energy transferred to the working fluid divided by the solar flux incident on the receiver surface) with a working fluid exit temperature of 565° C. and pressure drop <2% of the inlet pressure while absorbing a heat flux of 400 W/cm$^2$.

5. Disclosed embodiments demonstrate that gas working fluid metrics, such as for a $sCO_2$ receiver, can provide >90% thermal efficiency, with a working fluid exit temperature of ≥650° C., a pressure drop of <0.35 bar while absorbing a heat flux of 100 W/cm$^2$. Computations demonstrate that pressure drop across inlet and outlet of a 1 m$^2$ receiver panel is <2% of the inlet pressure and simultaneously achieving exit temperature of 650° C. for a flux of 100 W/cm$^2$ for $sCO_2$.

III. Fabrication Materials

A person of ordinary skill in the art will appreciate that disclosed receiver unit cells, groups, modules and full-scale receivers can be made from any desired material suitably selected in view of the operating conditions. For example, working embodiments may be fabricated from stainless steel. However, for certain embodiments, the operating conditions are relatively high temperatures and/or pressures. Accordingly, certain suitable fabricating materials include super alloys. Exemplary alloys include Inconel 740H, 800H, 800HT, 750, 751, 718, Haynes 214, Haynes 230, Haynes 25, Haynes R41, Wasapaloy, 282, alloy 617, and alloy 316. Haynes 230 has proved to be a particularly suitable fabrication material.

At least three options for fabricating an $sCO_2$ embodiment are possible. Both solid-solution-strengthened and precipitation-strengthened superalloys are candidates for this application. Of the precipitation-strengthened alloys considered, Inconel 740H and Haynes 282 are the leading candidates. Of the solid-solution-strengthened alloys considered, Haynes 230 was selected because of three factors. First, although Haynes 230 is primarily a solid-solution-strengthened alloy, it contains a high volume fraction of the $M_6C$ phase, which is instrumental in stabilizing matrix grain size at diffusion bonding high temperatures. Haynes 230 is one of the most grain-growth-resistant materials in the solid-solution-strengthened superalloys family. Second, Haynes 230 is one of the most corrosion-resistant alloys at high temperatures. Third, Haynes 230 was selected based on prior experience with this alloy. Alloy 617 may be another good candidate for this application; however, it was not chosen because it lacks sufficient second-phase particles in its microstructure, which may lead to excessive grain growth during diffusion bonding. A person of ordinary skill in the art will appreciate that disclosed unit cells, modules and full-scale receiver embodiments can be made from a combination of fabrication materials.

IV. Exemplary Receiver Designs

Figure 7:
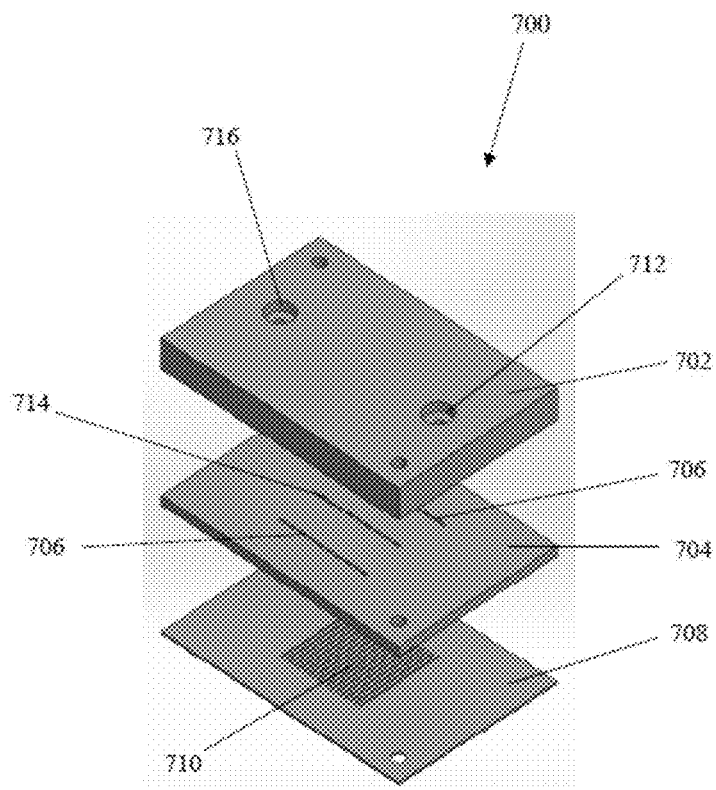
FIG. 7 is a schematic, isometric exploded view of one embodiment according to the present invention.
Figure 8:
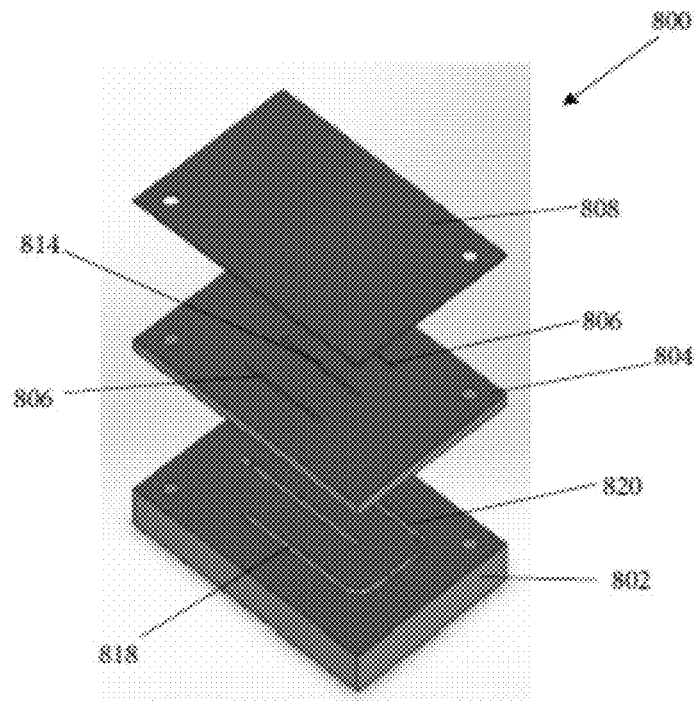
FIG. 8 is a schematic, isometric exploded view of one embodiment according to the present invention.
Figure 9:
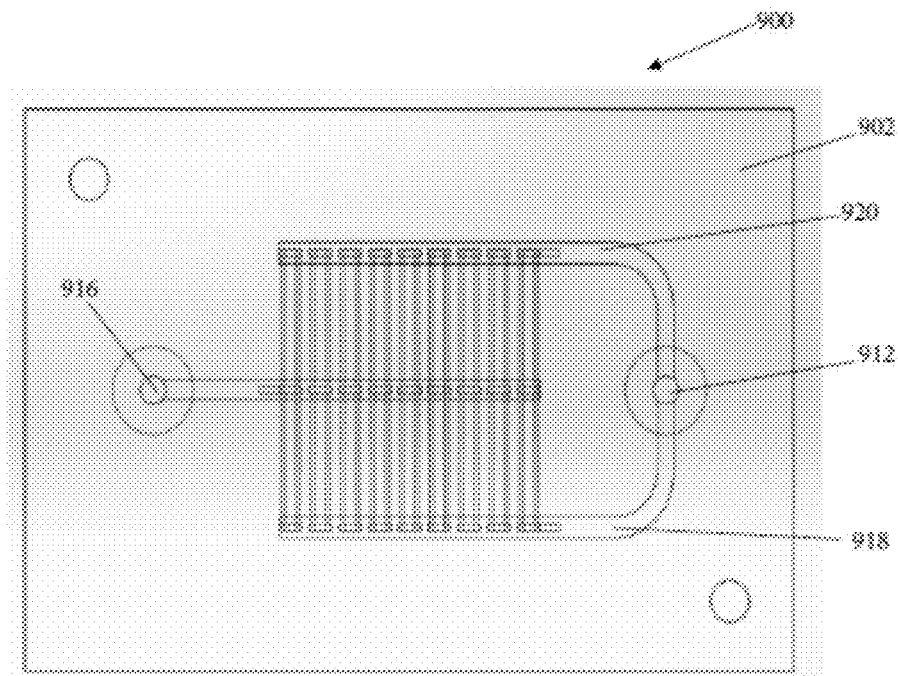
FIG. 9 is a schematic plan view of an embodiment according to the present invention where fluid enters the port on the right, the inlet port in plate 3 channels fluid to the entrance of the microchannels and fluid flows in the microchannels from top and bottom slots to the center slot and out through the large port on the left.

FIGS. 7, 8 and 9 are isometric, inverted, and top views, respectively, of exemplary receiver embodiments according to the present invention. With reference to FIG. 7, device 700 includes a top plate 702, middle fluid distribution plate 704 having distribution headers 706 and a bottom microchannel flux absorber plate 708 having plural microchannels 710. Working fluid enters device 700 through an inlet aperture 712 defined by plate 702 at a first temperature. The inlet fluid splits between two forks (see FIGS. 8 and 9), and enters the distribution header slots in plate 704. Fluid then flows to flux absorber plate 708, enters the microchannels 710 and is heated to a second temperature greater than the first temperature by heat transfer. The heated working fluid flows along a flow path to the middle exit slot 714, leaves bottom plate 704, and enters the outlet port defined by plate 702.

FIG. 8 is an inverted view of the exemplary device of FIG. 7. Accordingly, device 800 includes a top plate 802, middle fluid distribution plate 804 having edge distribution headers 806 and a bottom microchannel plate 808 having plural microchannels 810 (not shown). Working fluid enters device 800 through an inlet aperture 812 (not shown) defined by plate 802. The inlet fluid splits between two forks 818 and 820 and enters the distribution header slots 806 in plate 804. Fluid then flows to flux absorber plate 808, enters the microchannels 810 (not shown) and flows along a flow path to the middle exit slot 814. Fluid flow then leaves bottom plate 804, and exits the device through the outlet port defined by plate 802.

FIG. 9 illustrates plate 902 having inlet port 912. Working fluid entering port 912 bifurcates between channels 918 and 920 for distribution to the middle distribution plate. After flowing through the complete fluid flow path, working fluid then exits the device through outlet port 916.

Figure 10A:
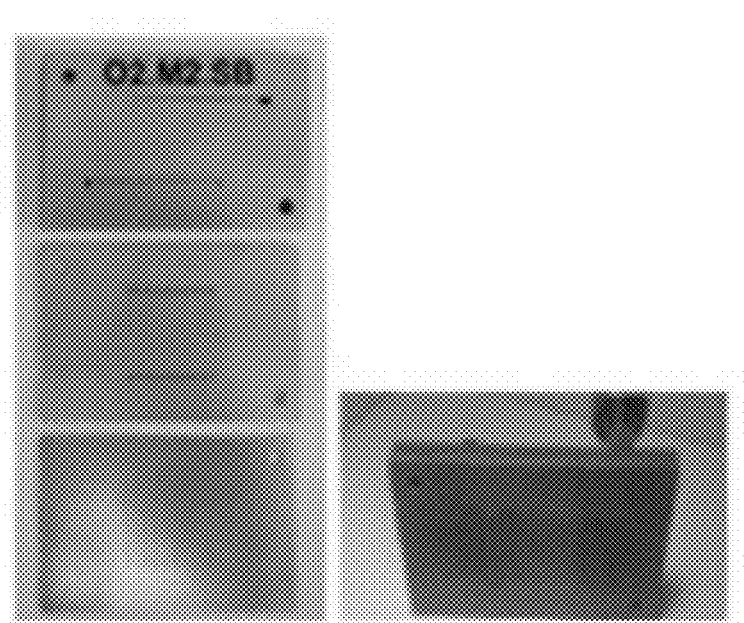
FIG. 10A is an image of a microchannel unit cell comprising 3 plates where the microchannels cover an area of 2 cm×2 cm with 1 inlet and 1 outlet.
Figure 10B:
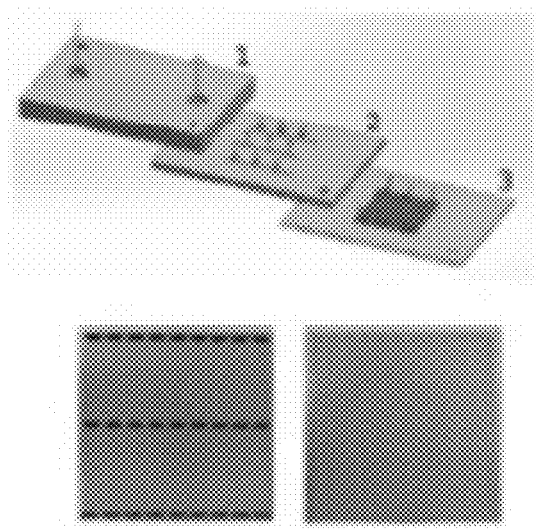
FIG. 10B is an exploded view of a pin-fin unit cell showing a flux absorber plate, the middle distribution plate and an upper header plate.

The microchannels shown in FIGS. 7-9 also can be configured as pin array flow fields. FIGS. 10A and 10B are digital images of certain exemplary working embodiments illustrating both microchannel and pin array embodiments. FIG. 10A illustrates a 3 plate configuration comprising plural microchannels, as shown in FIGS. 7-9. FIG. 10B also is a 3 plate configuration, but the flow field comprises a pin array as opposed to fluid microchannels.

Figure 11:
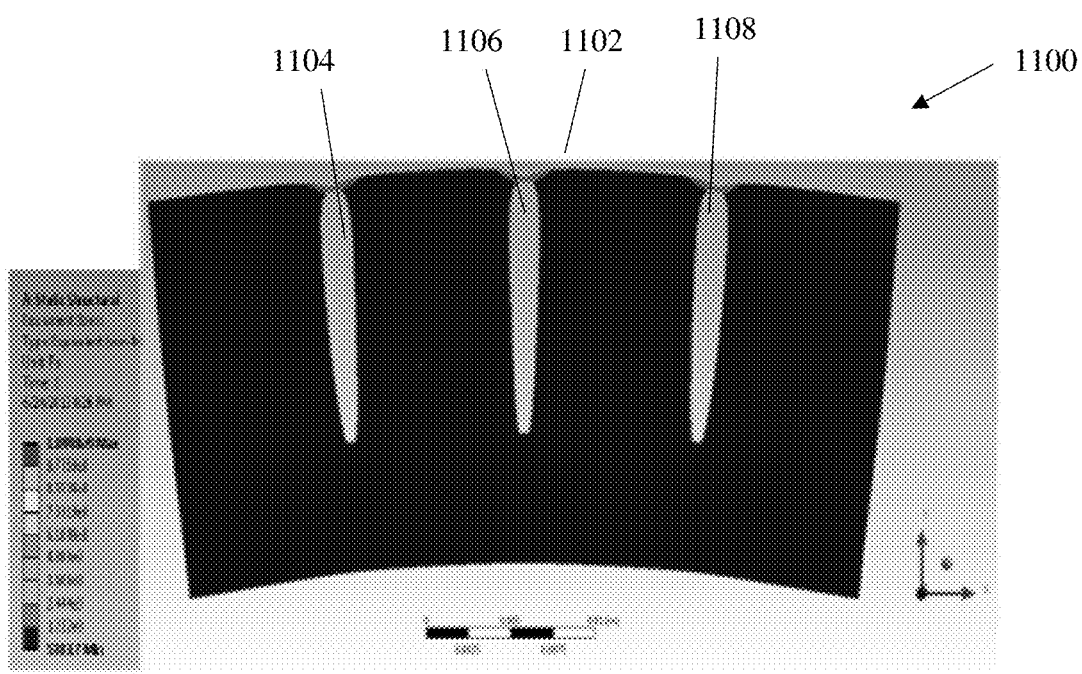
FIG. 11 is an exaggerated schematic diagram illustrating header stresses showing failure mode.

In one header concept, each of three headers (two inlets and one outlet) are a continuous slot with a uniform cross-section. For certain embodiments, the entire slot was machined using wire EDM. This header embodiment included two relatively large dimensions: a 12-millimeter height; and 2 centimeter length that are necessary to deliver fluid to all of the channels that cover a 2 centimeter by 2 centimeter heated area. The resulting interior surfaces of the header produced significant forces on the walls of the header, with potential for failure, as illustrated in FIG. 11. In this figure, solar flux is incident on the top-most edge 1102 of the device 1100. Fluid in the headers 1104, 1106 and 1108 flows into and out of the page and fluid in the channels flow right-to-left and left-to-right (though the channels are not visible here). Failure is most likely to occur in the flux absorber plate, where a relatively thin plate is stretched by the force on the header walls. One embodiment adopted to address this problem included a header divided into two regions between two separate plates: one in plate 2; and one in plate 3. In plate 2, the continuous slots are divided into plural (nine for this embodiment) separate slots, with ribs between the two walls of the header. The ribs take most of the stress away from plate 1. Also, height can be reduced in order to reduce the force on the header walls. The first header region may not have sufficient capacity to distribute flow, and hence certain disclosed embodiments included a second header region.

A. Molten Salt Solar Receiver Designs

Certain disclosed embodiments of a molten salt solar receiver were designed to operate at a molten salt exit temperature target of at least 500° C., preferably 600° C., assuming the development of advanced molten salts. One disclosed working embodiment design had an exit temperature of 550° C. for use with known salts. A simulated receiver achieved an exit temperature of 600° C. with no design modifications to the 550° C. embodiment. As with $sCO_2$ receiver embodiments, Haynes 230 may be advantageously selected for the fabrication material due to the combination of adequate strength at temperature, good oxidation properties, and availability. A person of ordinary skill in the art will appreciate that other high strength alloys could be used including, without limitation, those materials specifically disclosed herein.

B. Embodiments of an $sCO_2$ Receiver

One disclosed embodiment of an $sCO_2$ receiver included a circular pin-fin array design to obtain uniform flow distribution and minimal pressure drop through the fins and to provide high efficiency for the receiver. The array was uniformly spaced and fabricated using sinker EDM; this leaves pin diameter (D) and pitch as the two design variables. A design was chosen based on a parametric simulation study that included pressure drop through the pin array and in the headers, where header pressure drop was kept to 10% of the array pressure drop to insure good flow distribution. A full-design simulation was then performed, and Table 2 lists simulation results.

TABLE 2

Simulation Results for Molten Salt Pin-Fin Receivers

| | |
|---|---|
| Total pressure drop | 0.4 bar |
| Average channel wall temperature | 797.1 K |
| Predicted heated surface temperature | 838.3 K |
| Thermal efficiency | 99.1% |
| Receiver efficiency | 94.1% |

Two dimensional stress simulations were performed in the channels and the header. The internal pressure was assumed to be 5 bar. The temperature solution from the conjugate simulation was used to approximate the temperature gradients in the areas of interest.

These simulation results established that the desired level of performance for both the molten salt and $sCO_2$ receiver test articles can be achieved using disclosed embodiments of the invention. More specifically, based on simulation, a molten salt receiver with an incident flux of 400 W/cm² is feasible. This is more than a factor of four better than existing technology, and this flux level was achieved with thermal losses of less than 1%. In addition, the small temperature gradient across the microchannels basically eliminated thermal stress as an issue for the molten salt design.

All tested options for an $sCO_2$ receiver achieved flux goals of 100 W/cm² with thermal losses of between 5% and 7%, while the molten salt design achieved a flux goal of 400 W/cm² with thermal losses of 1%.

V. Receiver Fabrication

Lab-scale test articles for both $sCO_2$ and molten salts have been produced. Certain sCO2 embodiments were fabricated using Haynes 230 for $sCO_2$. 316 stainless steel was used to produce certain molten salt receiver embodiments. Disclosed embodiments include an option 1 design comprising micro-machined, parallel circular microchannels that were prepared by drilling and welding headers to the channel section. A second option comprised an array of parallel microchannels and header plates that direct fluid into and out of the array. The parallel microchannel arrays were micro-machined and the plates were diffusion-bonded together to form the receiver. A third option comprised a micro-pin fin array produced using sinker EDM instead of parallel microchannels, and the plates were bonded using diffusion bonding.

A. Option 1 sCO2 Receiver

Figure 12:
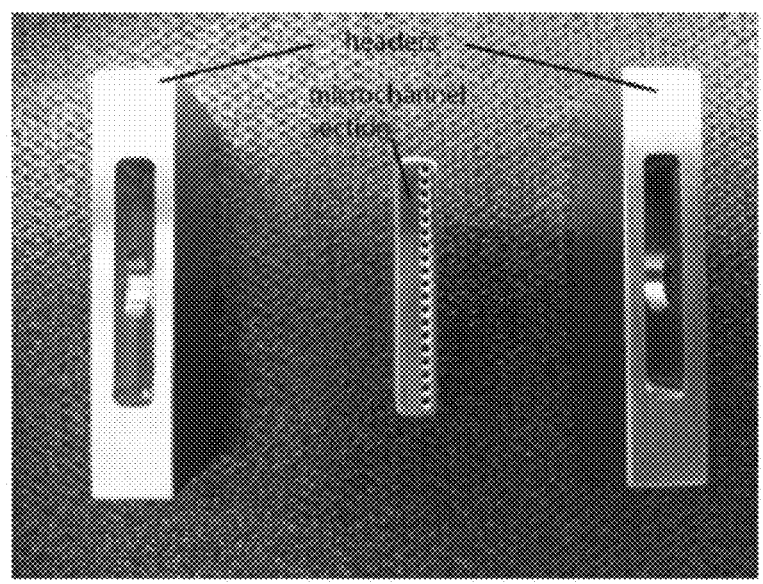
FIG. 12 is a digital image illustrating an embodiment of a lab-scale sCO$_2$ receiver.
Figure 13:
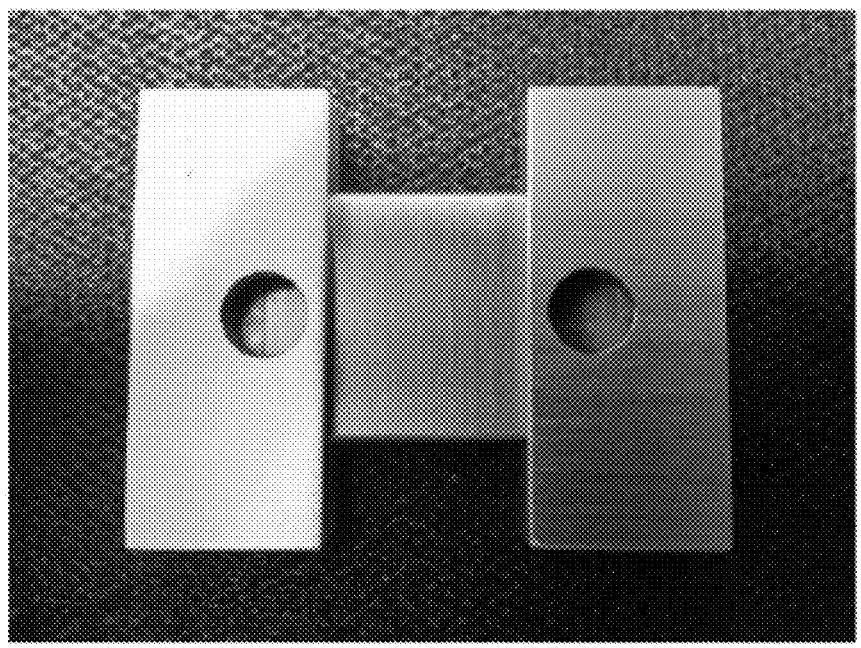
FIG. 13 is digital image illustrating an embodiment of a lab-scale sCO$_2$ receiver.

One disclosed embodiment of an option 1 $sCO_2$ receiver comprised a microchannel section that was welded in place between two header sections. Two 6.25 millimeter outer diameter tubes were welded to the headers. The microchannel section was 1.5 centimeters long×2 centimeters wide with 19 microchannels that were 500 μm in diameter and spaced 500 μm apart. These channels were formed by drilling into the material and were located 0.3 millimeter from the wall that was to be exposed to a simulated thermal flux, such as a solar flux. The microchannel section was inserted within the plena and welded. This Option 1 receiver was fabricated and tested for integrity. FIGS. 12 and 13 are digital images of the Option 1 receivers.

B. Option 2 $sCO_2$ Receiver

Figure 88:
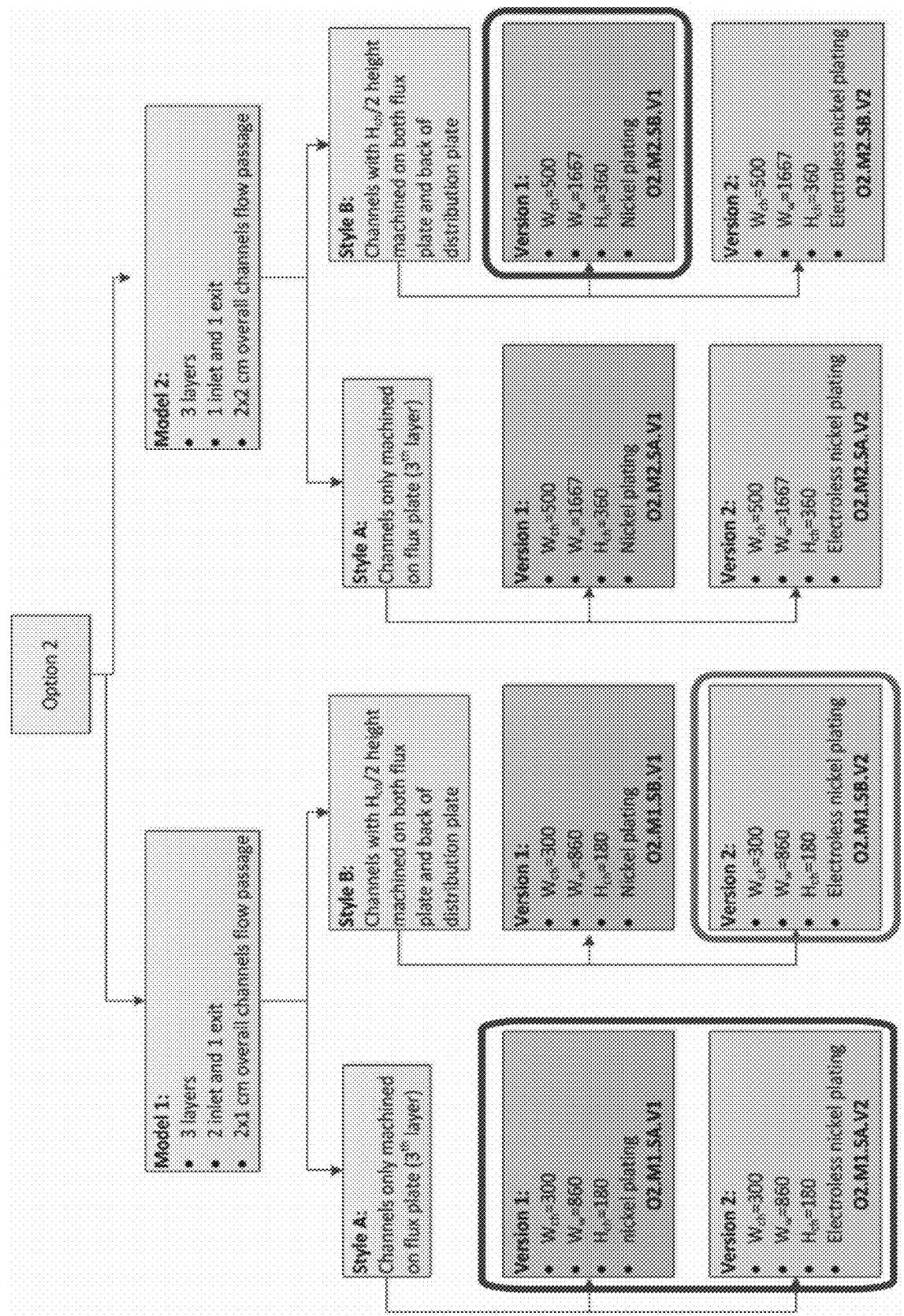
FIG. 88 is a flow chart illustrating how five receivers were fabricated for the Option 2 design of the sCO$_2$ receiver.

Five receivers were fabricated according to the matrix provided in FIG. 88. The five receivers used different models, styles, and versions of the device to provide guidelines for embodiments comprising multiple unit cells. With reference to FIG. 88, Style A designs had channels machined into one plate, resulting in a sharp corner when the plate containing the channels was bonded to the top plate. Style B involved machining channels into both a channel plate and a top plate where these channels are one half the depth of the Style A designs. Machining results in a curved radius at the end of the channel, so this approach avoided 90° corners at the bonding interface but did require alignment of the plates during bonding. Bonding involved depositing a nickel layer on shims prior to bonding. There were two options for deposition of the nickel layer, thereby resulting in two versions in FIG. 88.

Figure 14:
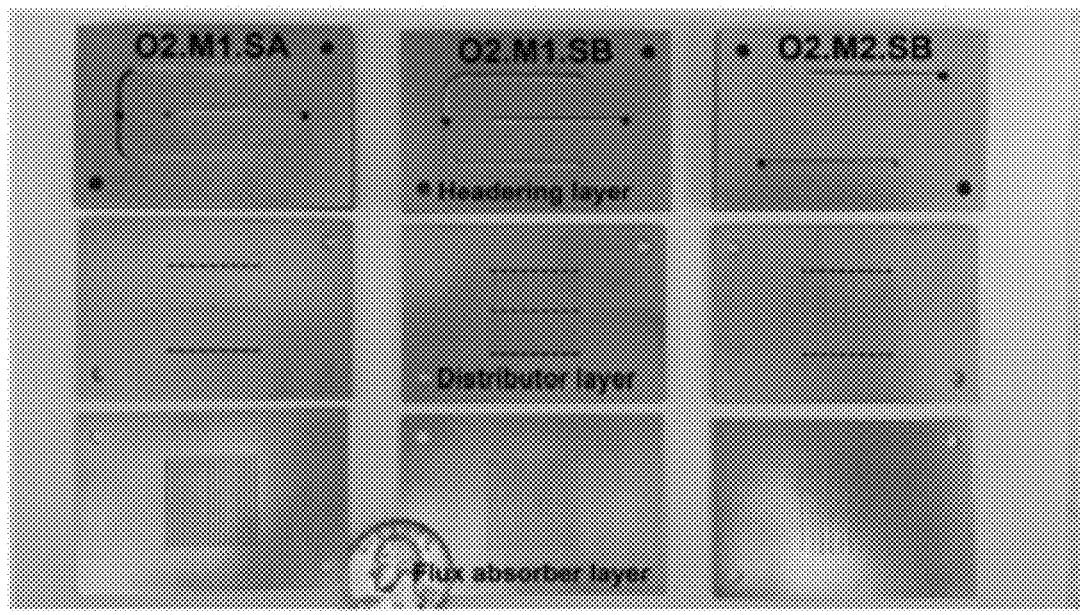
FIG. 14 is a digital image of 3 embodiments of a lab-scale sCO$_2$ receiver comprising parallel microchannel receivers.
Figure 15:
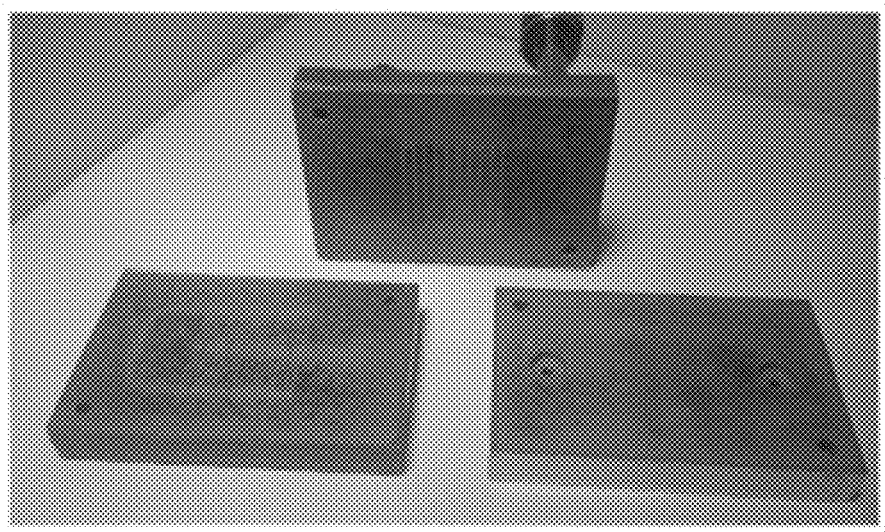
FIG. 15 is a digital image of a diffusion bonded sCO$_2$ receivers comprising parallel microchannels.

With reference to FIG. 14, each of the Option 2 receivers comprised three plates: (i) a 400-micrometer thick flux absorber plate; (ii) an intermediate fluid distribution layer; and (iii) a headering layer that connects the inlet and exit plena to fluid conduits. Receivers were fabricated by bonding these layers together. A two-stage bonding process was used for certain disclosed embodiments. In a first stage, three test articles were bonded: O2.M2.SB. V1; O2.M1.SA. V1; and O2.M1.SA. V2. The first two received sulfate-based, electrolytic nickel plating and the last one received phosphorus-based, electro-less nickel plating. The first receiver had unit cells that were 2 centimeters long×2 centimeters wide with one inlet and one exit header. Channels were cut to half depth on both the absorber and distributor plates. The second and third receivers had 2 centimeter wide and 1 centimeter long unit cells with two inlet headers and one exit header. Channels in these two embodiments were cut only into the flux absorber plate. FIG. 15 is a digital image of test receivers formed using these procedures.

In a second stage, two 2 O2.M1.SB. V2 embodiments and one Option 3 embodiment were fabricated. These embodiments received electroless nickel plating, as no discernible difference in integrity was observed between the two coatings.

C. Option 3 sCO$_2$ Receiver

Figure 16:
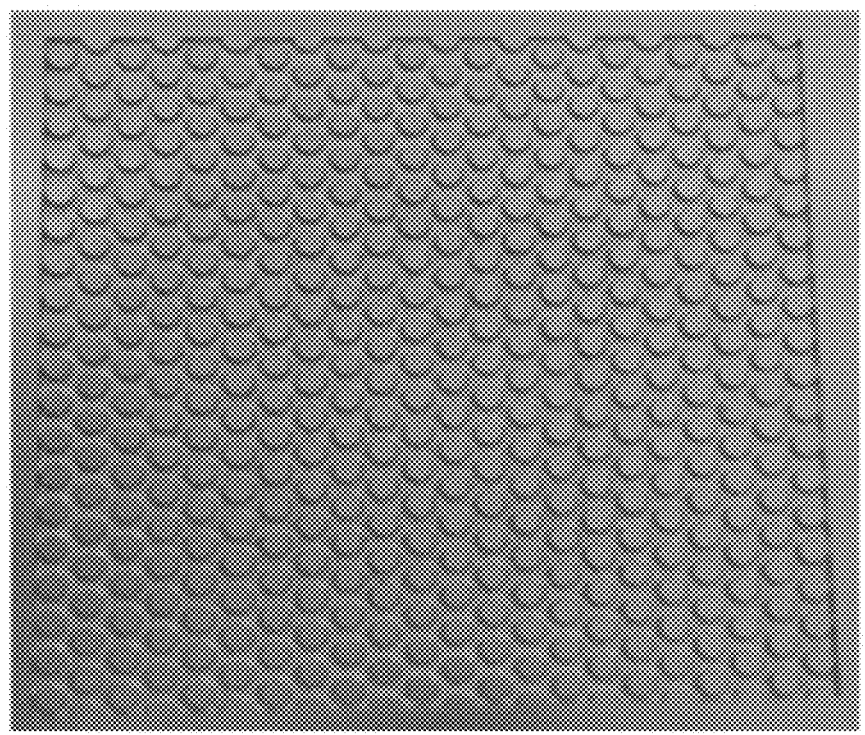
FIG. 16 is a flux absorber layer of another embodiment of an sCO$_2$ receiver.
Figure 17:
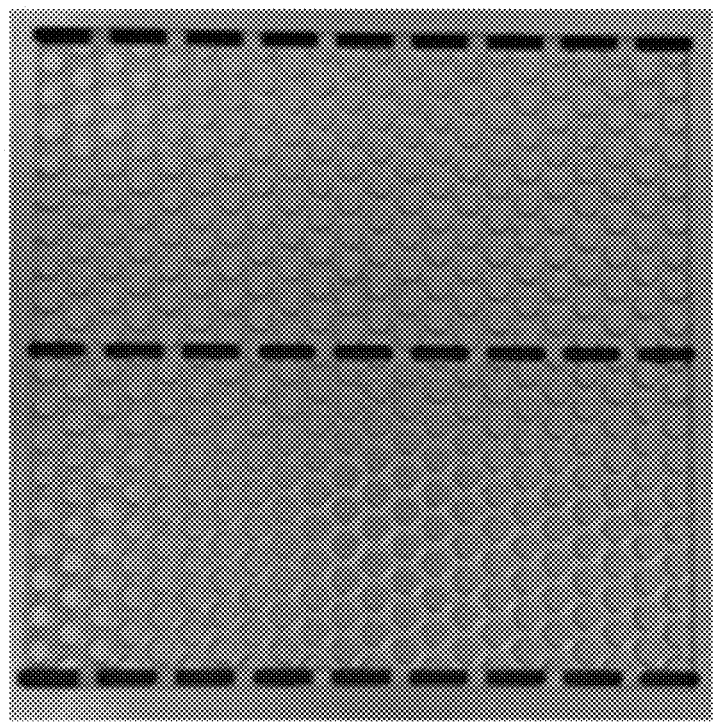
FIG. 17 is a flux absorber layer of another embodiment of an sCO$_2$ receiver.

This option included a micro-pin fin array for heat transfer in the flux absorber layer. The pins were patterned using sinker EDM by an external vendor. FIGS. 16 and 17 illustrate a micro-pin fin receiver plate indicating the fluid passages in and out of the receiver. The flux absorber plate had through-cut inlet slots that connect to deeper plena on the back side of the distributor plate and in the header plate. The cross-sectional dimensions of the machined flux absorber plate were verified using optical profilometry. The pins were between 200 and 1100 µm in diameter and the edge-to-edge spacing between pins was from about 300 um to about 600 µm. The depth of the pins was 160 µm in both the flux absorber and distributor plates. Accordingly, the bonded depth of micro-pins after bonding was 320 µm. By using electrodischarge machining (EHD) channel depths up to twice the pin spacing can be achieved.

D. Molten Salt Receiver

Figure 18:
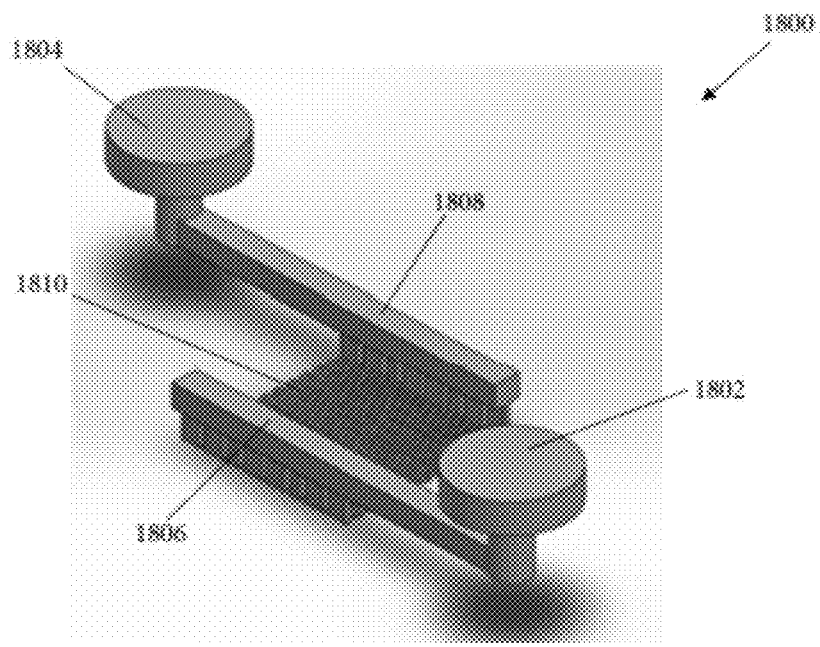
FIG. 18 is a schematic perspective image of a molten salt receiver pin fin array.

A pin fin array was also chosen for the molten salt receiver based on simulation results. The design closely follows that of Option 3 used for the sCO$_2$ test article. The receiver was 1 centimeter×1 centimeter given the requirement of testing at an increased flux of 400 W/cm$^2$. FIG. 18 is a schematic perspective view illustrating a fluid path through the three layers of the molten salt receiver. Device 1800 includes fluid ports 1802 and 1804 for delivering fluid flow to headers 1806 and 1808, and from the headers to flow field 1810.

Figure 19:
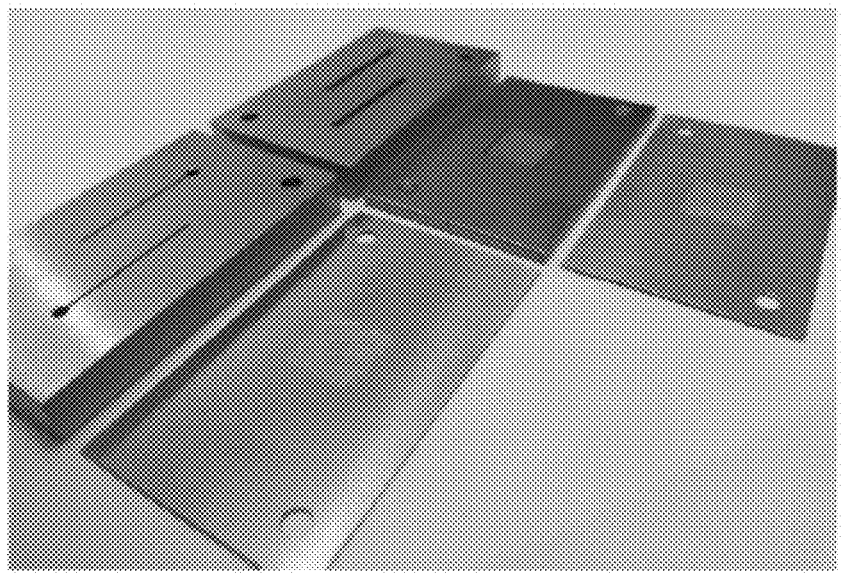
FIG. 19 is a digital image of a molten salt receiver pin fin array

Two versions of this receiver were fabricated. A first receiver embodiment comprised three layers, identical to the sCO$_2$ receiver. A second embodiment comprised only two layers, wherein the headers and distributor layers were combined into one plate. FIG. 19 is a digital image showing the fabricated layers in stainless steel. Sinker EDM was used to form the smaller features and traditional machining was used to form larger features. The layers were diffusion bonded and tested.

Figure 20:
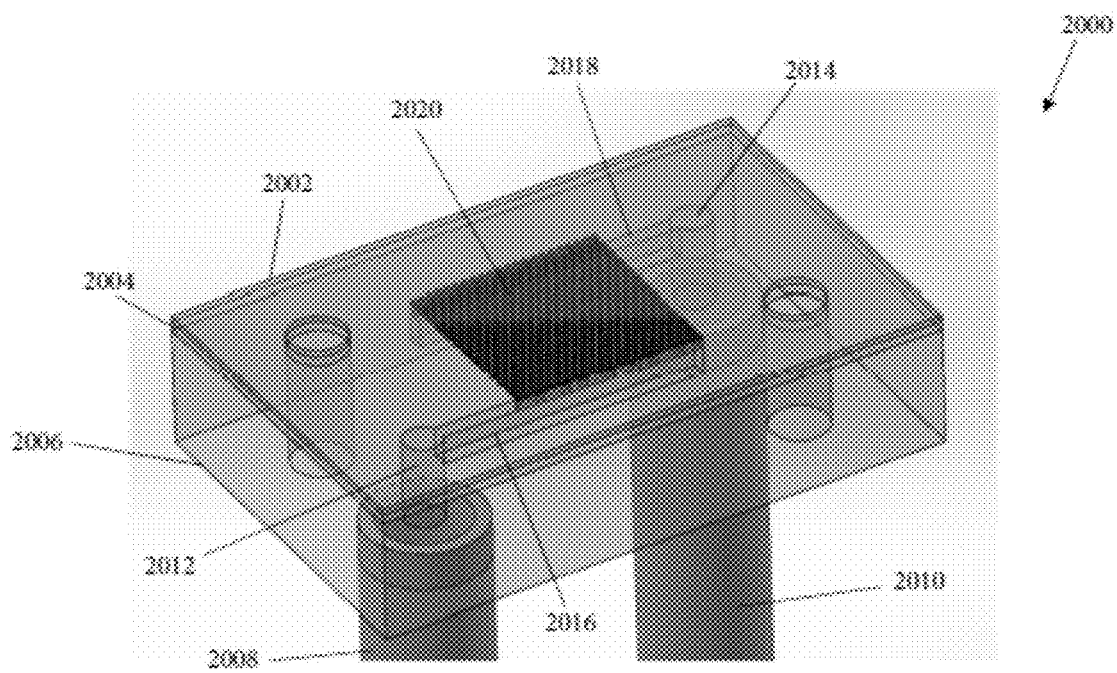
FIG. 20 is a schematic perspective image of a molten salt receiver pin fin array.

FIG. 20 is a schematic perspective view of a 3-layer design 2000 having plates 2002, 2004 and 2006. Fluid flowing to and from device 2000 through fluid delivery conduits 2008 and 2010 is delivered through fluid ports 2012 and 2014 to headers 2016 and 2018 and through a flow field 2020. The receiver embodiment 2000 of FIG. 20 was designed to minimize surface area and mass, thereby minimizing thermal losses. Inlet and outlet header depth and width dimensions, pin dimensions, and test region dimensions were all maintained consistent with the original design. However, for the illustrated embodiment, the header lengths were shortened from 3.9 centimeters to 3 centimeters to allow for a more compact design, reducing the surface area by 30%. These design changes were intended to reduce heat loss from the test article observed during testing of sCO$_2$ test articles.

With all heaters functioning correctly, a mass flow rate of 0.08 g/s of molten salt flow was achieved for this 3-layer embodiment. This flow rate was lower than expected, primarily because fabrication errors in the sinker EDM and diffusion bonding processes produced channels that were much smaller than expected. The molten salt flow rates for the 3 layer design under reasonable supplied pressure head (0.08 g/s) were too low to sustain a heat flux of about 400 W/cm$^2$. Consequently, new molten salt receivers were fabricated with better dimensional controls.

Figure 21:
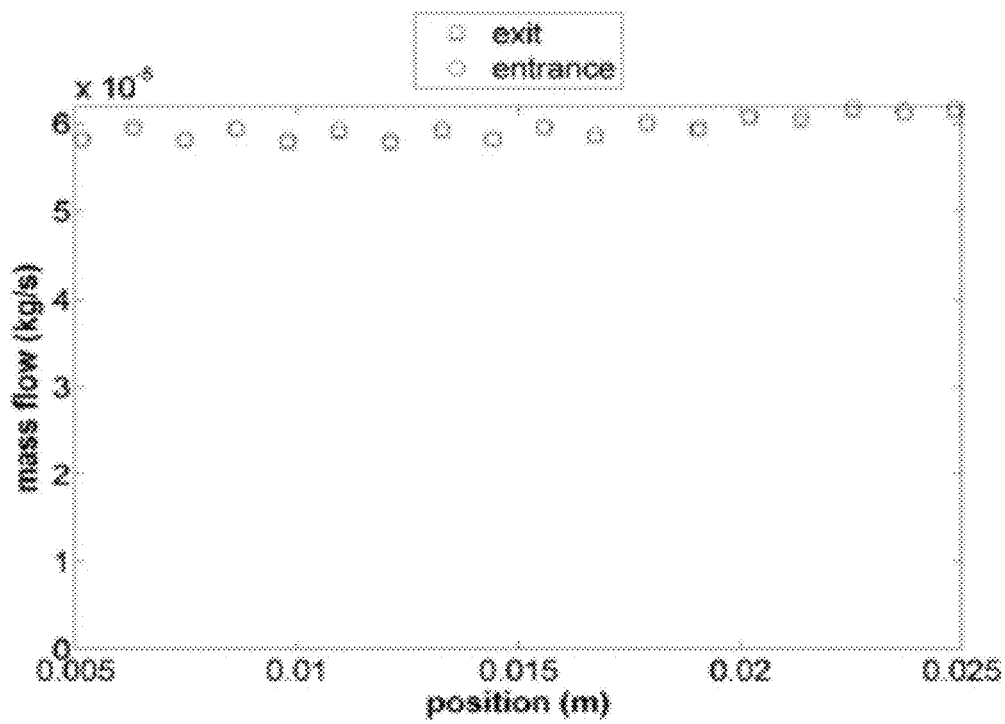
FIG. 21 is a plot of mass flow rate per channel versus channel position where each point represents the total mass flow in an individual channel.

FIG. 21 is a plot of mass flow rate versus channel position for an Option 2 design. Each data point represents an individual channel. This particular embodiment included 18 total channels. A person of ordinary skill in the art will appreciate that commercial modules would include hundreds to thousands of "channels" in a unit cell. Certain embodiments may include microchannels, whereas other embodiments flow fluid around a large number of pins where the number of flow paths around the pins would be on the order of hundreds to thousands of flow paths. The average pressure drop through the channels in this Option 2 embodiment was 0.2 bar.

Figure 22:
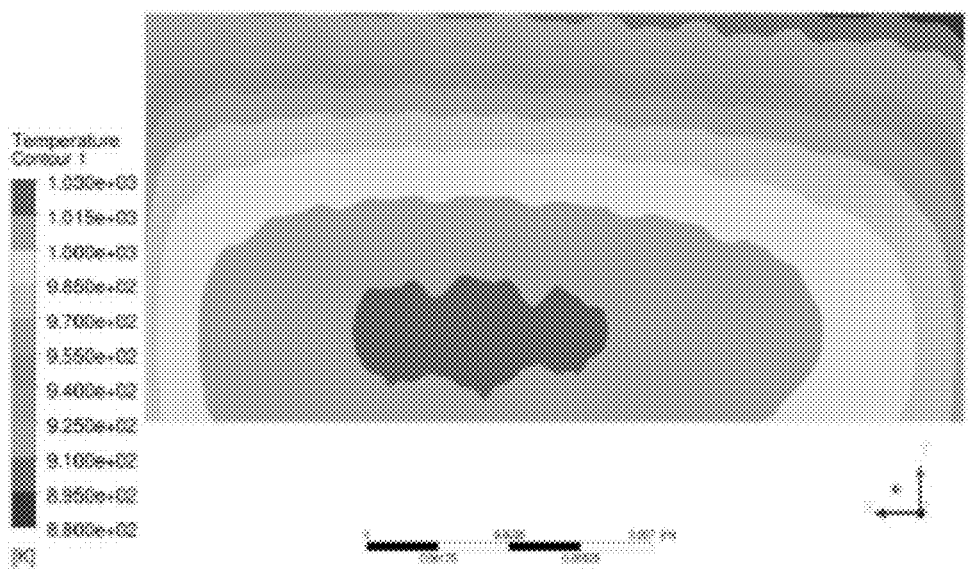
FIG. 22 is a temperature contour plot at the heated surface where the area depicted is 1 cm 2 cm, half of the total 2 cm×2 cm heated surface due to the plate symmetry, and where fluid flows from top-to-bottom.
Figure 23:
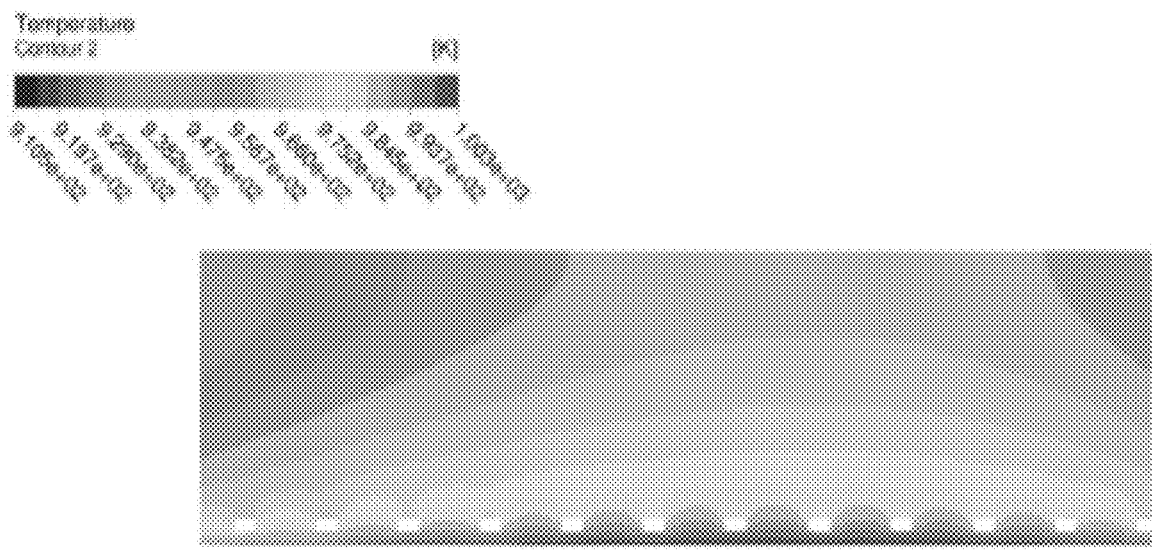
FIG. 23 is a temperature contour plot at a cross-sectional plane perpendicular to the stream-wise direction in the microchannels and solar flux is incident on the bottom edge.

FIG. 22 is a contour plot of temperature on a heated surface of a receiver embodiment according to the present invention. The area seen is 1 centimeter by 2 centimeters (half of the total 2 centimeters by 2 centimeters area since symmetry was used). Fluid in the channels flows from top to bottom. The bottom edge is the symmetry boundary. The actual solid region modeled in this simulation extends beyond the area shown here; this is just the area to which a solar flux is applied. The average surface temperature for this embodiment was 980° K., and the receiver thermal efficiency was 94.7% (89.7% including reflection losses). FIG. 23 is a contour plot of temperature of the solid at a cross-sectional plane at mid-length along the channels. Solar flux is incident to the bottom edge, and fluid in the channels flows into the page.

E. Pressure Test Facility

Figure 24:
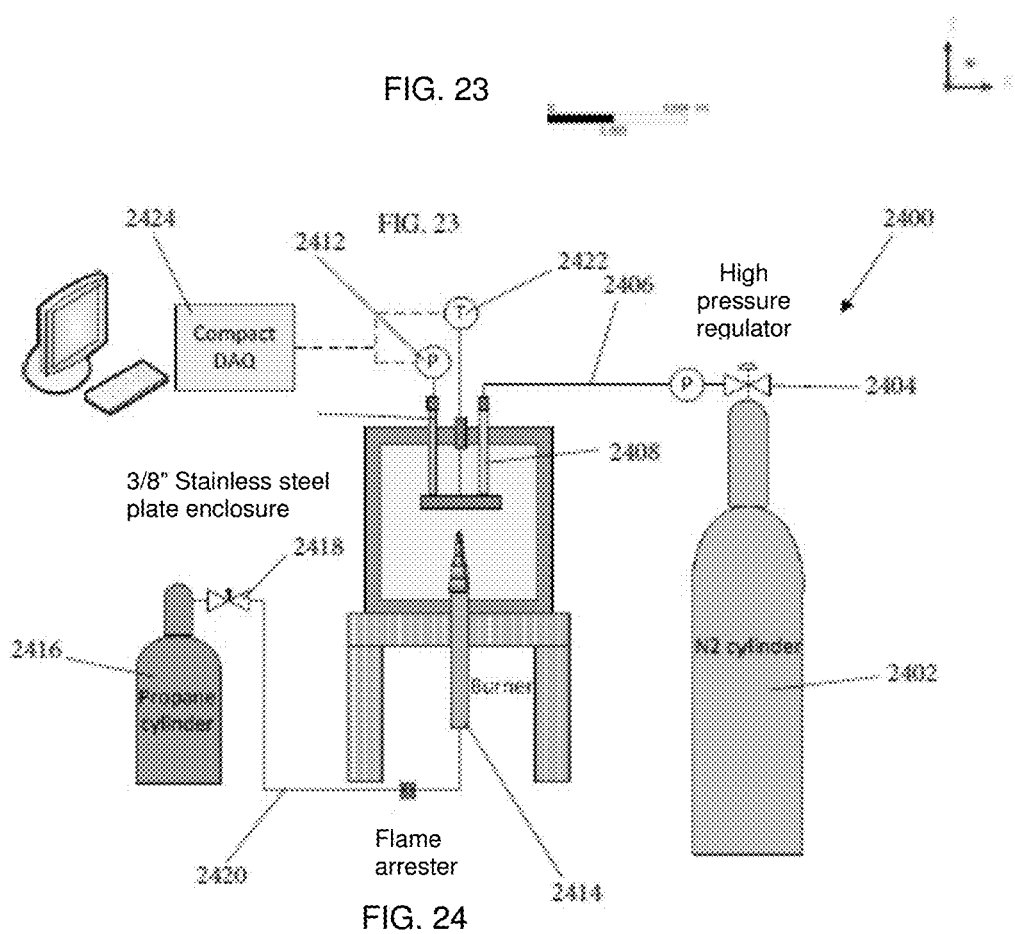
FIG. 24 is a schematic drawing of a temperature and pressure testing facility.
Figure 25:
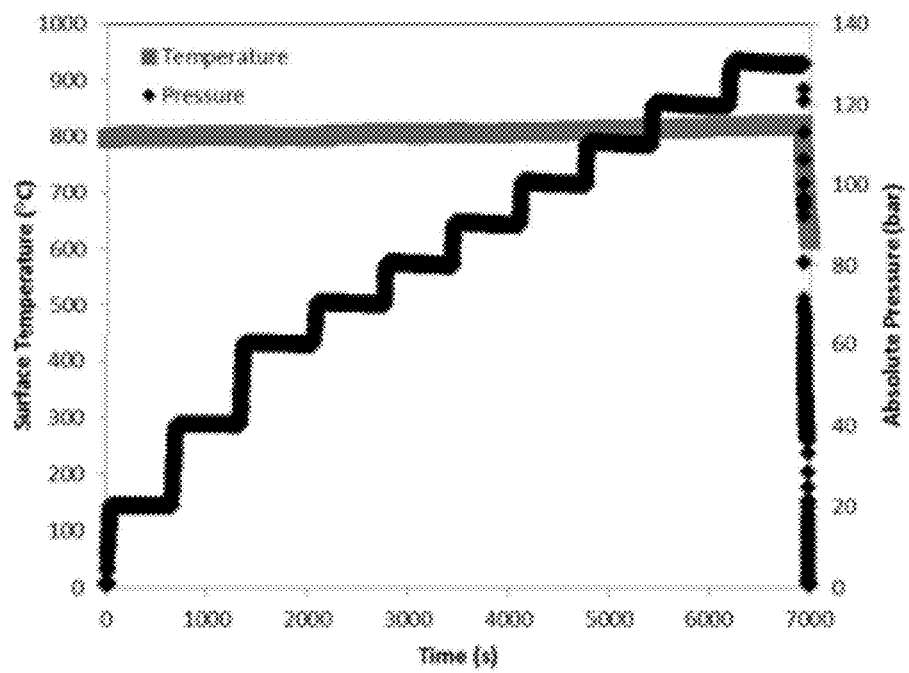
FIG. 25 is a plot of surface temperature and pressure versus time illustrating the results of static pressure testing for certain disclosed embodiments of the present invention for an sCO$_2$ receiver at nominal operating temperatures.
Figure 26:
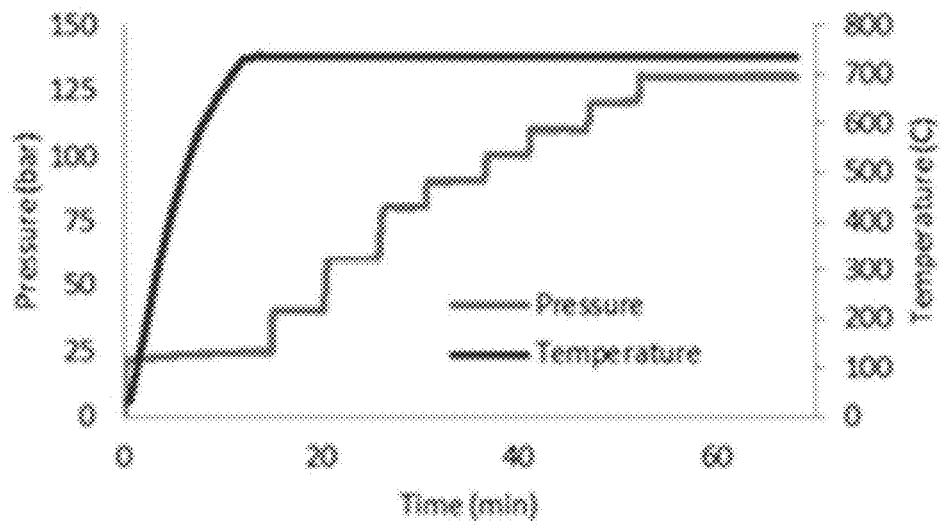
FIG. 26 is a plot of pressure (bar) and temperature (□) versus time (minutes) for a disclosed embodiment of an 02M2.SB. V1 sCO$_2$ receiver illustrating that this embodiment successfully passed an integrity test.
Figure 27:
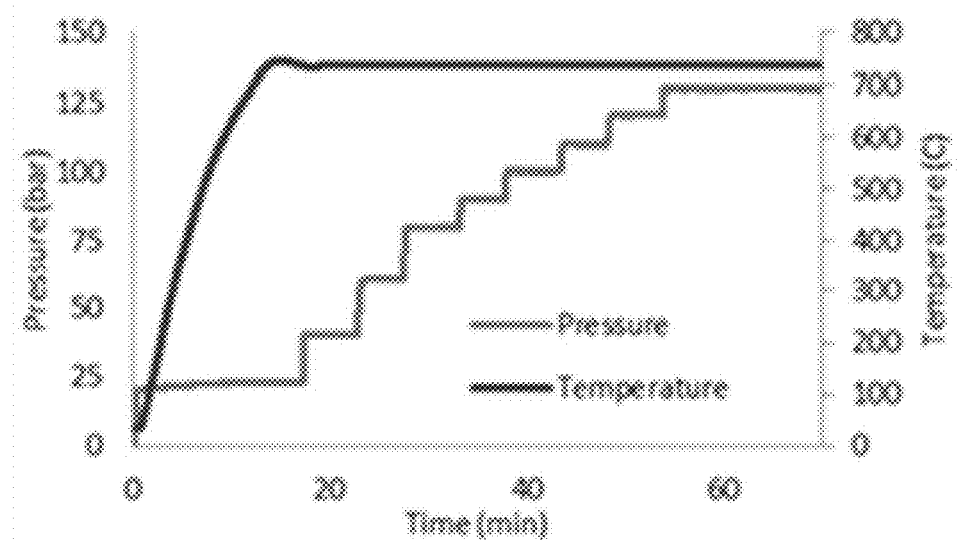
FIG. 27 is a plot of pressure (bar) and temperature (□) versus time (minutes) for a disclosed embodiment of an 02.M1.SA. V1 sCO$_2$ receiver illustrating that this embodiment successfully passed an integrity test.
Figure 28:
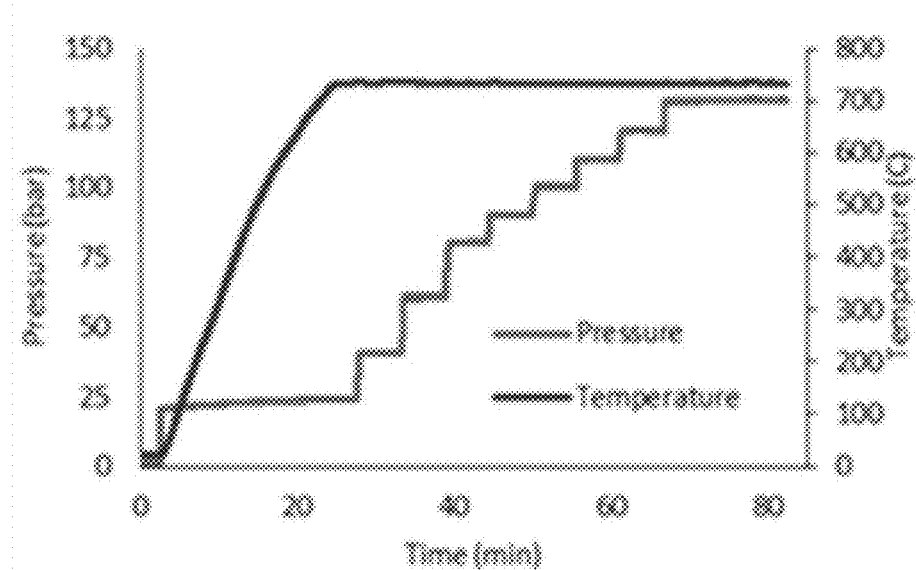
FIG. 28 is a plot of pressure (bar) and temperature (□) versus time (minutes) for a disclosed embodiment of an 02.M1.SA. V2 sCO$_2$ receiver illustrating that this embodiment successfully passed an integrity test.
Figure 29:
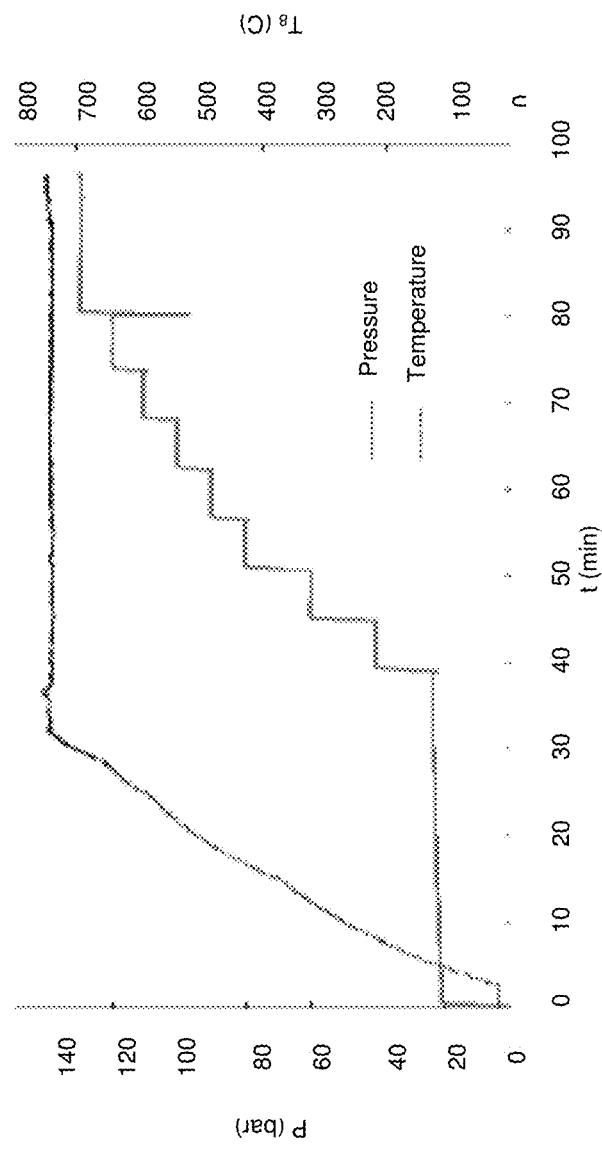
FIG. 29 is a plot of pressure (bar) and temperature (□) versus time (minutes) for yet another disclosed embodiment of an sCO$_2$ receiver illustrating that this embodiment successfully passed an integrity test.
Figure 30:
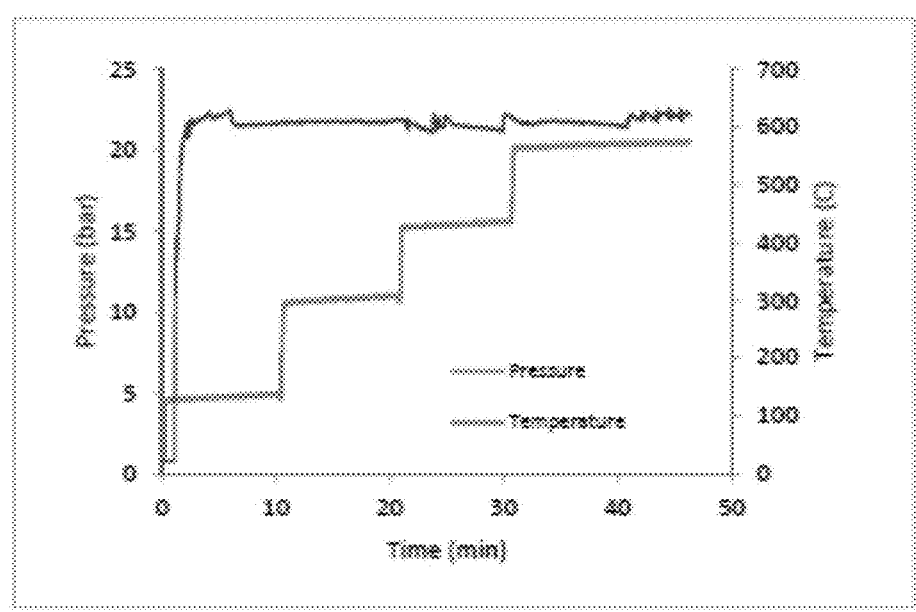
FIG. 30 is a plot of pressure (bar) and temperature (□) versus time (minutes) for a disclosed embodiment of a molten salt receiver illustrating that this embodiment successfully passed an integrity test.

FIG. 24 is a schematic diagram of an sCO$_2$ receiver pressure and temperature test facility 2400. The enclosure was located within a sheet metal frame and inside a large vent hood. The receiver tested was located within the chamber using welded inlet and exit tubes. Test facility 2400 includes a nitrogen tank 2402 fitted with a high pressure line 2406 through a high pressure regulator valve 2404. Nitrogen tank 2402 was connected to the inlet tube 2408, while the exit tube 2410 was connected to an absolute pressure transducer 2412. A propane burner 2414 was supplied with propane from tank 2416 through valve 2418 and line 2420 to heat the test section. A thermocouple 2422 located at the back face of the test section was used to record the surface temperature. Thermocouple and pressure transducer data were recorded using a data acquisition system 2424.

Receiver testing was undertaken in three stages: (a) pressure testing up to 130 bar at room temperature; (b)

temperature testing up to 800° C. at 20 bar; and (c) pressure and temperature testing at 130 bar and 800° C., respectively. ASME Section VIII Div. 1 UG-101 code was followed as closely as possible.

FIGS. 25-30 are plots of pressure (bar) and temperature (° C.) versus time (seconds) illustrating the results of static pressure testing different sCO2 receiver embodiments (FIGS. 24-29) and a molten salt receiver embodiment (FIG. 30) at nominal operating temperatures. FIGS. 25-30 establish that all receivers successfully passed the integrity tests.

In order to perform thermofluidic testing of the disclosed receiver embodiments, a simulated concentrated solar test facility was developed. Two separate flow loops—one for $sCO_2$ and a second for molten salt—were assembled to interface interchangeably with the solar simulator.

F. $sCO_2$ Test Flow Loop

Figure 31:
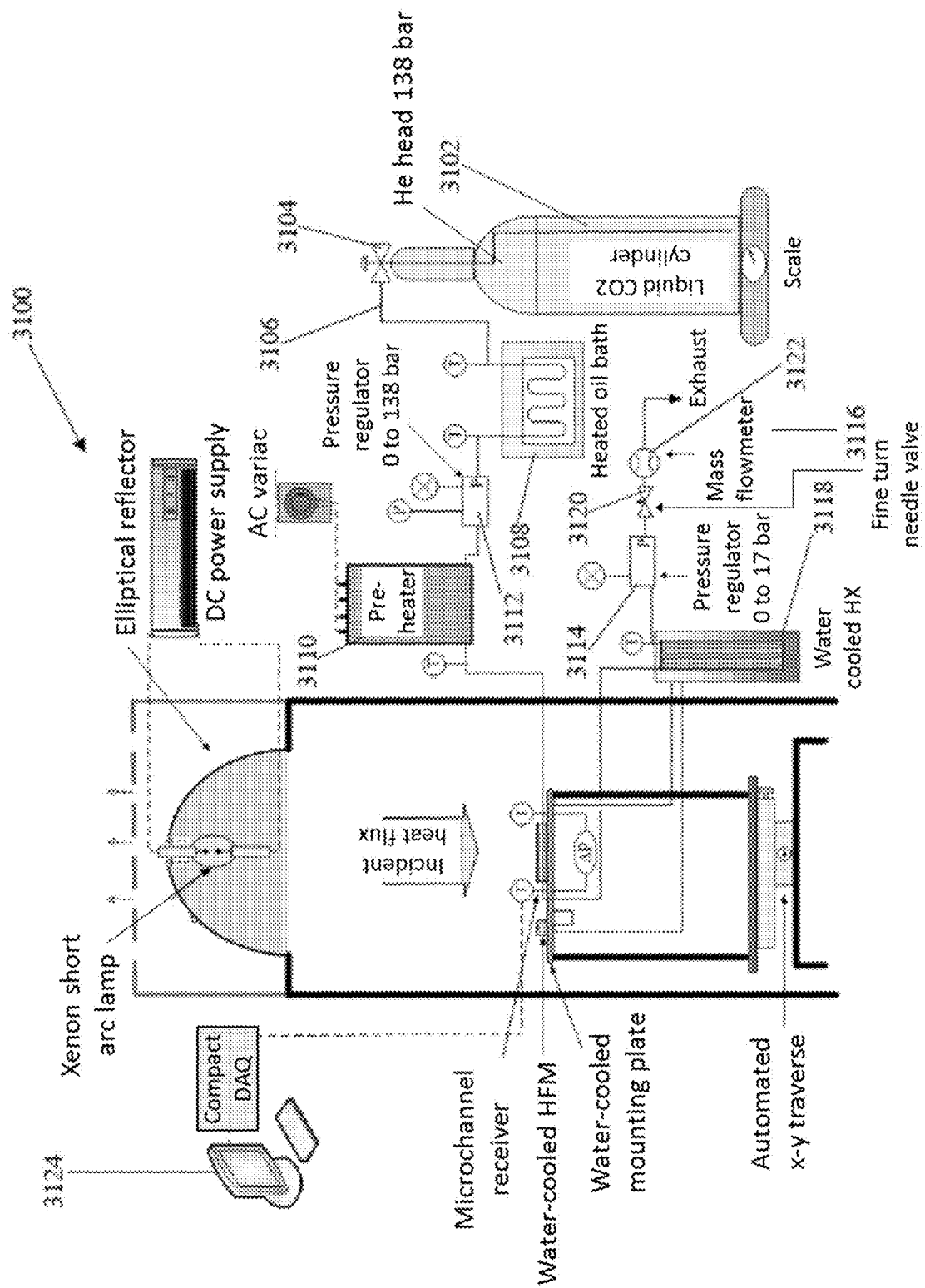
FIG. 31 is schematic drawing of an sCO$_2$ test facility.

A supercritical test facility 3100 is shown schematically in FIG. 31. $sCO_2$ was pressure driven by cylinder 3102 through valve 3104 and line 3106 using a helium-headed $sCO_2$ cylinder. Liquid $CO_2$ at supercritical pressure was heated in two stages. The first stage involved heating the liquid to 50° C. in a hot oil bath 3108. In a second stage, the liquid was subsequently heated to 400° C. in a custom-built preheater. Supercritical pressure within the test section was maintained using two high-pressure regulators 3112, 3114. The first regulator 3112 was used to adjust the cylinder pressure to the desired test condition. The second pressure regulator 3114 was used to maintain the pressure in the receiver section of the facility and to reduce the $CO_2$ pressure to near atmospheric at its exit prior to the flow meter 3116. An absolute pressure transducer was located on the second regulator entrance to measure the line pressure. A dial pressure gauge located on the exit of this regulator was used to monitor the downstream pressure. Past the receiver and prior to the second pressure regulator, the temperature of the fluid was reduced in a water-cooled heat exchanger 3118. A fine-turn needle valve 3120 with a Vernier handle was used to control the flow rate through the test section. Downstream of the valve, the gas was cooled to around 40° C. before entering the pressure regulator. A calibrated Brooks mass flow meter 3122 was used for measuring the $CO_2$ flow rate. Data from the flow meter 3122, pressure transducer, and thermocouples were read directly into data acquisition 3124 having Lab-VIEW (National Instruments) data acquisition software.

Figure 32:
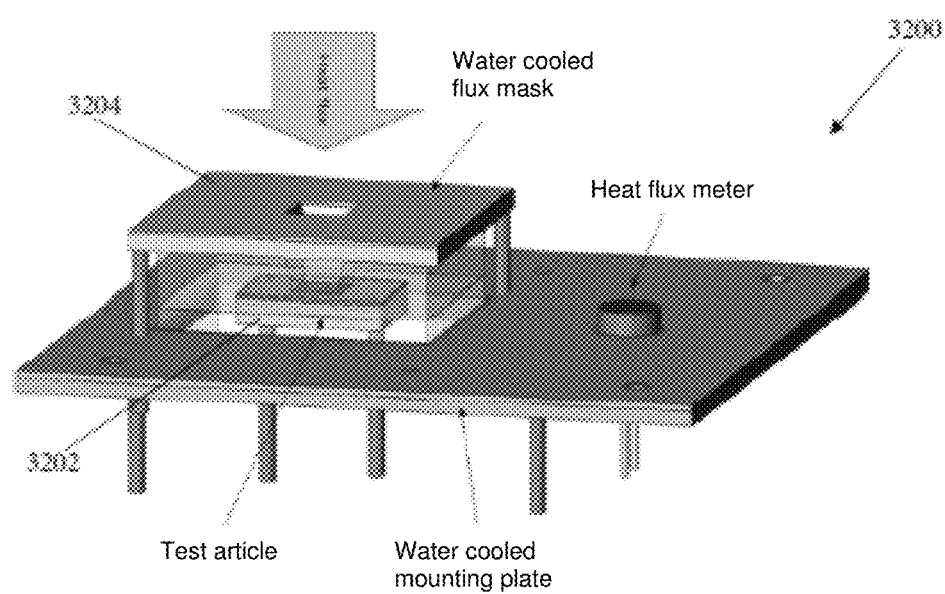
FIG. 32 is a schematic diagram of a solid model of a test article comprising a water cooled flux mask.

In order to provide concentrated flux only over a 2 centimeter×2 centimeter area of a test receiver 3202, a 21 millimeter×21 millimeter water-cooled flux mask 3204 was located 1.5 cm above the receiver as shown in FIG. 32. Seven thermocouples were located on the body of the receiver and in the inlet and exit tubes and their locations are indicated in FIG. 32. Four of these thermocouples were located under insulation on the side of the receiver that received the concentrated flux. An average of these four thermocouples was considered representative of the receiver surface temperature.

G. Molten Salt Test Loop

Figure 33:
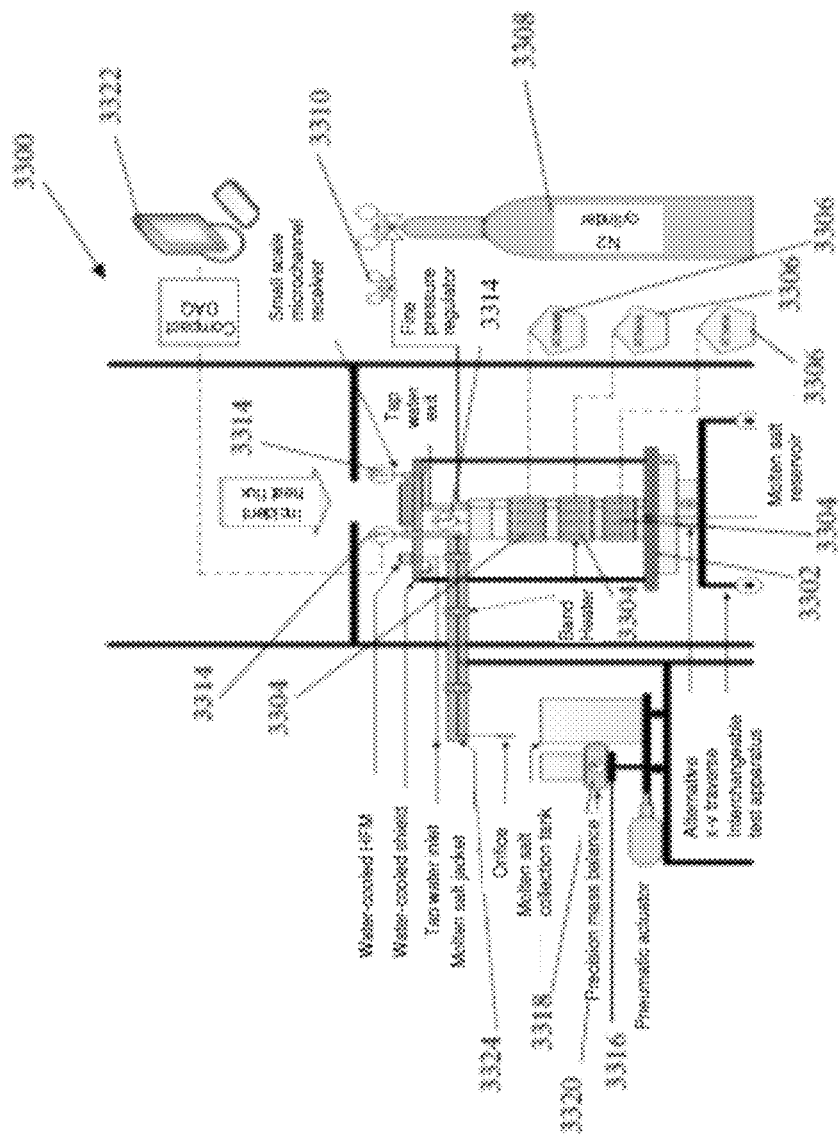
FIG. 33 is a schematic diagram of a molten salt loop.

An open-loop molten salt test facility is shown schematically in FIG. 33. A person of ordinary skill in the art will understand that any molten salt now known or hereafter developed can be used to implement disclosed embodiments. For example, the molten salt may be a Dynalene salt, such as Dynalene MS-1, MS-2, or MS-450. Dynalene MS-1 comprises potassium nitrate and sodium nitrate, such as 20-80% potassium nitrate and 20-80% sodium nitrate. Dynalene MS-1 has a recommended operating temperature range between 245° C. and 565° C. Dynalene MS-2 comprises potassium nitrate, sodium nitrate, and lithium nitrate, such as 20-80% potassium nitrate, 10-60% sodium nitrate, and 5-30% lithium nitrate. Dynalene MS-2 has a suggested operating temperature of 130° C. to 500° C. Dynalene MS-450 comprises potassium nitrate, sodium nitrate and calcium nitrate, such as 20-80% potassium nitrate, 5-30% sodium nitrate, and 10-60% calcium nitrate. Dynalene MS-450 has a suggested operating temperature of 150° C. to 450° C. Another example of a suitable salt is $NaCL-KCl-ZnCl_2$ eutectic salt. One embodiment of a particular $NaCL-KCl-ZnCl_2$ salt comprised, in terms of mole fraction, 13.3% NaCl, 41.9% KCl and 44.3% $ZnCl_2$.

With particular reference to FIG. 33, the molten salt used was Dynalene MS-1. The high freezing temperature of the salt (237° C.), coupled with low mass flow rates through the loop salt, imposed certain thermal regulation constraints in the design of the test loop. A 6-liter stainless steel molten salt reservoir 3302 was heated using four high-temperature band heaters 3304 that were controlled using AC variacs 3306. The molten salt was pumped through the loop using a pressurized head of nitrogen from nitrogen reservoir 3308. A precision turn regulator 3310 for the nitrogen was used to provide fine control of the molten salt flow rate. The pressure head causes the molten salt to exit the reservoir through a draw tube 3312. Nitrogen also acted as an inert gas blanket to prevent oxidative degradation of the molten salt as well as reduce metal corrosion. Thermocouples 3314 were used to monitor the temperature of the molten salt and the exterior surface of the reservoir. The flow rate was determined using a catch-and-weigh technique by collecting exiting molten salt from the receiver onto a collection container 3316 atop a precision mass balance 3318. A computer-controlled pneumatic actuator 3320 was used to switch between an exit reservoir and the collection container 3316. Since the timing of the actuator was controlled via a computer 3322, accurate time of mass collection, down to the actuator response time of 1 second, was achieved. Upon exiting the receiver, in order to prevent refreezing of the salt prior to mass collection, a jacket of molten salt 3324 was used to keep the salt above the freezing point. In addition to four band heaters 3304 on the tank 3302, initially four additional band heaters (not shown) were used on the molten salt jacket to keep the molten salt above its melting temperature. Furthermore, two rope heaters (not shown) were used to preheat the tubing section entering and exiting the test article.

A final molten salt test loop comprised a more robust thermal regulation system comprising a custom built heater made of brass. Two blocks of brass were machined to allow flow to and from the test article, with thermocouple ports to measure salt temperature very close to the test article inlet and outlet. The brass was heated with several ¼" cartridge heaters. Each block's temperature was monitored and individually controlled by separate power sources in order to maintain a similar temperature to that of the salt leaving the reservoir.

H. Separate Effects Testing

Results of the $sCO_2$ and molten salt lab-scale receiver tests establish that receiver thermal efficiencies in excess of 90% at absorbed fluxes of approximately 100 $W/cm^2$ are possible with $sCO_2$ as the working fluid. With the molten salt test article, test results established that the molten salt design can operate at 400 $W/cm^2$ of incident flux and have a receiver efficiency greater than 94%. These values are for a receiver without an optical coating. The results are consistent with receiver efficiency between 90% and 95% for a flux of 400 W/cm² and using a coating, such as Pyromark. Heat transfer coefficients could not be obtained with any degree of certainty since there was no reasonable measure of the insulation surface temperature. Thermocouples were placed on the surface within the insulated area and were not a good measure of the temperature on the insolated surface. Efficiency was deemed to be the main measure of performance of the lab scale receivers. A separate effort is being undertaken to quantify single-phase heat transfer coefficients and pressure drops within pin fin receiver (heat sink) geometries.

I. sCO₂ Results

Figure 34:
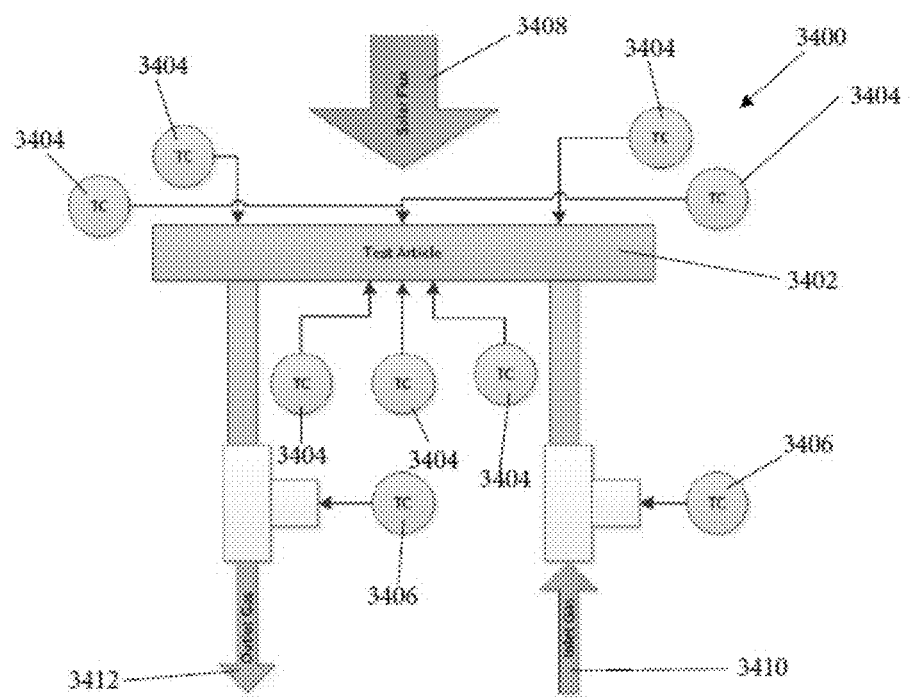
FIG. 34 is a schematic drawing of an sCO$_2$ test article showing the location of the surface and fluid measurement thermocouples.

FIG. 34 is a schematic of the sCO₂ test article 3402 showing the location of plural surface thermocouples 3404 and fluid measurement thermocouples 3406. FIG. 34 further illustrates a solar flux, or simulated solar flux, 3408 impinges the test article 3402. The testing design also included an inert gas inlet 3410 and a gas outlet 3412. During preliminary tests with disclosed embodiments, heat loss on the order of 10% of incident heat occurred through the insulation. The heat loss was largely a result of the small ratio of the surface area for incident flux to that of the test section. Since in a commercial scale receiver such insulation losses can be minimized, if not eliminated, the thermal and receiver efficiency definitions were modified to account for the insulation losses. Efficiency numbers, corrected for such thermal losses through the insulation, would be more representative of commercial scale receiver efficiencies that can be obtained using microchannels. The inefficiencies would then arise solely due to the re-radiation and convective losses from the surface of the receiver that is exposed to the simulated solar flux. Upon correction for heat losses, a modified receiver efficiency is defined as the heat gained by the fluid to the net heat incident on the receiver (Eqn. 1).

$$\eta_{rec,exp} = \frac{q_{fluid}}{q_{in,net}} = \frac{\dot{m}_{sCO2}(h_{out} - h_{in})}{q_{incident} - q_{loss}} \quad \text{(Eqn. 1)}$$

Net heat is determined by subtracting thermal losses from the incident heat rate. Similarly, the modified thermal efficiency was defined as (Eqn. 2).

$$\eta_{th,exp} = \frac{q_{fluid}}{q_{abs,net}} = \frac{\dot{m}_{sCO2}(h_{out} - h_{in})}{\alpha q_{incident} - q_{loss}}. \quad \text{(Eqn. 2)}$$

Figure 35:
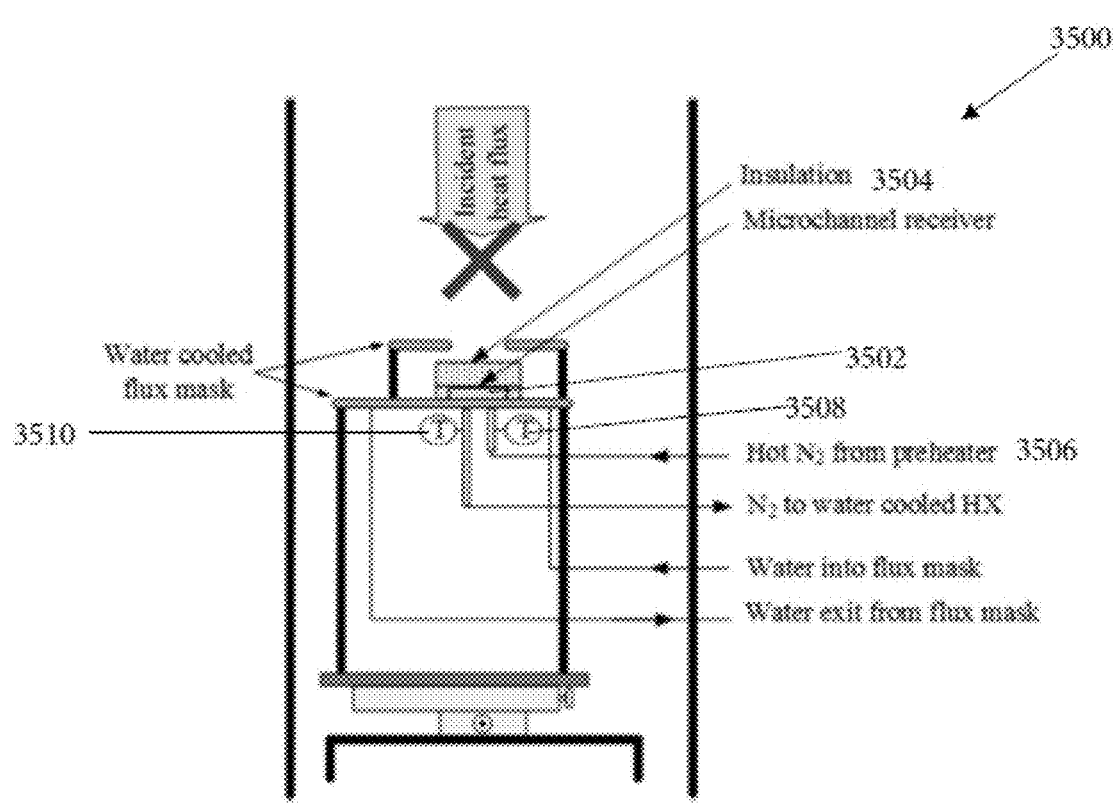
FIG. 35 is schematic drawing of a facility for in-situ heat loss calibration illustrating that the entire receiver was insulated and no concentrated flux was applied.

In order to estimate heat losses through the insulation, a separate heat loss calibration experiment was performed for each of the lab-scale test articles. A schematic representation of the test facility 3500 for heat loss calibration for a receiver 3502 is shown in FIG. 35. The upper 2 centimeter×2 centimeter surface of the receiver 3502 that is exposed to concentrated radiation in the sCO₂ experiments was thoroughly insulated with insulation 3504 for the heat loss experiments. The remainder of the receiver insulation was identical to that during the sCO₂ tests. A heated nitrogen gas stream 3506 was flowed at a metered flow rate through the receiver 3502 and an exit nitrogen stream flowed to a water cooled heat exchanger (not shown). The test facility also included thermocouples 3508 to measure inlet gas temperature and thermocouples 3510 to measure outlet gas temperature. Seven thermocouples were located on the body of the receivers and temperatures from these seven thermocouples were averaged to represent the body temperature at which the heat loss was determined. The temperature drop of the gas at the exit of the receiver at steady state was recorded and heat loss determined.

Figure 36:
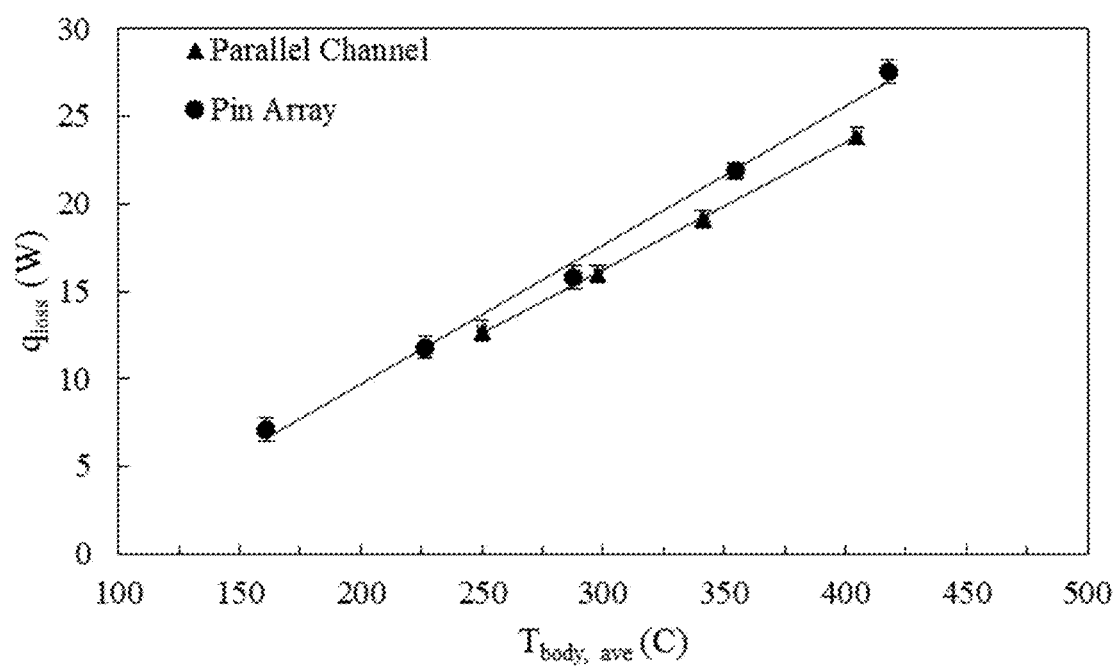
FIG. 36 is heat calibration curve plotting heat loss (W) versus temperature (° C.) for two receiver embodiments according to the present invention.
Figure 37:
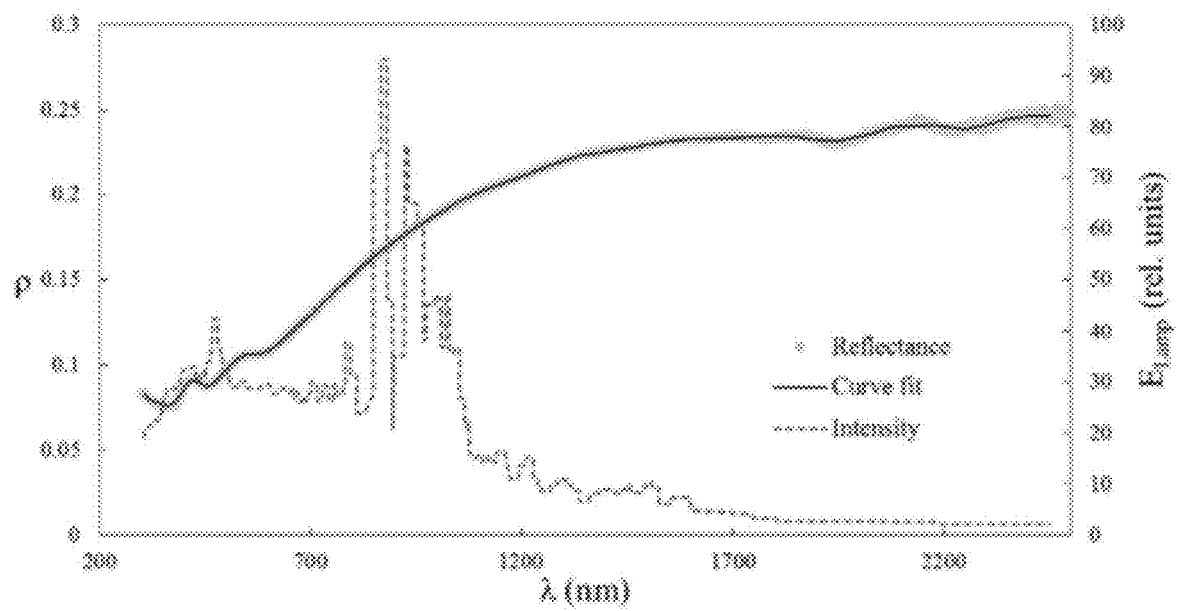
FIG. 37 is a plot illustrating the spectral dependence of a bare Haynes 230 surface reflectivity and lamp out-put.

FIG. 36 is a heat calibration curve illustrating estimated heat losses as a function of average body temperature. A best fit curve that represented the data was used to estimate heat losses in the sCO₂ experiments. The curve fit is linear, indicating that heat loss was by conduction through the insulation. The heat loss experiments were restricted to temperatures of about 400° C., the highest gas temperature possible with the preheater. However, since the curve fit was linear, the heat loss projections were extrapolated to higher surface temperatures (600° C.-750° C.) seen in actual experiments. The slight difference in slope of heat loss between designs is attributed to the variation of insulation during setup of the two separate experiments.

Initially an optical coating, Pyromark 2500, was applied to the receiver surface. During testing, the coating began to degrade and provided unreliable surface reflectivity. Since no other alternative was readily available at the time of testing, the receiver surface was lapped to bare Haynes 230. A method of applying Pyromark 2500 onto Haynes 230 was successfully implemented later. To fully discolor the surface, a burn-in cycle of the surface was performed by running a high flux trail first until a steady state was achieved. Once data collection for both heat loss and efficiency was complete, the reflectivity of the bare Haynes was assessed using a spectrophotometer (JASCO UV-670), with a manufacturer stated accuracy of 0.3% for transmittance measurement and 0.05 nm for wavelength. Reflectance was measured at room temperature and at a single angle of approximately 10° off normal. In order to obtain a surface reflectance, the device was cut using wire EDM so the channel section could be placed into the spectrophotometer part holder. Numerical integration of the device surface reflectivity and the spectral variation of irradiation from the Xe arc lamp provided a spectrally-averaged reflectivity of the device (Eqn. 3), $$\rho_{Haynes} = \frac{\sum (\rho_{\lambda,Haynes} \cdot E_{\lambda,Lamp} \cdot d\lambda)}{\sum (d\lambda \cdot E_{\lambda,Lamp})} \quad \text{(Eqn. 3)}$$

Figure 38:
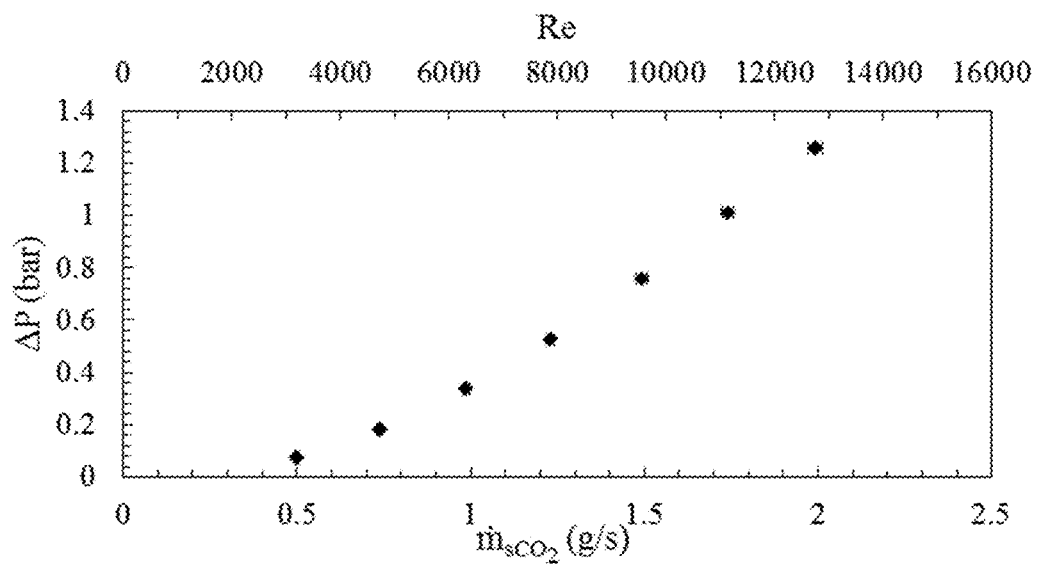
FIG. 38 is plot of change in pressure (bar) versus mass flow rate of sCO$_2$ (g/s) for an array illustrating that the pressure drop increases with an increase in mass flow rate.

To perform the integration, an eight term Fourier curve fit was generated using Matlab's built-in curve fitting software applied to the Haynes reflectivity data. This curve fit was then used to numerically integrate at the same wavelengths as the lamp output. Curves of spectral dependence of reflectivity and lamp irradiation are shown in FIG. 38, and integration provided a $\rho_{Haynes}$ of approximately 0.172. The absorptivity, for use in Eq. 2, was evaluated based on this surface reflectivity and the assumption of opacity of the surface.

1. Uncertainty Analysis

Thermocouples reading the fluid temperatures were calibrated using a NIST-traceable hand held calibrator (Omega, PCL-1B) as a standard. The calibration error included errors associated with the calibrator, the calibration precision error and the curve fit error. The differential and absolute pressure transducers and both the volumetric and mass flow meters were factory calibrated.

The Kline and McKlintock error propagation method was used to determine uncertainties in the calculated parameters based on the bias and precision errors of the measured variables. Uncertainties in measured parameters were obtained by combining the measurement precision calibration errors in a root-sum-square manner. Engineering Equation Solver (EES, Fchart Inc.) was used to perform the propagation of errors. Maximum uncertainty in measured variables was propagated into the dependent variables. Representative measurements of the uncertainty are provided in Table 3.

TABLE 3

Representative Measurement Uncertainty Estimate

| Measurement | Maximum Uncertainty (±) |
| --- | --- |
| Volumetric flow rate ($N_2$) | ±0.115 slpm (0.32%) |
| Mass flow rate ($sCO_2$) | ±0.0114 g/s (1.0%) |
| Average gas temperature | ±0.46 C. (0.12%) |
| Surface temperature | ±2.81 C. (0.4%) |
| Heat flux | ±4.5 $W/cm^2$ (6.17%) |
| Absolute pressure | ±0.35 bar (1.63%) |
| Pressure drop | ±0.004 bar (6.28%) |

2. Pressure Drop

Pressure drop for a pin fin array embodiment was obtained using a high line pressure differential pressure transducer (Validyne P55E-1N246S4A). Pressure drop experiments were run separately from efficiency experiments to reduce heat loss in the latter. Flow was held at approximately 100° C. to ensure the gas was above critical temperature and pressure was matched to that used in efficiency experiments. FIG. 38 establishes that the pressure drop increases with an increase in mass flow rate. The pressure drop is also plotted against Reynolds number based on hydraulic diameter $Re_{D_H}$, for reference. For typical heat transfer experiments, where the flow rate is about 1 g/s, the pressure drop across the receiver is under 0.5 bar. The Department of Energy (DOE) Sunshot office provided an upper pressure drop limit of 4 bars. Similar pressure drops can be expected in larger scale receivers since the flow through the micro pin fin regions occur in a parallel network. Based on $Re_{D_H}$, the flow is expected to be in the transitional to turbulent regime through the pin fin receiver. Given that most of the correlations for pressure drop and heat transfer rate in micro-pin fin heat sinks have been developed for a laminar flow regime, there is a need for expanding the correlation database to cover the transitional and turbulent regimes as seen with the present $sCO_2$ receivers.

3. Heat Transfer

Figure 39:
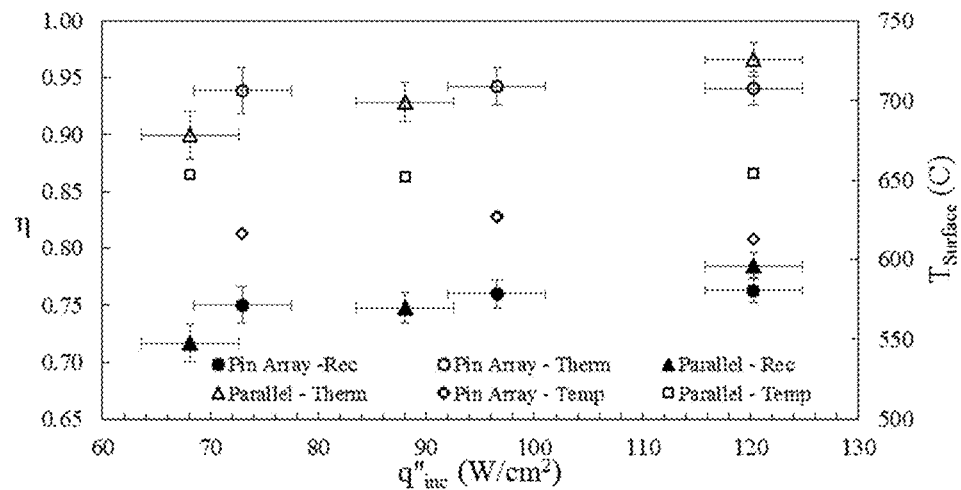
FIG. 39 illustrates receiver and thermal efficiency with variation of incident flux at a fixed exit temperature of ~650° C., and including the average surface temperature of the relevant device.
Figure 40:
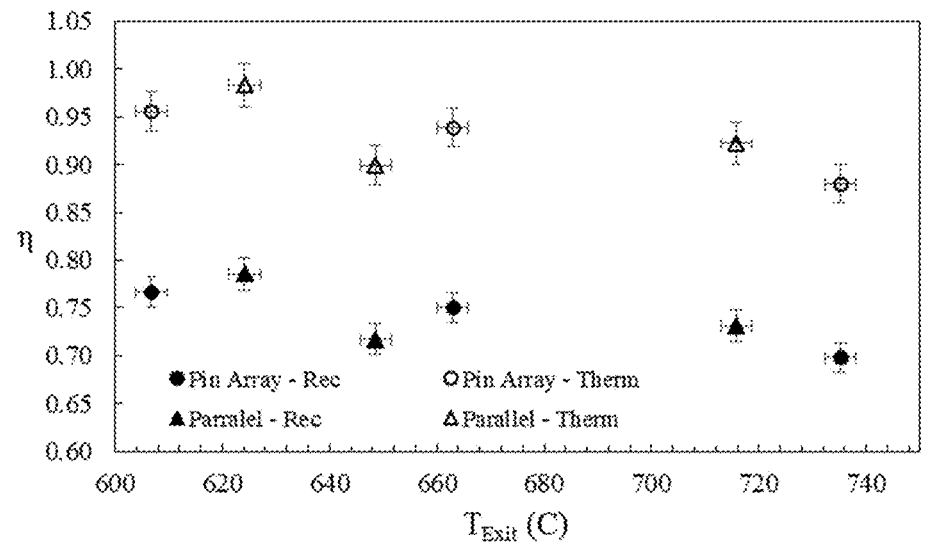
FIG. 40 illustrates receiver and thermal efficiency variation with exit temperature at a fixed incident flux of 68.1 W/cm2 for a parallel channel device and 72.95 W/cm$^2$ for a pin array.

Parallel channel and pin-fin array receiver embodiments were characterized for efficiency in the $sCO_2$ test facility. FIGS. 39 and 40 summarize data obtained for these receivers. Two main parameters were varied: the incident flux at a fixed fluid exit temperature (FIG. 39); and fluid exit temperature at a fixed input flux (FIG. 40). In all cases the inlet fluid temperature was maintained at approximately 400° C. and the receiver pressure was maintained between 81-86 bar. While these were the test conditions, the receiver could operate with sCO2 inlet conditions between 100 and 600° C. and an inlet pressure up to 250 bars As shown in FIG. 39, both thermal and receiver efficiency increase with increasing heat flux. The thermal efficiency for the parallel channel varies from 89.9% at 68.1 $W/cm^2$ to about 96.6% at 120.3 $W/cm^2$, while the receiver efficiency increases from 71.7% to 78.4% over this same range of heat fluxes. The thermal efficiency for the pin array receiver is largely constant around 94% with variation in heat flux from 73 $W/cm^2$ to 120 $W/cm^2$. With an increase in irradiation, the amount of heat transferred to the working fluid increases; however, there is not much variation in surface temperature. The negligible change in receiver surface temperature results in a negligible variation in re-radiation and natural convective losses from the 2 centimeters×2 centimeters exposed area. However, since the flux is increasing, an increase in efficiency with incident heat flux increase is observed, as per Eq. 2. The ability to be able to absorb high incident fluxes at a fixed surface temperature is a crucial advantage of the microchannel receivers.

The receiver efficiency is for a bare surface and not with a high absorptivity coating. Since the intent was to demonstrate that the use of microchannels permits removal of high incident fluxes at high efficiency, the metric that really matters is the thermal efficiency, since this is independent of the receiver coating.

FIG. 40 shows the variation of thermal and receiver efficiency for a fixed input heat flux but varying exit temperatures. The exit temperature variation is by varying the mass flow rate of $sCO_2$. Variation in the exit temperature for a fixed inlet temperature and input heat flux caused changes to the surface temperature. Lower exit temperatures result in lower surface temperatures, and thereby increased efficiencies as per Eq. 2. The trend in FIG. 40 shows that a reduction in thermal and receiver efficiency observed due to increased losses is commensurate with the increase in surface temperature. The thermal efficiency of a pin array embodiment drops from 95.5% at a receiver exit fluid temperature of 606° C. to 89% at an exit fluid temperature of 735° C. The thermal efficiency of a parallel channel embodiment drops from 98.3% at a gas exit temperature of 624° C. to 92.2% with an exit temperature of 715° C. The non-uniform drop in efficiency for the parallel channel as compared to the pin array may be due to experimental error in the data at a surface temperature of 650° C. Regardless, thermal efficiencies of around or above 90% were achieved for both MSR designs at exit fluid temperatures of 735° C. The ability of the microchannel receiver to reduce the diffusion resistance in the fluid results in a reduced surface temperature for a fixed flux resulting in an increased efficiency.

In summary, both Option 2 and Option 3 receiver designs absorb fluxes as high as 100 $W/cm^2$ with thermal efficiencies in excess of 90%. Several such receiver units may be connected in parallel through appropriate fluidic headers to create a large scale commercial microscale receiver. Pressure drop through the pin fin lab scale receiver has been shown to be under 0.5 bar, which is about 0.5% of the inlet pressure of the fluid for commercial receivers.

J. Molten Salt Embodiments

The results presented below are data taken at lower fluxes and temperatures than those that will be used in final embodiments, but they do demonstrate the technical feasibility of the concept and are consistent with the projected performance of the device operating at higher incident fluxes and temperatures.

Figure 41:
FIG. 41 is plot of temperature (° C.) versus time (S) illustrating molten salt temperatures under 83 W/cm$^2$ flux with a flow rate of 0.43 g/s.

Molten salt tests were first performed at lower heat fluxes and molten salt temperatures owing to the degradation of the reflector. FIG. 41 provides time series data from one test with the average incident heat flux over the $cm^2$ test section of 83 $W/cm^2$. The salt flow rate was fairly stable during that recording period, as indicated by the stable temperatures. However, the measured receiver efficiency of approximately 70% is significantly below the expected values of over 90%. The low efficiency was caused by: 1) the test article was not coated with a high absorptivity optical coating and had 17 to 25% reflection losses; 2) the flux was approximately one fifth of the design flux; and 3) conduction losses through the test article insulation. Conversely the test article was being tested at a molten salt temperature well below design capabilities.

Figure 42:
FIG. 42 is a plot of temperature (° C.) versus time (S) illustrating molten salt temperatures under 150 W/cm$^2$ flux with a flow rate of 0.879 g/s.

FIG. 42 provides results for one of the tests with a salt flow rate of 0.879 g/s but the heat flux was increased to 150 W/cm$^2$ over the 1 cm$^2$ test area (this is the maximum heat flux attainable by the corroded reflector). As shown, the salt entered the receiver at around 290° C. and exited from the receiver at around 370° C. The averaged receiver efficiency was also around 70%.

Figure 43:
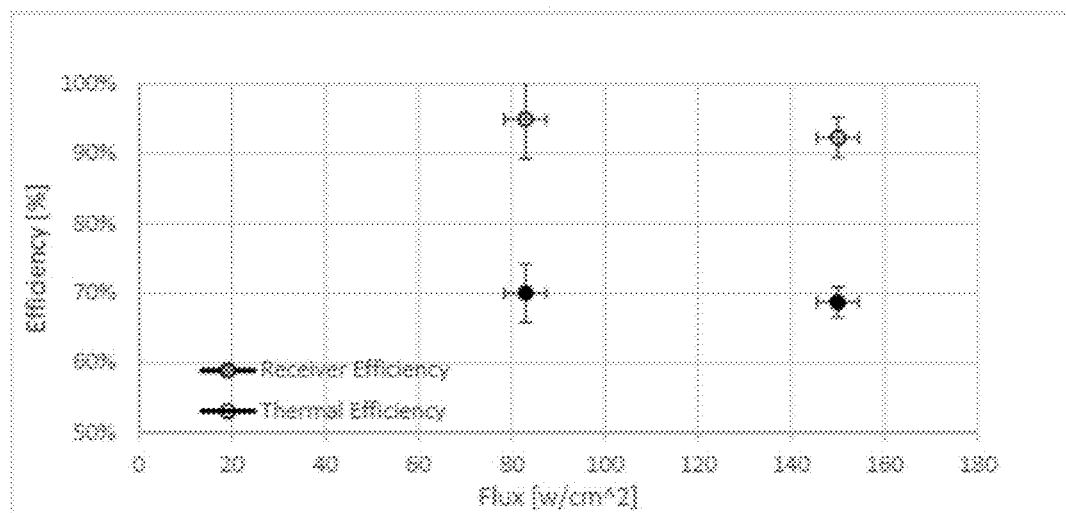
FIG. 43 is a plot of efficiency (%) versus Flux (w/cm$^2$) illustrating molten salt receiver efficiency (bare metal, no coating) and estimated thermal efficiency under different solar heat flux.

Since proper processes of coating test articles with an optical coating, such as Pyromark, were identified, molten salt receiver embodiments have been coated for further testing. With assumption of 25% reflectivity or 75% of absorptivity during the tests, the estimated molten salt receiver thermal efficiencies and measured efficiencies for two different incident fluxes are plotted in FIG. 43.

K. Integrated Test Article Design and Fabrication

Figure 44:
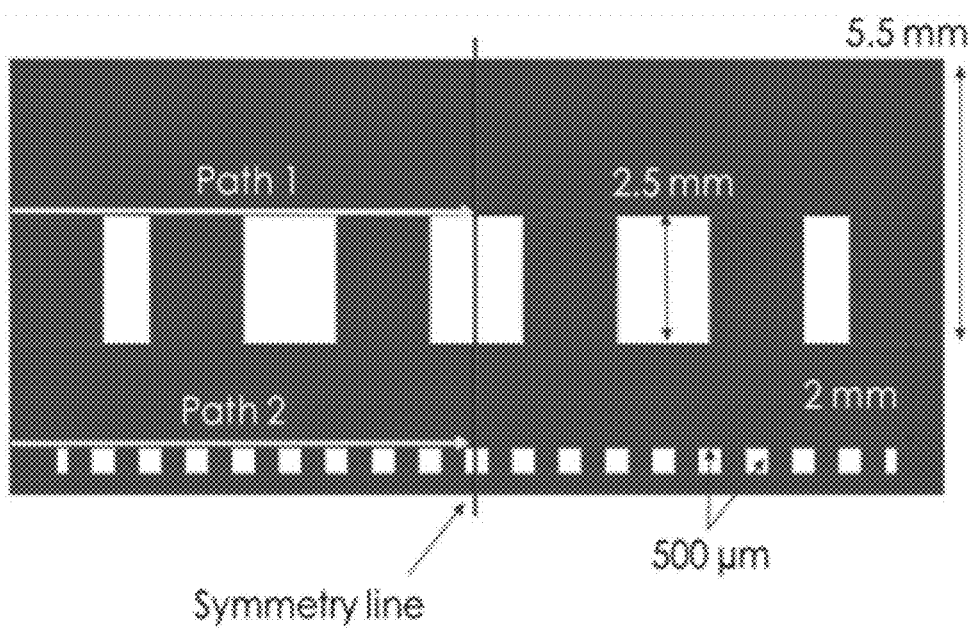
FIG. 44 is a schematic diagram illustrating an embodiment of a simulated plenum region and a pin fin microchannel region
Figure 45:
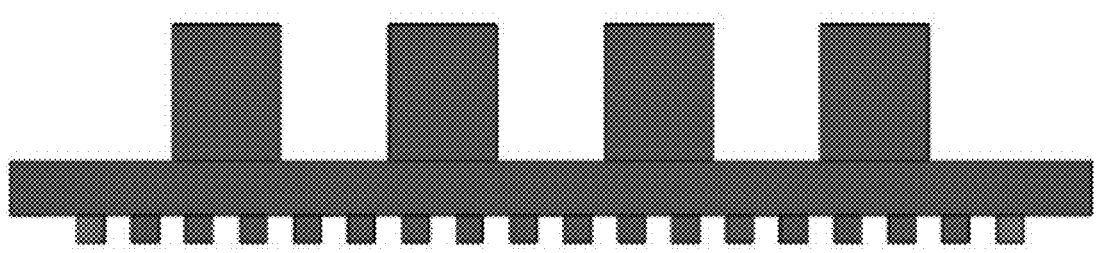
FIG. 45 is a front schematic view of a mid-layer design in an embodiment according to the present invention.
Figure 46:
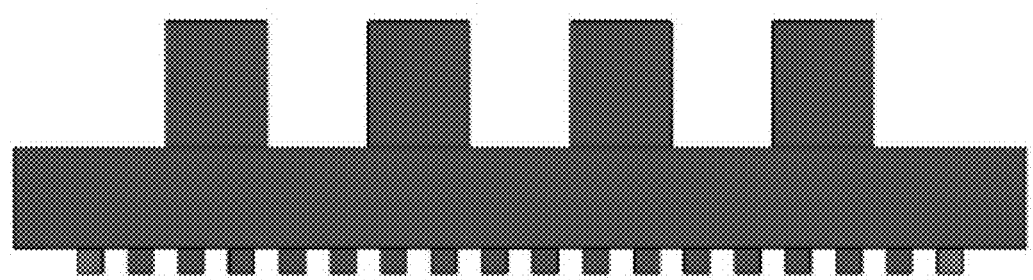
FIG. 46 is a front schematic view of a mid-layer design in an embodiment according to the present invention.

Certain disclosed embodiments included flow headers to multiple unit cells to ensure satisfactory mechanical integrity and flow distribution amongst unit cells. One addition in the design consideration in this integrated design compared to a 2 centimeter×2 centimeter design was that the header sections would be located above the micropin fin flux absorber unit cells (see FIG. 44 as an example). The header section has to have a larger volume (lower pressure drop) compared with the micro pin fin section for adequate flow distribution in the micro-pin fin unit cells. There are at least two options for increasing the header volume: (1) increase spacing between the pins and make the pins larger in diameter to withstand the pressure; or (2) increase the aspect ratio of the pins but retain the same pin spacing as in the micro pin fin region. Either of these options places a constraint on diffusion bonding, with the latter option causing a potential for buckling in the header regions. During diffusion bonding, a transfer of forces has to occur from one layer to the next in the stack. In the first option, since header regions with larger pins have to be bonded together with microscale pins, it is critical to determine whether a good bond will be achieved in the microscale layers that are located under the regions of large plenum voids (see FIG. 44). The thickness of the metal between the plenum and the micro pin fin channel affects the uniformity of pressure distribution along Path 2 in FIG. 44. Hence, test articles were fabricated using SS316 with varying wall thicknesses separating the plenum and micropin regions. A fourth test article with pins of identical dimensions in the header and the micropin regions also were fabricated (option 2). In this case, the transfer of forces was expected to occur; however, the large aspect ratio of the plenum fins, needed to reduce the plenum pressure drop, was of concern for buckling. FIGS. 45-49 are schematics drawings of fabricated test articles.

Certain factors to be considered using these embodiments included: (a) burst strength of the four devices, (b) section the devices to determine the differences in dimensions and potential local bonding inconsistencies in the plenum and micro pin regions. It was also of interest to see if the structural analysis simulations could be validated by the burst tests; however, this task could not be accomplished since the test articles did not fail (see discussion below).

Figure 47:
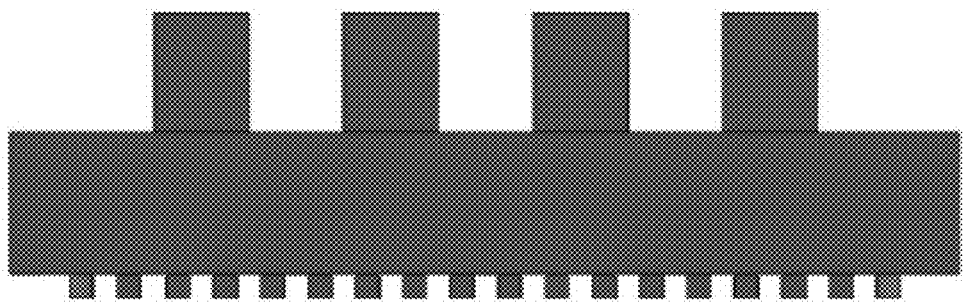
FIG. 47 is a front schematic view of a mid-layer design in an embodiment according to the present invention.
Figure 48:
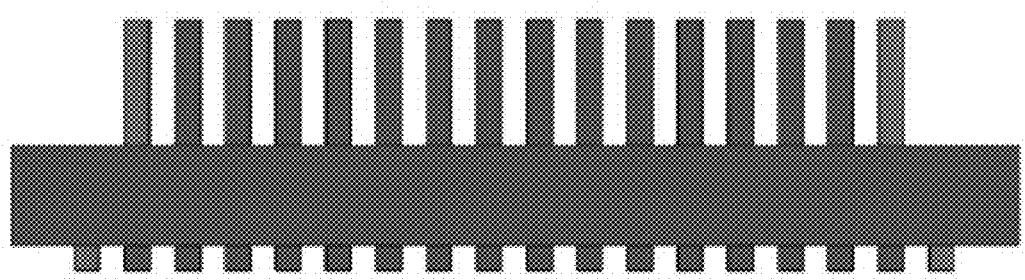
FIG. 48 is a front schematic view of a mid-layer design in an embodiment according to the present invention.
Figure 49:
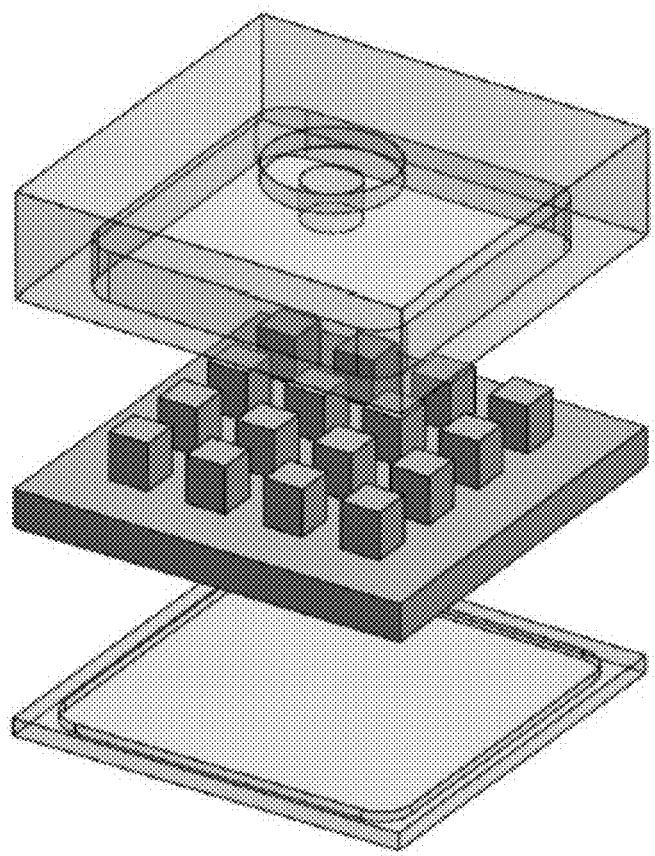
FIG. 49 is an exploded perspective view of an embodiment according to the present invention.

The first embodiment to be bonded was the embodiment illustrated in FIG. 47 having a 3 mm wall thickness. Due to the large strain imparted to the test section (~25%) in the initial bonding recipe used, this test article did not provide usable data as the fluid pathways in the microscale region were too distorted. Sample SS 316 pieces of comparable thicknesses were then bonded to determine appropriate bonding parameters for the rest of the test embodiments. The following bonding parameters were followed consistently for three test articles:

1. use a 1050° C. bond temperature with a 1 hour soak time at 1050° C.;
2. use a 2.10 MPa pressure for 3 hours; and
3. remove all loads for cooling; cooling at 5° C./minute.

The above process parameters resulted in an overall imparted strain (measured using digital calipers) of approximately 4.5 percent. Once the three test articles were bonded, burst tests were performed, and the test articles were subsequently sectioned for detailed measurements using an optical profilometer.

Figure 50:
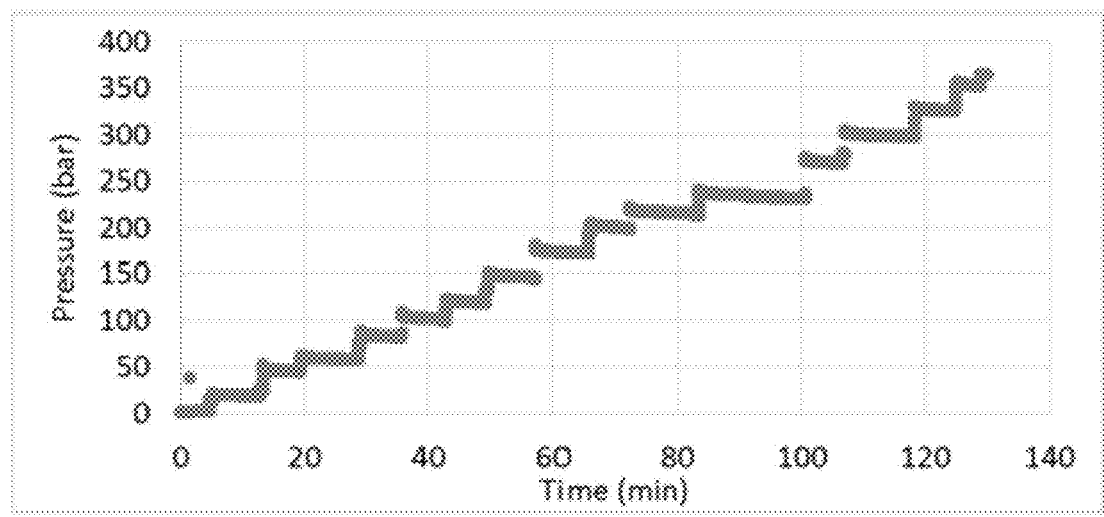
FIG. 50 is a plot of pressure (bar) versus time (minutes) illustrating pressure test results for an embodiment of the present invention.
Figure 51:
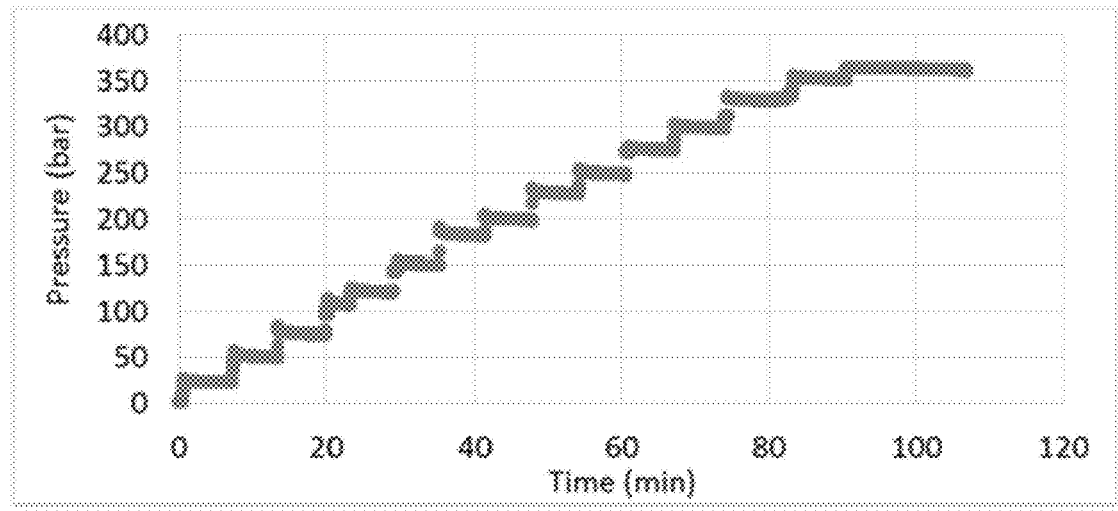
FIG. 51 is a plot of pressure (bar) versus time (minutes) illustrating pressure test results for an embodiment of the present invention.
Figure 52:
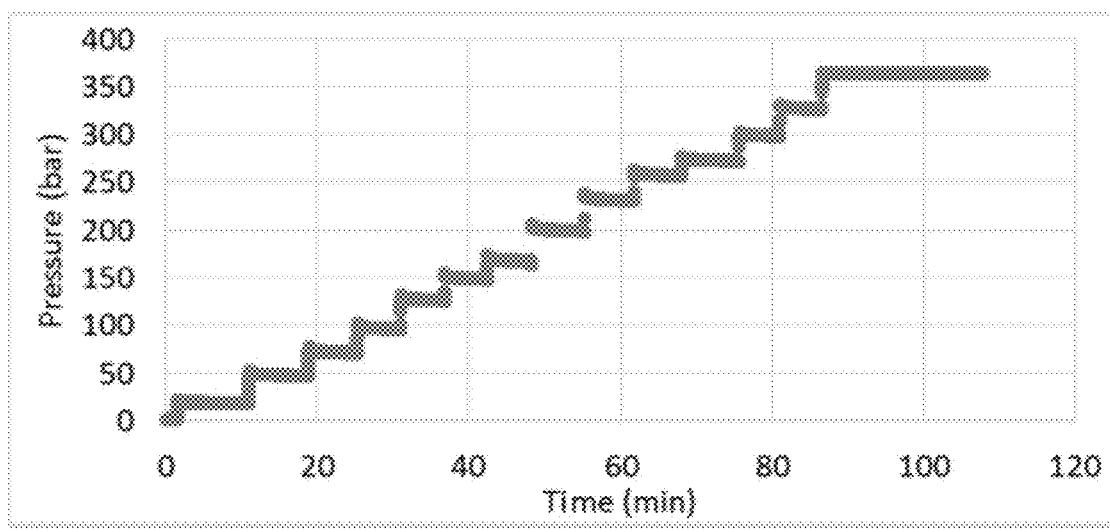
FIG. 52 is a plot of pressure (bar) versus time (minutes) illustrating pressure test results for an embodiment of the present invention.

Pressure tests were performed using a hand pump and water as the working fluid. The test embodiments were placed within a chamber to protect the operators in case of a catastrophic failure of the device. Pressure data was recorded digitally for the duration of the experiment. FIGS. 50-52 provide the results from the pressure tests. As seen from these results, all three test sections survived pressure tests up to 360 bar, well above the design pressure of 200 bar. This was the highest pressure that could be tested using the facility. Upon sectioning, optical profilometry indicated that the test section comprising large aspect ratio pins in the headers had buckled during the diffusion bonding; hence, this option was not considered for the header design for the integrated test article. On the other hand, the images of the pins in the header and the micropin regions of the test articles with the 1 mm and 2 mm wall thicknesses (FIGS. 45 and 46) showed no visually-observable defects such as incomplete bonding in the fluidic regions of the header or bucking of the header pins. This results establish that a 1 or 2 mm wall thickness between the header and microscale region in the larger scale sCO$_2$ receiver can resist the pressures incurred during typical processes.

L. 8 Centimeter×8 Centimeter Test Article—Example 1

Based on the pressure testing described above, an integrated receiver embodiments was fabricated with a conservative wall thickness of 3 mm between the microscale pin fin regions and the header regions. A three layer pin-fin design was used to make an 8×8 cm$^2$ receiver wherein two plates were used to define flow distribution headers and a third plate was the micro-pin fin flux absorber plate. Each unit cell was 4 cm long×8 cm in depth in this design. In order to have uniform flow distribution in the pin array, the pressure drop in the distributer headers is preferably smaller, and even more preferably significantly smaller, than the pressure drop across the pin fin arrays.

Figure 53:
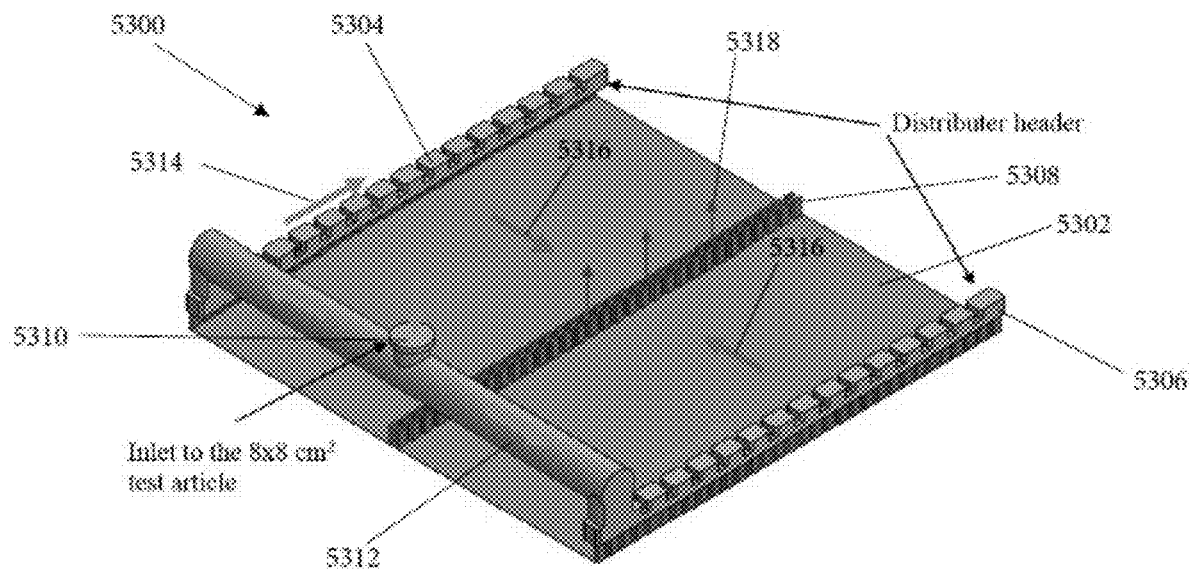
FIG. 53 is a schematic perspective view of an 8×8 cm$^2$ embodiment of an article according to the present invention having 2 unit cells each comprising distributor headers illustrating fluid passage to and through the cells.

A schematic perspective view of a 2-unit cell embodiment 5302 is shown in FIG. 53. Unit cell 5302 includes edge distributer headers 5304 and 5306, and a central outlet header 5308. Fluid entered unit cell 5302 through inlet 5310 and was flowed to headers 5304 and 5306 through conduit 5312. Fluid flow direction is illustrated by flow arrows 5314, 5316 and 5318. The dimensions in the distributor headers 5304, 5306 were selected based on two criteria. First, in order to distribute flow, the headers 5304, 5306 need a significantly larger flow area than in the pin array (more than 5 times). Second, they need to contain the pressure difference between 200 bar internal pressure and atmospheric outside pressure. To address the latter, the distributor headers 5304, 5306 were designed with ribs to reduce the stress.

One disclosed header design resulted in a pressure drop of 14.5 kPa between the inlet into the side header and the farthest inlet to the receiver plate. The pressure drop was calculated assuming that $sCO_2$ enters into the test section at 500° C. and 200 bar and exits at 650° C. with mass flow rate high enough to dissipate 100 W/cm² absorbed heat flux. For certain embodiments, a uniform flow distribution across the pin array is ensured if the pressure is larger (about 10 times larger) than the pressure drop in the distributor header. This increase in unit cell pressure drop can be achieved by either increasing the length of unit cell or decreasing the height of pin fins. Fluent simulation was performed to determine the right dimensions for the unit cell. For the 4 cm wide unit cell and 200 μm pin fin height the simulations showed about 176.5 kPa pressure drop, which is ~12 times larger than the pressure drop through the header. The square pin fins had 500 μm width and were spaced with a 1000 μm pitch in both transverse and longitudinal directions. In a commercial device the pin widths could vary between 200 and 100 microns with a pitch of 300 to 1,000 microns. Hence, the final design for the test section had 2 unit cells with 8 cm length and 4 cm width.

Figure 54:
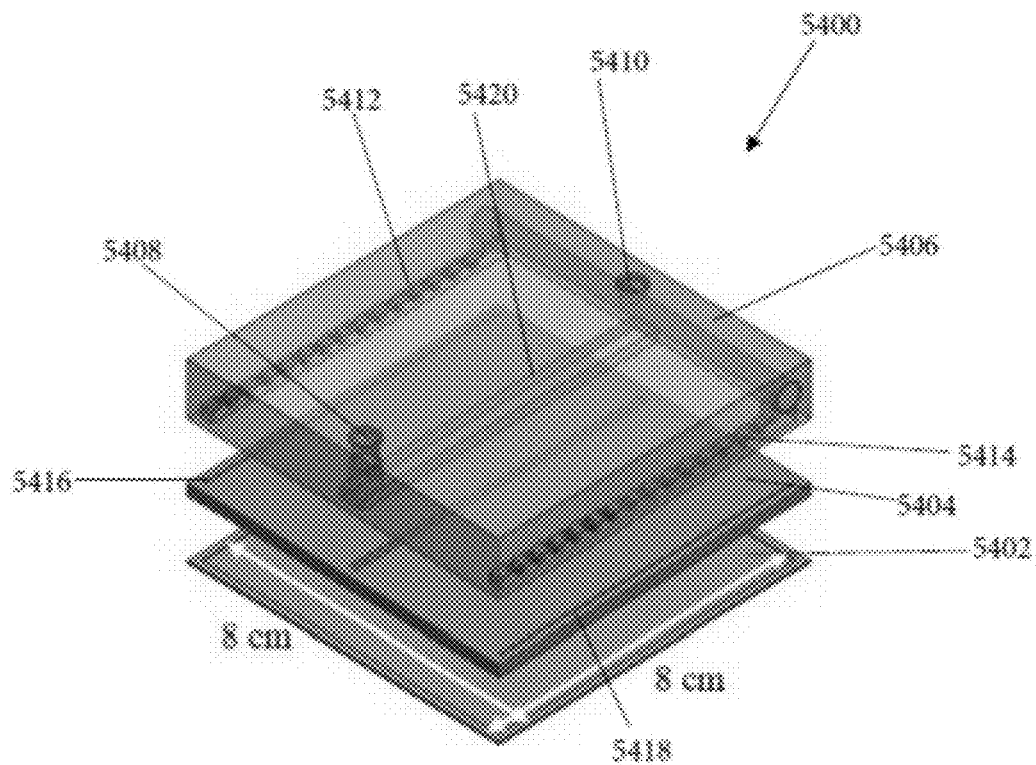
FIG. 54 is a schematic exploded top perspective view of an embodiment of an article according to the present invention.
Figure 55:
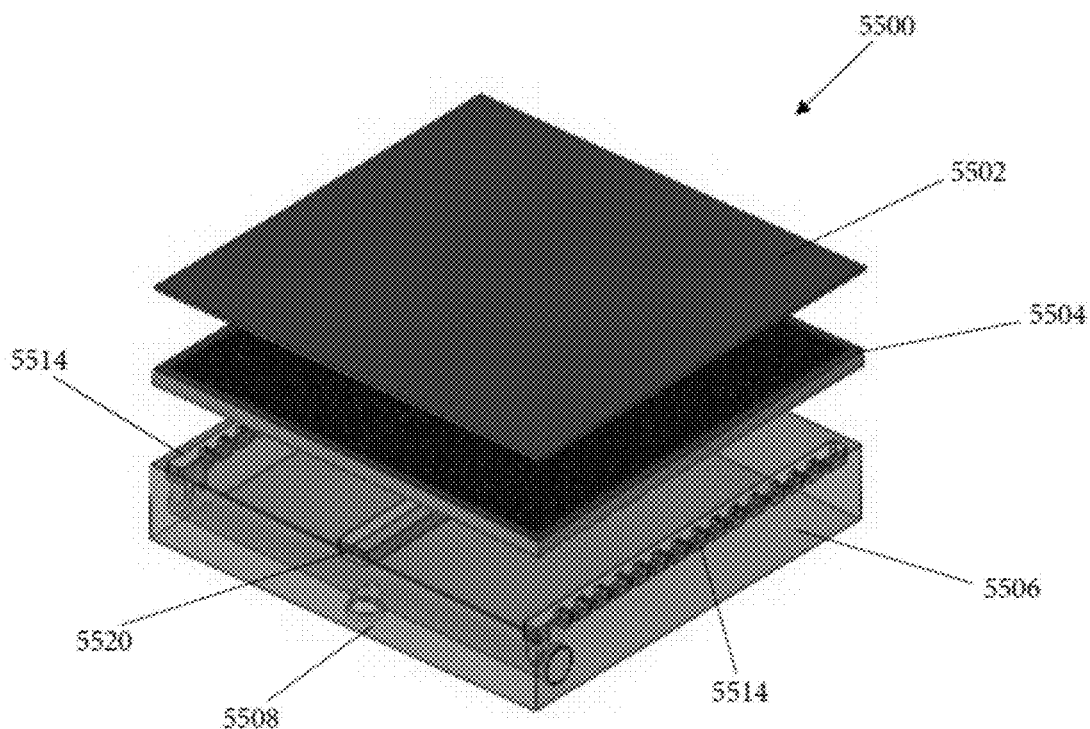
FIG. 55 is schematic exploded bottom perspective view of an embodiment of an article according to the present invention.
Figure 56:
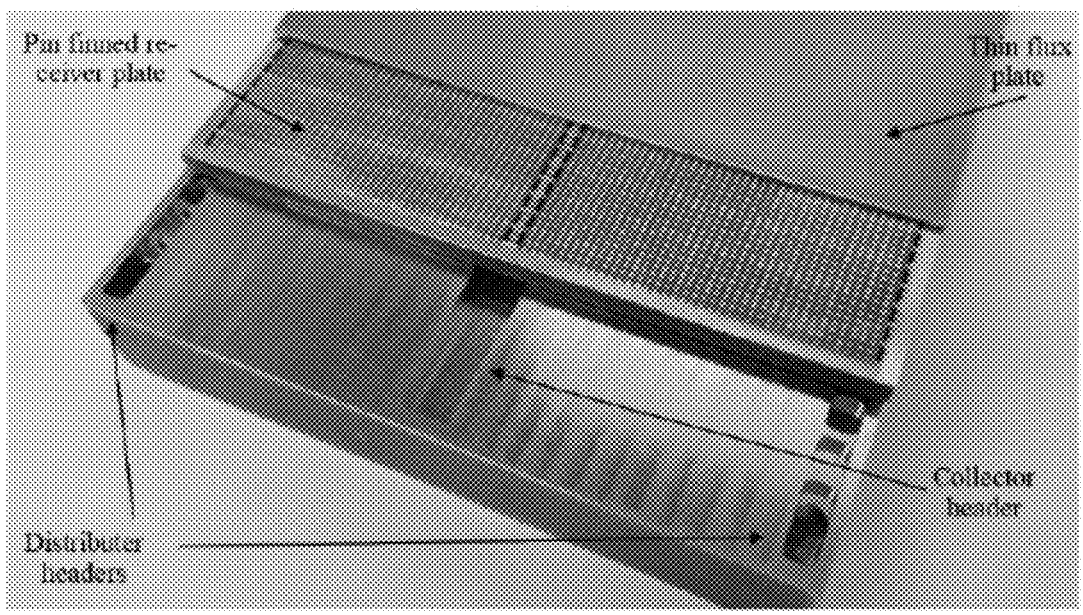
FIG. 56 is an image illustrating individual plates of an embodiment of an article according to the present invention.

An exploded perspective view of an embodiment according to the present invention is provided by FIGS. 54 and 55. An exploded top view of this embodiment as fabricated is shown in FIG. 54 (from top); FIG. 55 provides an exploded bottom view of this embodiment; and FIG. 56 is a digital image of a fabricated embodiment. Embodiment 5400 and 5500 includes a flux absorber plate 5402, 5502, a pin finned receiver plate 5404, 5504, and a top plate 5406, 5506. Top plate 5406, 5506 includes fluid ports 5408, 5508 and 5410 (the second fluid port is not shown in 5500). Top plate 5406 and 5506 includes edge distributer headers 5412, 5414, 5512, 5514. Receiver plate 5404 includes distributer headers 5416, 5418 (not shown in 5500), and a central outlet 5420 (not shown in 5500). Top plate 5406, 5506 includes an outlet conduit 5420, 5520. Surface profilometery was performed on the fabricated plates to ensure the dimensions of the machined parts conformed with the designed model.

Prior to bonding the machined parts, the plates were sent out for electrolyte coating. The coated plates then were diffusion bonded by Refrac Systems. In order to provide inlet and outlet to the test section two quarter inch outer diameter H230 tubes were welded on top of the provided holes in the header. Initial pressure testing with 80 psig pressurized air showed significant leaks from the edges of the test section and at the locations of the welded tubes. The heat generated by welding apparently caused the bond to fail and excessive surface roughness at the edges of the test article occurred.

M. 8 Centimeter×8 Centimeter Test Article—Example 2

The 8×8 centimeter² test article was redesigned to address bonding and excessive surface roughness issues. Surface finish on the side edges of the receiver plate where the bond occurs between receiver plate and the flux plate was identified as a potential feature to address bonding issues. EDM machining was used to fabricate first embodiments of the micro pin fins and this process resulted in several imperfections on the side edges. For example, visible grooves with a depth of 20 μm were found at several locations on the side edges of the receiver plate. Polishing was performed with fine grit sand paper prior to bonding the first test article, but apparently not all imperfections were eliminated. Modifications were made to subsequent embodiments to substantially eliminate edge imperfections. For example, the pin fins' base height was made different than the level of the edges. This design change provided enough room for the wire to machine the pin fins without touching the polished edges. A second major design issue was having all distributor and collector header features machined into one plate in a 3-layer receiver design.

With reference to FIGS. 53-55, in order to split an inlet fluid flow into the side headers a hole was drilled from the side of thick (14 mm) header plate. Thermal shock (expansion and contraction) associated with a welding process to close this side hole produced significant stress on the bonded laminates, which led to local failure of the bond.

Figure 57:
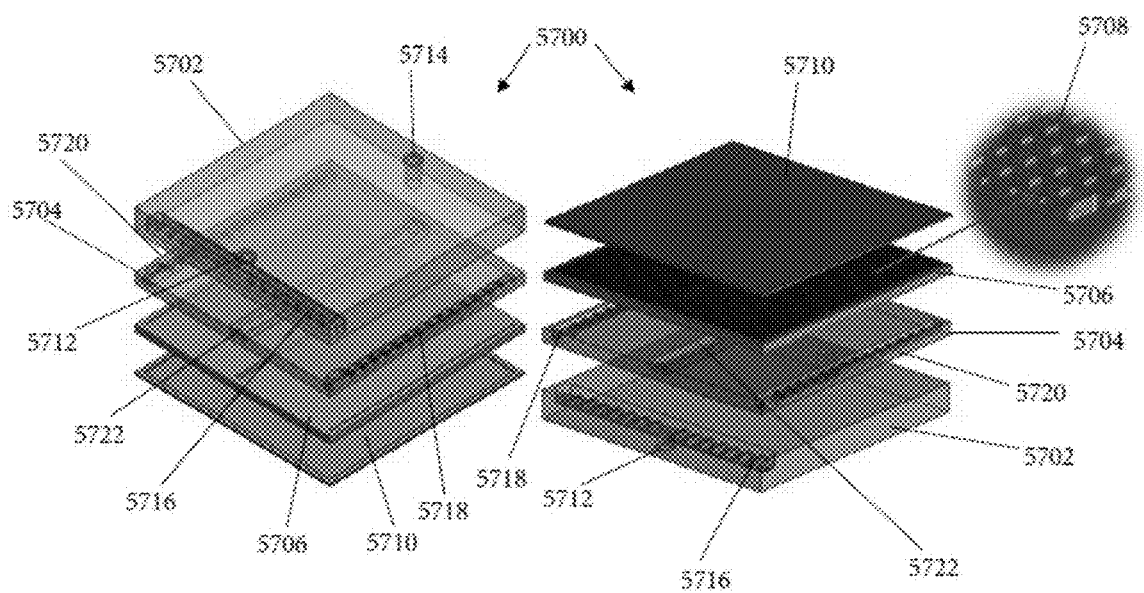
FIG. 57 presents schematic top and bottom inverted perspective views of an embodiment of an article according to the present invention.

One approach to addressing this issue involved preparing a four lamina design 5700 as illustrated by FIG. 57. Embodiment 5700 includes a top plate 5702, a fluid distributer plate 5704, a micropin array plate 5706 comprising plural micropins 5708, and a flux absorber plate 5710. Top plate 5702 includes fluid ports 5712, 5714 with fluid inlet flow to header 5716. Fluid flows to fluid distributer plate 5704 and to edge fluid distributers 5718, 5720 and out through collector header 5722. The channel for splitting the inlet flow between headers can be machined in the top most plate, which avoids welding. The embodiment of FIG. 57 was patterned using sinker EDM and diffusion bonded, and was successfully pressure tested at 200 bars and 650° C. without failure.

N. Optical Coating

Certain disclosed embodiments include an optical coating on at least a portion of device, particularly on the flux plate. Optical coatings can be applied to, for example, increase the flux plate surface temperature. One example of suitable coating materials are the Pyromark coatings, such as Pyromark 2500. A person of ordinary skill in the art will appreciate that any suitable optical coating now known or hereafter developed can be used to practice this invention. For example, suitable optical coatings have a high absorptivity (e.g. greater than 0.9, such as greater than 0.95) in the solar spectrum (e.g. 250 to about 2500 nanometers); and a relatively low emissivity (e.g. less than 0.05 in the infrared spectrum) to minimize thermal loss. Optical coatings can be applied as a single coating, or as multiple coatings, to achieve a desired coating thickness. For example, greater than 0 to at least 50 coatings can be applied, more typically from 1 coating to 20 coatings, to provide a desired coating thickness, such as from greater than 0 μm to at least 50 μm, such as from 5 μm to 35 μm.

Optical coating tests were conducted using Haynes 230, both bare and ENi coated surfaces. Surface preparation was done using 60-120 mesh glass bead media. Optical coating paint was applied in exemplary working embodiments using a Paasche TG-SET Talon Airbrushing System operating at 35 psi. Sample surfaces were prepared and chemical cleaning steps were followed. Some samples were not blasted or blasted and then hand sanded with varying grits in order to assess the effect of surface roughness. After the paint was applied the samples were air cured for 18 hours and then moved to an oven for a cure cycle. The oven used for the cure cycle was a CM Rapid Temp lab furnace with a 1600° C. max continuous run temperature and an atmospheric air environment. Oven temperature and ramp cycles were controlled using a Eurotherm 2404 temperature controller. Oven cure temperature cycles for max operating temperature of ~750° C. are as follows: i. heat to 120° C., dwell for 2 hours; ii. heat to 250° C., dwell for 2 hours; iii. heat to 540° C., dwell for 1 hour; iv. heat to 700° C., dwell for 1 hour; and v. cool to 25° C. at 5° C./minute.

After the initial cure, reflectivity measurements were taken using a spectrophotometer (JASCO UV-670). The samples were then cycled and the reflectivity and mechanical robustness was measured. The oven was heated to 750° C. as rapidly as possible, requiring about 8 minutes. The temperature was then held for 15 minutes to ensure complete soak. After soak, the temperature was dropped as rapidly as permitted. The cooling time was set to 30 minutes to reach 50° C. Once cooled the cycle automatically repeated.

Figure 58:
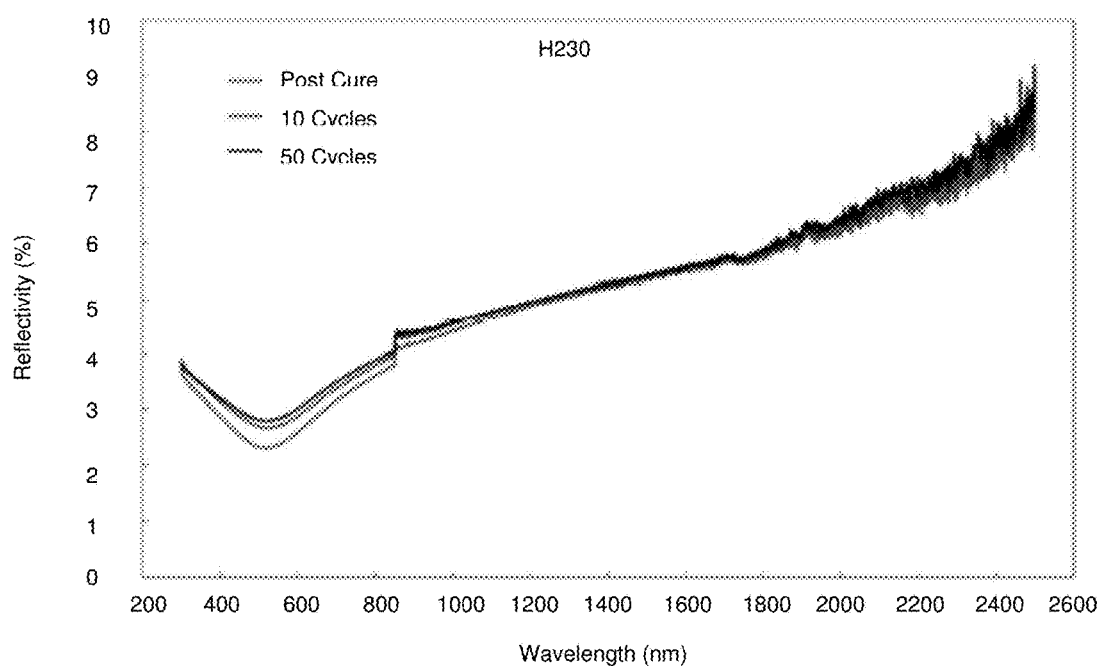
FIG. 58 is a plot of reflectivity (%) versus wavelength (nm) illustrating reflectivity measurements for Pyromark 2500 optical coating on Haynes 230 after curing and after each set of thermal cycling for embodiments according to the present invention.
Figure 59:
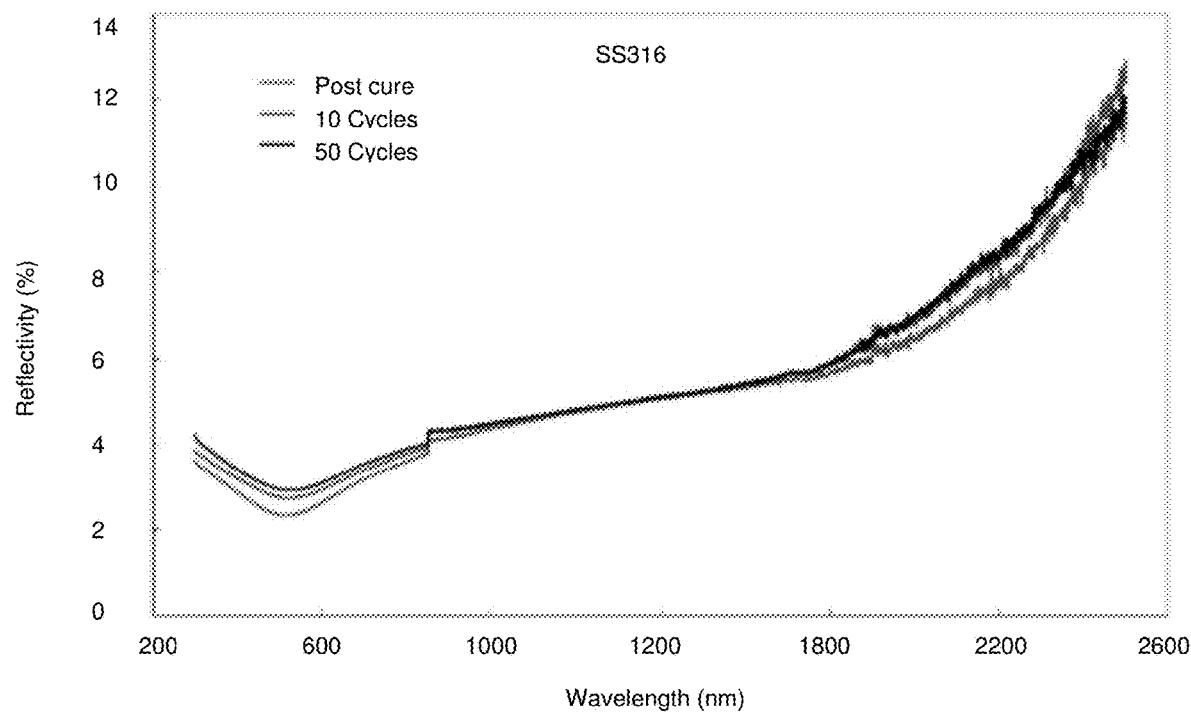
FIG. 59 is a plot of reflectivity (%) versus wavelength (nm) illustrating reflectivity measurements for Pyromark on SS213 after curing and after each set of thermal cycling for embodiments according to the present invention.

Reflectivity measurements were taken of each sample after curing and after each set of thermal cycling. Results for each sample are provided by FIG. 58 (for Pyromark 2500 on Haynes 230), and FIG. 59, for Pyromark 2500 on SS316. Every sample showed signs of increased reflectivity after thermal cycling. The increase in reflectivity was greater between the initial and 10-cycle measurements while the increase in reflectivity was minimal after 40 additional cycles.

Mechanical testing of the optical coating was performed in accordance with the ASTM D3359-97 standard, method B, for adhesion by tape test. Scotch pressure sensitive tape by 3M was utilized. An "X" was formed by cutting two intersecting lines with a small angle of 30-45 into the coating to expose bare metal. The tape was then applied and rubbed into place until uniform coloration occurred. For consistency the tape was allowed to remain in place for 1 minute prior to removal. Pyromark coating showed no signs of peeling except within the cut line giving a rating of 5 A, which is satisfactory.

O. Commercial Receiver Design Embodiments

One commercial embodiment comprised a 1 square meter micro-channel solar receiver module comprising multiple unit cells, and a complete commercial scale solar receiver comprising multiple modules. The receiver was designed to heat $sCO_2$ from 550° C. to 650° C. at a pressure of 200 bars. The receiver was sized to provide thermal energy to a 100 $MW_e$ power block.

Commercial embodiments are illustrated by FIGS. 3 and 4 and comprise a modular, multiscale design having multiple approximately 1 $m^2$ heat transfer modules, which in turn comprise smaller, high-flux microchannel unit cells. General thermal performance and feasibility of the receiver design were determined using a multiscale modeling approach. First, resistance network heat transfer and pressure drop submodels of individual unit cells and modules (i.e., array of unit cells) were developed and used to optimize unit cell and module size. The submodels were then integrated into a full scale commercial receiver model. Detailed quantification of the efficiency, thermal absorption, heat loss mechanisms, and $sCO_2$ mass flow rate of these models were obtained under a variety of conditions. Finally, a more detailed consideration of the pressure loss in the unit cell header system, implications of incident edge flux due to the square module shape, and the required receiver superstructure design and cost were considered.

P. Unit Cell and Module Model

Figure 60:
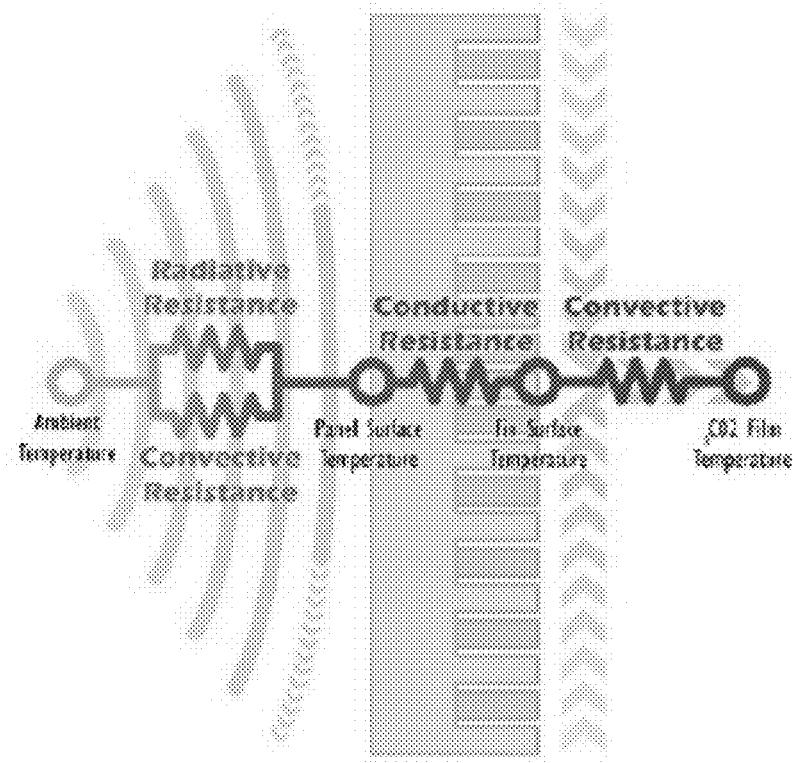
FIG. 60 is schematic drawing of a unit cell heat transfer resistance network for an embodiment according to the present invention.

A computationally efficient, steady state, network resistance heat transfer model for unit cell geometries was developed using an Engineering Equation Solver. The model is illustrated by FIG. 60, and accounts for internal and external multi-mode heat transfer effects, as well as $sCO_2$ frictional pressure loss using appropriate correlations from the literature for thermal and hydraulic resistances. Prior results are used to specify the unit cell micropin geometry and surface absorptivity used in the model, conditions (wind speed conditions (wind speed, temperature), inlet $sCO_2$ temperature, and desired $sCO_2$ outlet temperature. With these, the model calculates the mass flow rate of the $sCO_2$ per unit cell, thermal efficiency, unit cell surface temperature, total heat transfer, and pressure drop through the pin array.

Figure 61:
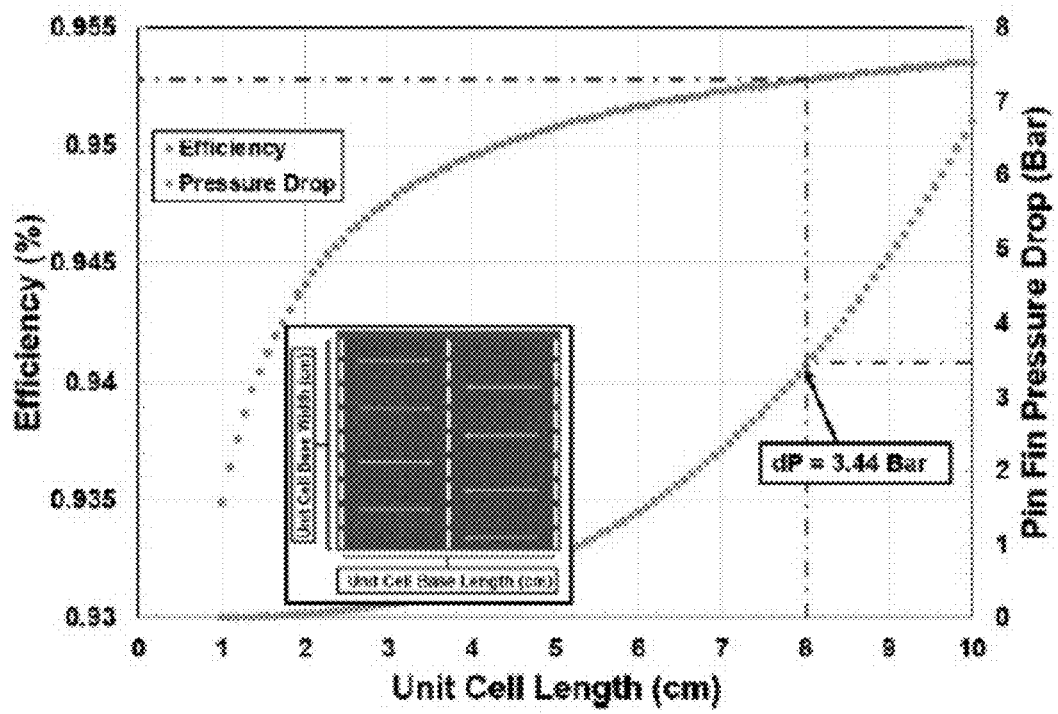
FIG. 61 is a plot of efficiency (%) and pin fin pressure drop (bar) versus unit cell length (cm) for an embodiment according to the present invention.

To reduce the number of fluid connections, each 1 $meter^2$ module contained the fewest number of unit cells possible, while also maintaining the total module pressure drop (pin fin array+header losses) to less than 4 bar. Using the unit cell model at a design flux of 110 $W/cm^2$ and a fixed unit cell width of 100 centimeters, the unit cell length flow length was incremented until the maximum pin array pressure drop of 3.64 bar (providing a $\Delta P$ allowance for the header system) was achieved. This resulted in a selected unit cell size of 8 centimeters×100 centimeters (FIG. 61). This embodiment experiences a pressure drop of less than 3.64 bar and an efficiency of approximately 95%. Higher thermally efficient unit cells can be achieved by increasing the unit cell length, however an increase in unit cell length (and overall size) will increase the required mass flow rate of the $sCO_2$ and therefore increase the pressure drop, yielding an unrealistic pumping requirement.

Figure 62:
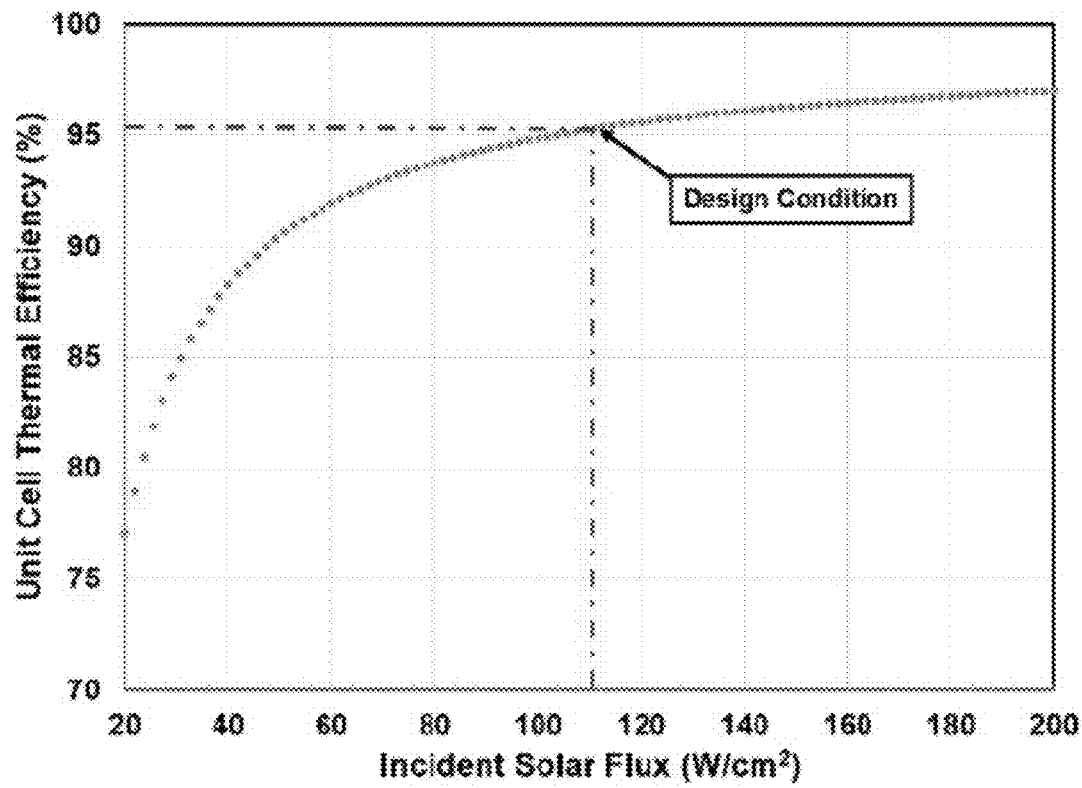
FIG. 62 is a plot of unit cell thermal efficiency (%) versus incident solar flux (W/cm$^2$) for an embodiment according to the present invention.
Figure 63:
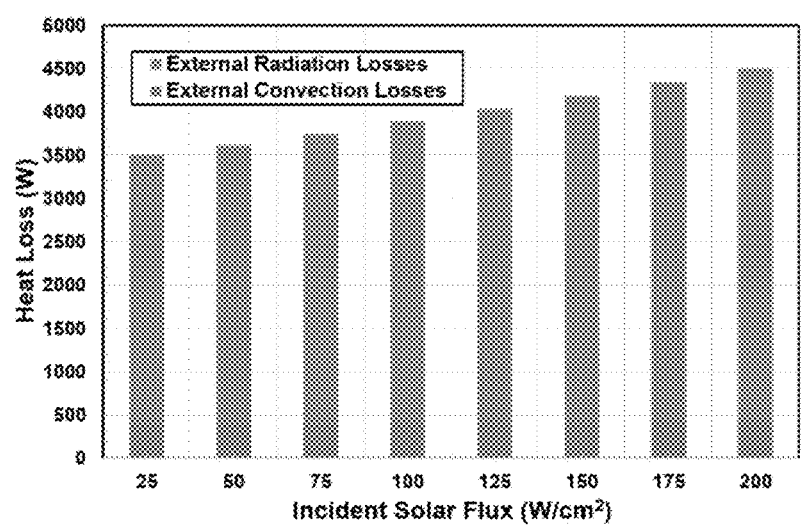
FIG. 63 is a plot of heat loss (W) versus incident solar flux (W/cm$^2$) for an embodiment according to the present invention.

The thermal efficiency and heat loss modes of the 8 centimeters×100 centimeters unit cell are shown in FIGS. 62 and 63, respectively, as a function of incident flux. The efficiency is sensitive to incident fluxes at low values (~20 to 60 $W/cm^2$); however, as the incident flux increases beyond 100 $W/cm^2$, the efficiency begins to approach approximately steady-state with an efficiency between 95% and 98%. As the incident flux on the module increases, the total external heat loss will also increase due to increased surface temperature and the associated radiation and convection losses. The relative contribution of convective and radiation losses as a function of incident flux are shown in FIG. 63. With an increase in incident surface flux, the convection heat loss is relatively constant while the re-radiation heat loss increases dramatically due to the exponential dependence on surface temperature. At an incident flux of 200 $W/cm^2$ the heat loss in the form of re-radiation increases by 35% from an incident flux of 25 $W/cm^2$ as compared to a 12.9% increase in convection losses.

Q. Commercial Receiver Model

Figure 64:
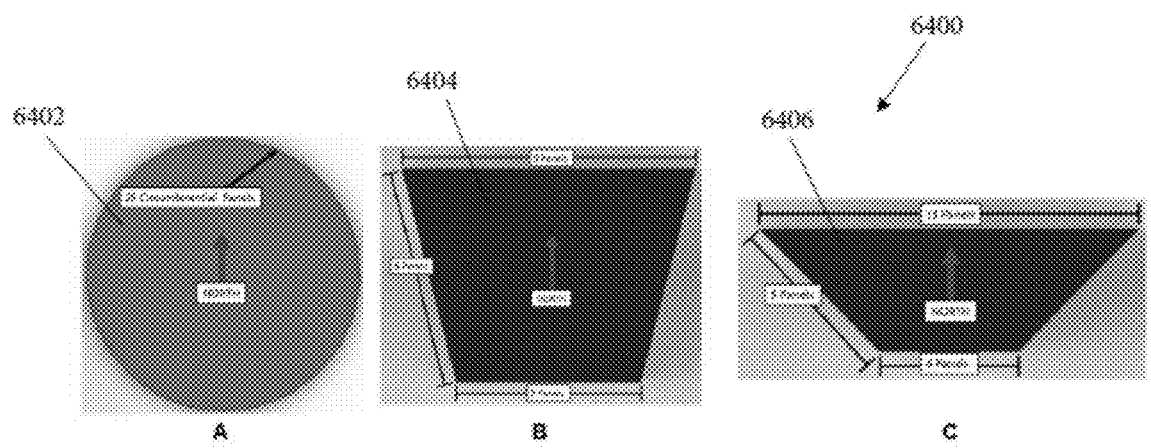
FIG. 64 is a schematic view of a cylindrical receiver according to an embodiment of the present invention, a modified schematic view of a receiver according to the present invention, and a second modified receiver design comprising 10 modules in height and a total of 250 individual modules.

The use of multiple receiver modules allows the shape of a full central receiver to be customized to the flux pattern of a specific heliostat field. To explore this, three different central receiver module configurations were investigated, as shown in FIG. 64. Each design had the same number of modules (i.e., equivalent surface area) and were 10 modules in height (approximately 10 meters). The baseline design 6402 is a cylindrical collector with 25 panels circumferentially. Using a DELSOL non-uniform flux distribution developed as a basis, a scaled, non-uniform flux distribution was created. The flux distribution assumed a 53% drop in incident flux from the northern to southern panels (circumferentially) with a peak flux of 170 $W/cm^2$ and an average flux of 115 $W/cm^2$. The vertical change in incident flux was assumed negligible. The important results for the three different designs 6402, 6404 and 6406 of FIG. 64 are provided by Table 4.

TABLE 4

Comparison of Receiver Designs

|  | Baseline Receiver | Receiver # 1 | Receiver # 2 |
|---|---|---|---|
| Total Receiver Incident Flux | 278.6 MW | 292.3 MW | 304 MW |
| Total Receiver Heat Input $sCO_2$ | 252.7 MW | 265.6 MW | 276.7 MW |
| Total Receiver Reflection Losses | 13.9 MW | 14.6 MW | 15.2 MW |
| Total Receiver Heat Losses | 12.0 MW | 12.1 MW | 12.2 MW |
| Overall Receiver Efficiency | 95.5% | 95.6% | 95.8% |

The baseline cylindrical receiver achieved a heat input to the $sCO_2$ of 252.7 MW of thermal energy at an efficiency of 95.5%. By modifying the receiver to increase the north facing surface area (higher local incident flux), an increase in absorbed thermal energy at a higher efficiency can be achieved. The modified receiver designs 6404 and 6406 increased the absorbed thermal energy by 5% and 9.5%, respectively, with an increase of 0.2 and 0.5 efficiency points, respectively. The full receiver model can be used as a design tool to tailor the global receiver shape to different heliostat fields.

R. Header Pressure Loss

Figure 65:
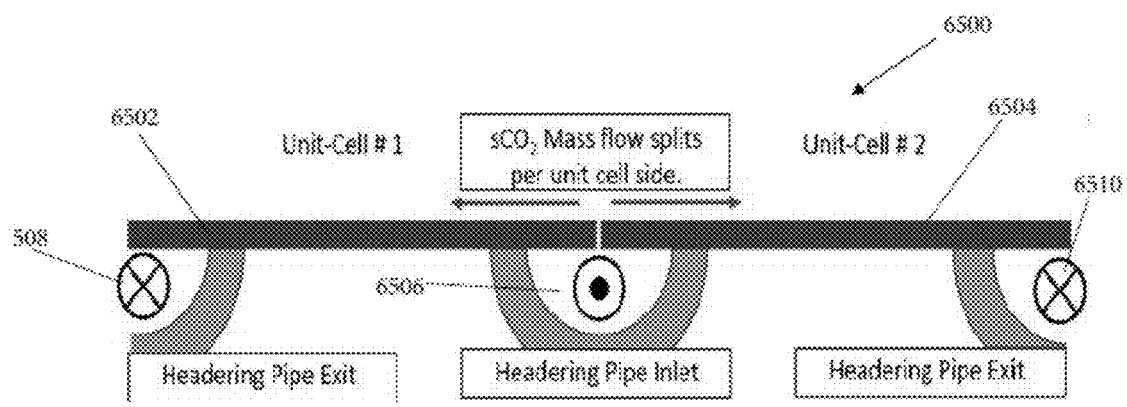
FIG. 65 is a schematic view illustrating header design of individual unit cells for flow distribution in an embodiment according to the present invention.

With reference to FIG. 65, for certain disclosed embodiments fluid is distributed to each unit cell 6502 and 6504 through semi-circular inlet header 6506 and outlet headers 6508, 6510 (see FIG. 65) attached to the backside of the unit cell. To minimize total module pressure loss and ensure uniform fluid distribution, the pressure loss in the header system preferably should be about 10% of the pressure loss through the pin fin array. As the unit cell width increases, the header flow length and mass flow rate both increase, yielding higher total pressure losses. The maximum allowable pressure drop that was selected for certain embodiments was 4 bars.

Figure 66:
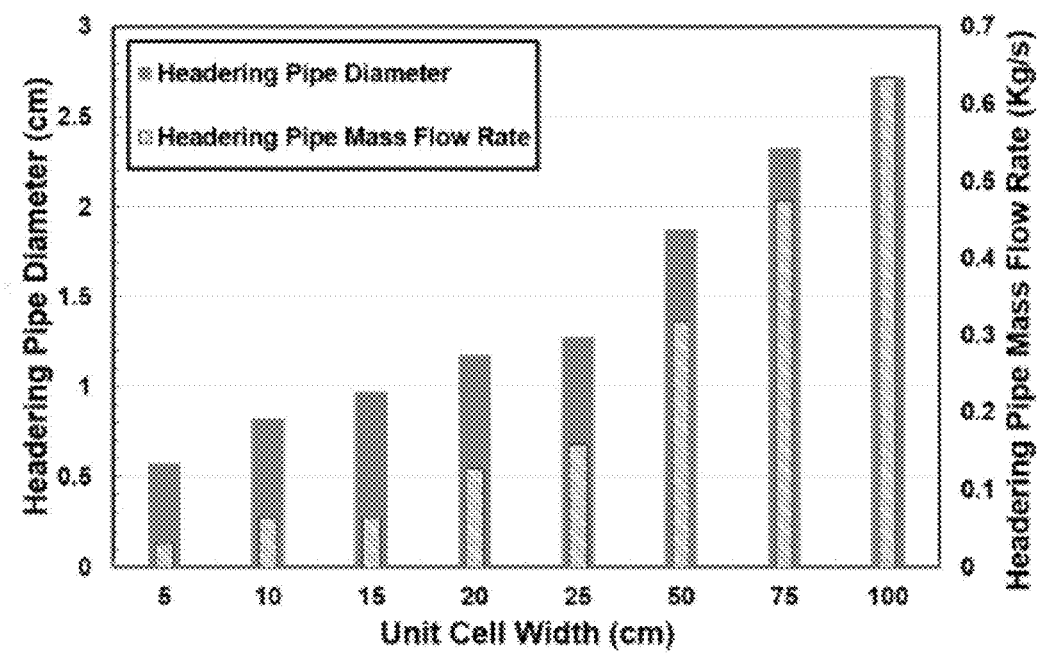
FIG. 66 is a plot of headering pipe diameter (centimeters) and headering pipe mass flow rate (Kg/s) versus unit cell width (centimeters) for embodiments according to the present invention.

A discretized pressure loss model accounting for frictional and minor losses in the header system was developed to ensure a reasonably sized header for unit cell geometry of 8 centimeters×100 centimeters for one disclosed embodiment. FIG. 66 shows this trend, as well as the calculated minimum header pipe diameter to achieve the targeted header pressure loss. For a selected 8 centimeters×100 centimeters unit cell length, a minimum inner header diameter of about 2.725 centimeters was adequate. In a commercial device the header diameter can vary as will be understood by a person of skill in the art, such as between 1 and 5 centimeters, and perhaps more typically between 1 and 3 centimeters.

S. Thermal Expansion Considerations

Figure 67:
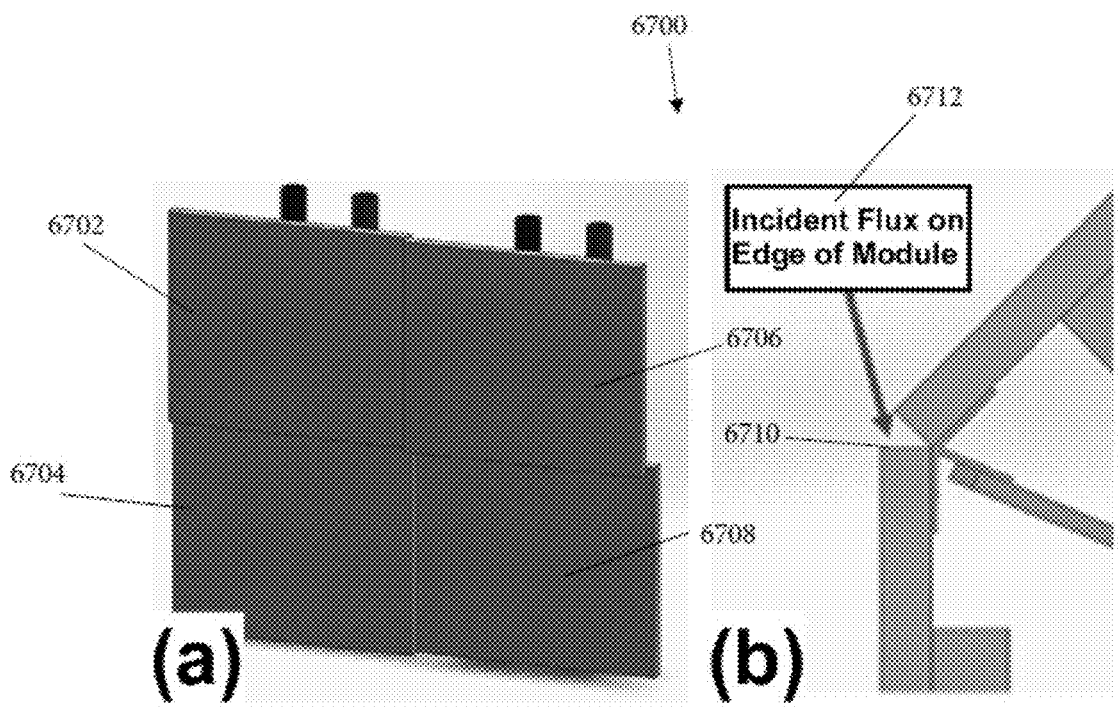
FIG. 67 is a schematic view illustrating (a) a module tiling arrangement, and (b) edge incident flux for an embodiment according to the present invention.

The disclosed modules expand when heated to an operating temperature. An analysis of the thermal expansion was conducted starting from an ambient of 25° C. to a worst case solid material temperature of 1,000° C. The analysis showed an estimated linear thermal expansion of 0.76%, with a total area expansion of 3.1%. With reference to FIG. 67, to accommodate this, a staggered tiling arrangement of modules 6702, 6704, 6706 and 6708 may be used (FIG. 67*a*). This staggered tiling allows each module to expand unconstrained in the vertical and horizontal directions, minimizing thermal related stresses.

Figure 68:
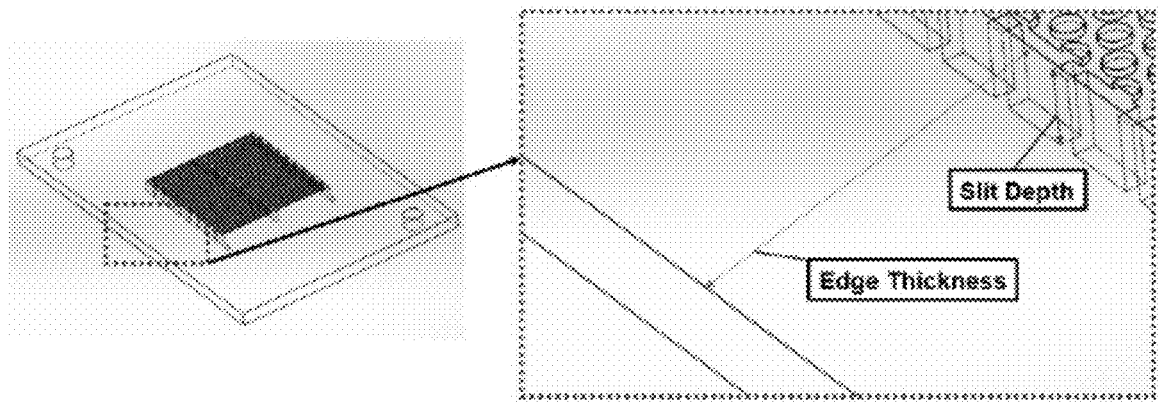
FIG. 68 is schematic view illustrating unit cell edge dimensions for an embodiment according to the present invention.
Figure 69:
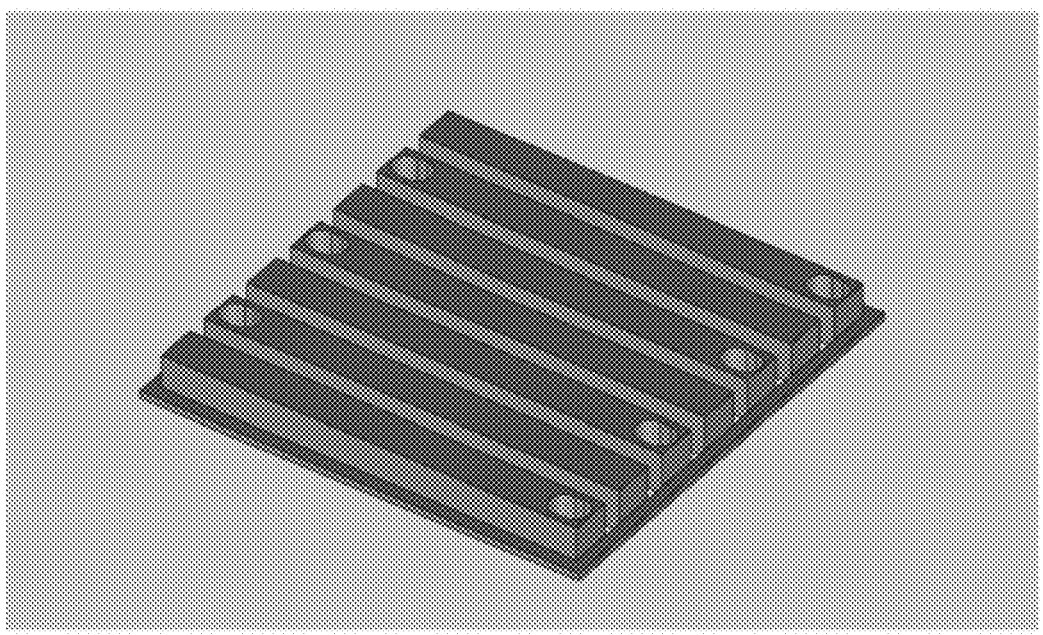
FIG. 69 is a schematic perspective view of a front plant having fluid flow channels and illustrating margin adjacent to the channels for hermetic sealing.
Figure 70:
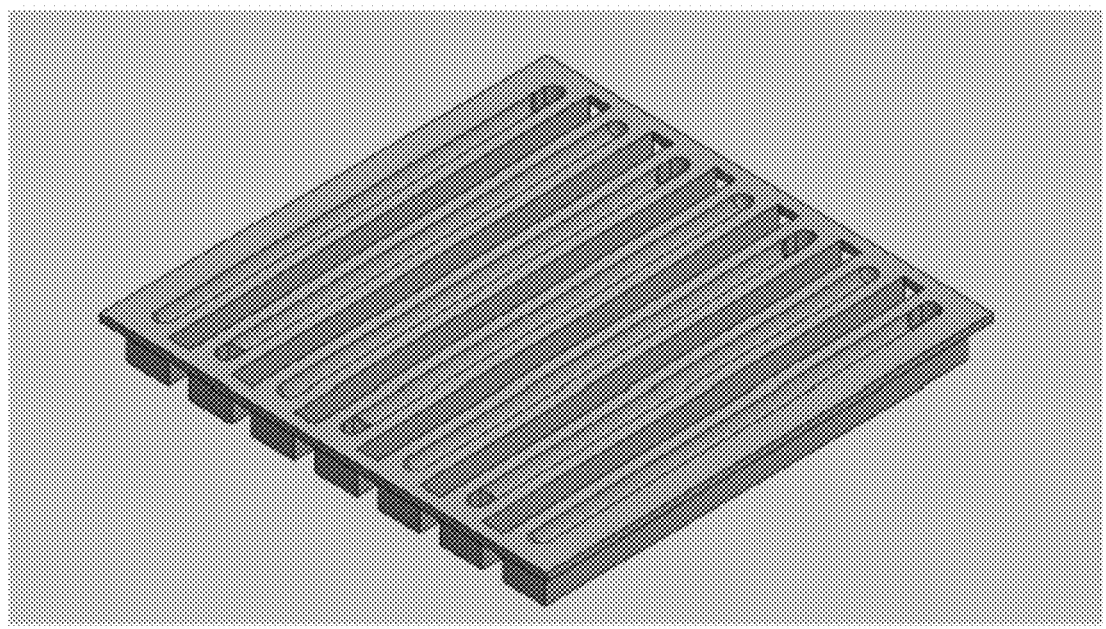
FIG. 70 is a schematic perspective view of a front plant having fluid flow channels and illustrating margin adjacent to the channels for hermetic sealing.
Figure 71:
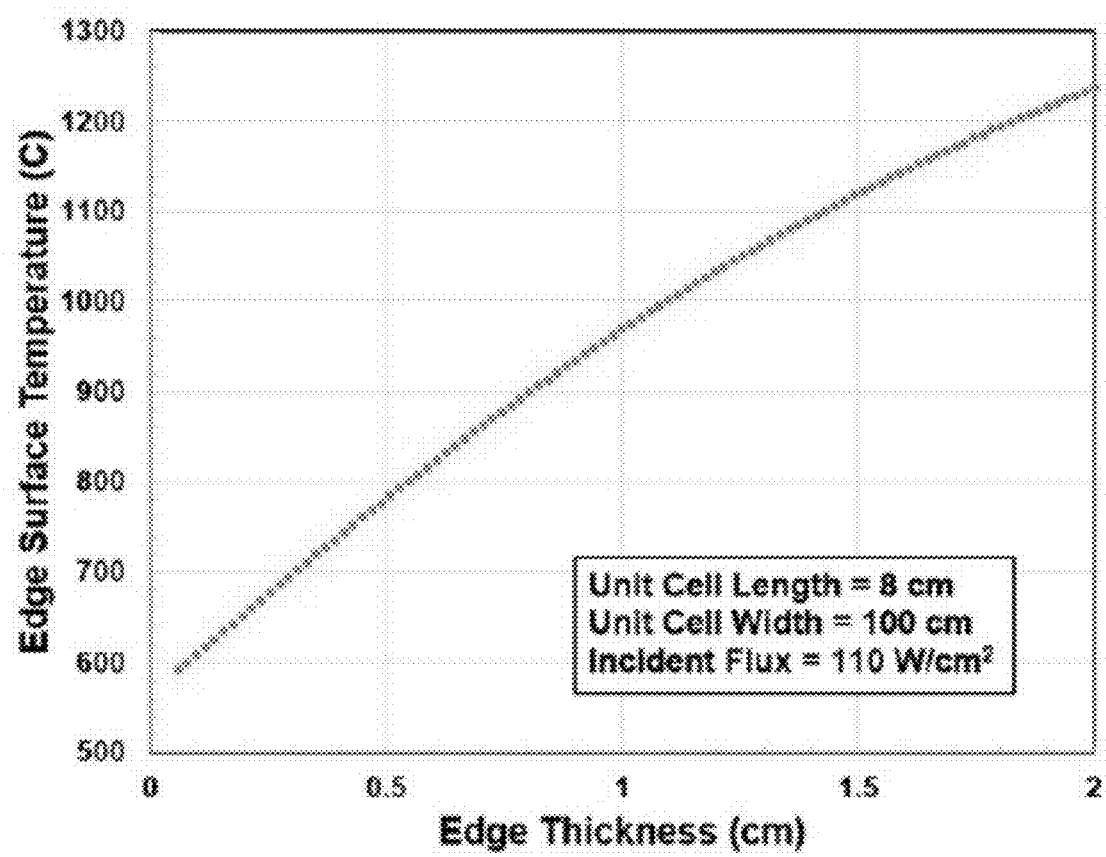
FIG. 71 is a plot of edge surface temperature (° C.) versus edge thickness (centimeters) for certain disclosed embodiments of the present invention.

However, this staggered orientation may result in the surface edge 6710 of the module to be subjected to incident flux 6712 from the heliostat field, as seen in FIG. 67*b* and FIG. 68. To determine the effects of this incident flux, an analysis was conducted on an 8 centimeters×100 centimeters unit cell at the design incident surface flux of 110 W/cm², as seen in FIG. 69. It was assumed that the edges will be cooled by the inlet headers, which will have $sCO_2$ at 550° C. As the edge thickness increases, the edge surface temperature will increase from a nominal value of approximately 600° C. to a value of about 1225° C. at a thickness of 2 centimeters due to increased conduction resistance. The edge thickness in one commercial design will be about a few millimeters, resulting in a material temperature of 650° C. The side flux model can be used to understand the thermal and mechanical tradeoffs when specifying the unit cell edge thickness.

T. Structural Analysis

Figure 72:
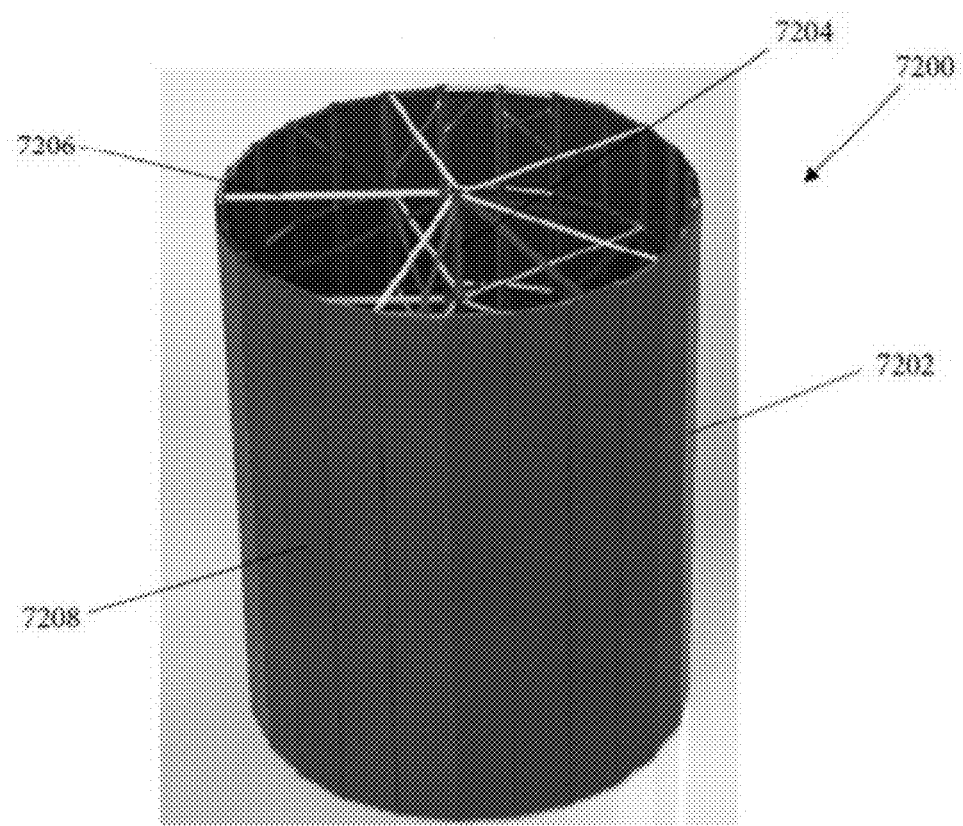
FIG. 72 is a schematic drawing of one potential cylindrical commercial embodiment of a module receiver according to the present invention.

A structural design and analysis of the receiver was conducted. The weight of the individual modules, fluid, piping, and wind loads were considered in the analysis. A 3D rendering of the structure for a cylindrical 250 module receiver 7202 can be seen in FIG. 72. The structure is a space trust with a central spine 7204 connected to outrigger frames 7206 that support the modules 7208. The material used was Haynes 230 to prevent thermal failure of the structure due to the high temperature application. It is likely that the entire structure would not experience extreme thermal condition and alternative structural material can be used.

The feasibility of using microscale unit cells in a full scale, 250 MW thermal solar receiver composed of multiple modules is demonstrated. The modular design allows unconventional central receiver geometries that can be tailored to the specific field, as well as having the potential for independent control of the $sCO_2$ mass flow rate to each module to maintain uniform fluid outlet temperature. A unit cell model showed the potential for rapid parametric evaluation and optimization of different pin fin array geometries, surface absorptivity, unit cell length and width, and operating conditions. An embodiment of a multi-scale full receiver model showed that at the selected non-uniform incident flux and surface emissivity, a global receiver thermal efficiency of >90% can be achieved for at least three different configurations actually considered. With an increase in northern-facing panels, while still keeping the total surface area constant, the absorbed solar thermal energy can be increased while also increasing the receiver efficiency.

U. Conclusions about Particular Disclosed Embodiments

1. Suitable Material and Fabrication Options have been Identified

Haynes 230 is one example of a suitable fabrication material. Haynes 230, and other disclosed materials, and can be formed using sinker EDM. Diffusion bonding is one viable fabrication approach that has produced receiver embodiments able to operate at HTF temperatures up to 650° C. and pressures up to 125 bars.

2. $sCO_2$ Results

Simulation and testing of the $sCO_2$ separate effects and integrated test articles confirm the ability to operate the devices with incident solar fluxes up to 100 W/cm² while heating sCO$_2$ to 650° C. at a pressure of 120 to 200 bars while having thermal losses on the order of 5% for an overall receiver efficiency of 90% (assuming a receiver absorptivity of 95%). This is a radical improvement over other solar receiver designs for gaseous receivers known in the art. Thus, disclosed receiver embodiments provide a receiver that is significantly smaller, less expensive, and more efficient than known solar receivers for gaseous receivers. Embodiments comprising multiple unit cells and a distribution system have been completed and successfully pressure tested at 200 bars and 650° C.

3. Molten Salt Results

Simulation results have indicated that molten salt receiver embodiments can operate with an incident flux of 400 W/cm$^2$ and a molten salt exit temperature of 600° C. while having thermal losses on the order of 1% of the absorbed flux. Experimental results at fluxes up to 150 W/cm$^2$ are consistent with the simulation results (when adjusted for surface optical properties and flux).

4. Optical Coatings

Optical coatings, such as the Pyromark family of coatings, have been applied to disclosed devices, particularly to flux absorber plates, and these coatings provide beneficial optical properties even after substantial thermal cycling. Mechanical testing (Tap test) indicated that Pyromark provided a robust coating.

5. Commercial Design

One embodiment of a commercial scale solar receiver provided solutions to a number of design issues associated with a receiver fabricated from a large number of individual 1 meter$^2$ receiver panels.

Disclosed embodiments are able to operate at high temperature with high efficiency (not requiring a cavity receiver design), which allows using advanced high temperature fluids. Using these high temperature fluids allows more efficient high temperature power cycles than can be achieved with currently known devices. This is true for both gaseous and liquid high temperature fluids. In addition, the small size of the receiver appears to result in a significant reduction in the cost of the receiver.

The incident flux of 100 W/cm$^2$ for sCO2 disclosed receiver designs is well within the capability of current concentrator field designs. More importantly, the ability of the disclosed receivers to operate at 400 w/cm$^2$ flux with molten salt, and perhaps 800 w/cm$^2$ flux with liquid metals, provides new opportunities for solar power plant designers by efficiently operating disclosed receivers at very high temperature with an extremely compact and reduced cost receiver.

VI. Examples

The following examples are provided to illustrate certain features of exemplary working embodiments. A person of ordinary skill in the art will appreciate that the scope of the invention is not limited to the features of these examples.

Example 1

This example considers advantages of numbering-up versus scaling up disclosed embodiments. This example used a unit cell having a 1 meter crossflow length and an 8 centimeter flow length. A total of 12 individual unit cells arranged in parallel create an approximately 1 meter$^2$ module surface.

An alternative option is to avoid implementing a numbered-up unit cell approach, and instead to use a single scaled unit cell having dimensions of 1 meter long by 0.96 meters wide (i.e., a surface area equivalent to twelve 1 meter×0.08 meter unit cells). The cell width is the same for both cases, i.e. 1 meter; thus, the sCO2 flow face area is the same. The total flux incident on the 0.96 m$^2$ module is the same between the two options. Accordingly, the mass flow for the single unit cell must be approximately 12 times that of the individual unit cells to achieve the specified 100 K change in temperature. This leads to a significantly higher velocity over a longer flow length, providing an increasing heat transfer coefficient and yielding undesirable pressure drop.

Figure 73:
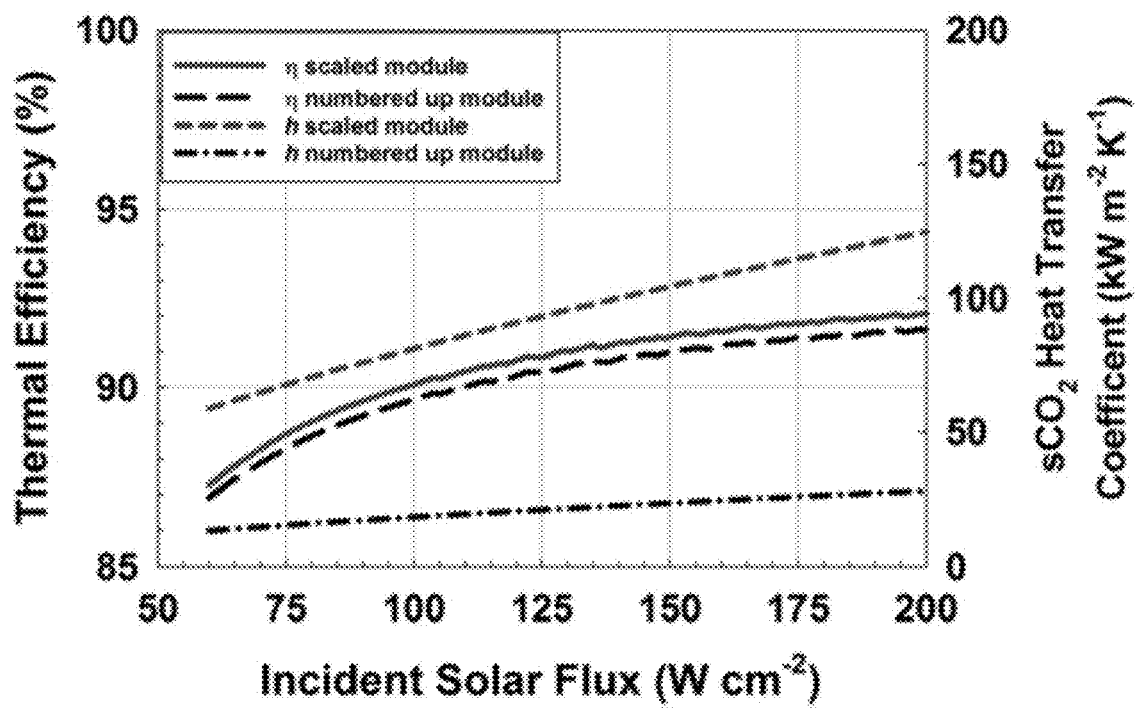
FIG. 73 is a plot of thermal efficiency (%) and heat transfer coefficient (kW m$^{-2}$ K$^{-1}$) comparing thermal efficiency and sCO2 convective heat transfer coefficient for a scaled module (single large unit cell) and numbered-up module (multiple parallel unit cells) with a total heat transfer area of 0.96 m$^2$ as discussed in Example 1.

To highlight the utility of the unit cell approach, these two module designs are simulated using the unit cell model. The internal sCO$_2$ heat transfer coefficient and module efficiency for each module type are compared, as shown in FIG. 73. As expected, the internal heat transfer coefficient for the module with a scaled unit cell is much larger than the module with numbered-up unit cells due to the higher flow velocity.

In addition to higher heat transfer coefficient, a single unit cell has a less complicated header design and reduced potential for flow maldistribution. However, using a single unit cell results in significantly increased pressure drop due to both increased mass flow rate and increased flow length. Using a friction factor for a bank of tubes, the calculated pressure drop for a single 1 meter×0.96 meter unit cell would be more than 100% of the operating pressure, while for the multiple unit cells in parallel (i.e., the numbering-up approach), the pressure loss is calculated as 1.5% of the absolute pressure. Therefore, optimizing the unit cell to achieve an increased heat transfer coefficient while minimizing the pressure drop correlates with module efficiency and overall performance.

Example 2

Figure 74:
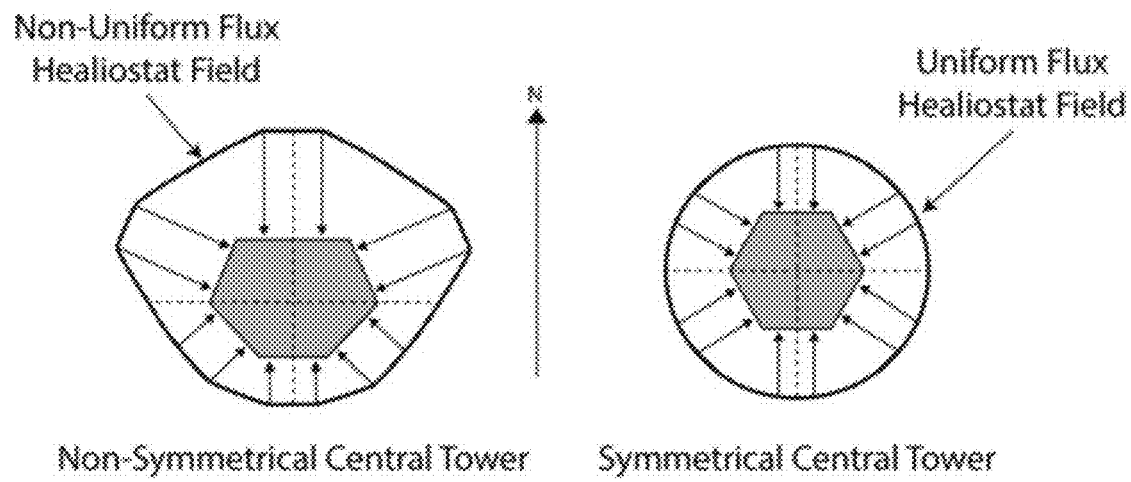
FIG. 74 is a schematic plan view of a central receiver surface area tuned to a solar flux profile of a specific heliostat field.

This example concerns a full-scale receiver model comprising multiple module level models, which in turn comprised multiple unit cell models. One advantage of the modular design is the potential to produce unconventional central receiver geometries (compared to a standard cylinder), as illustrated by FIG. 74. This allows the receiver shape to be tuned to specific heliostat fields with non-uniform flux. By modifying the receiver to increase the north-facing surface area (higher local incident flux), an increase in absorbed thermal energy with the same surface area and approximate receiver cost can be achieved.

Figure 75:
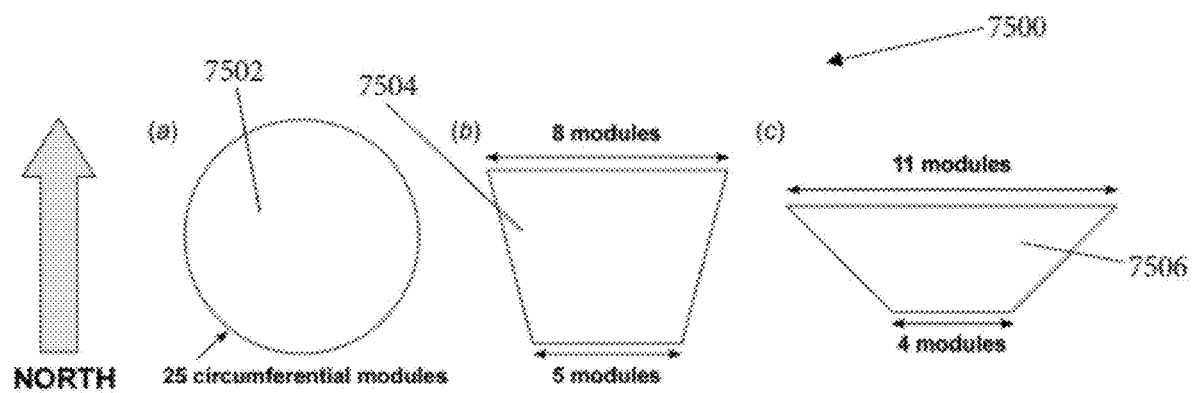
FIG. 75 is schematic of top view of receiver cross sections for (a) a baseline receiver design, (b) a second receiver design, and (c) a third receiver design, each comprising ten modules in height and a total of 250 individual 0.96 m$^2$ modules.

Three different central receiver module configurations were investigated. FIG. 75 provides a top cross-sectional view of three receiver designs 7502, 7504 and 7506 considered. Each modular design had the same number of modules (i.e., equivalent surface area) and was ten modules in height (about 10 m). For the present example, 250 total modules per receiver design were used, yielding 3,000 total unit cells and 240 m$^2$ of total receiver heat transfer area.

Figure 76:
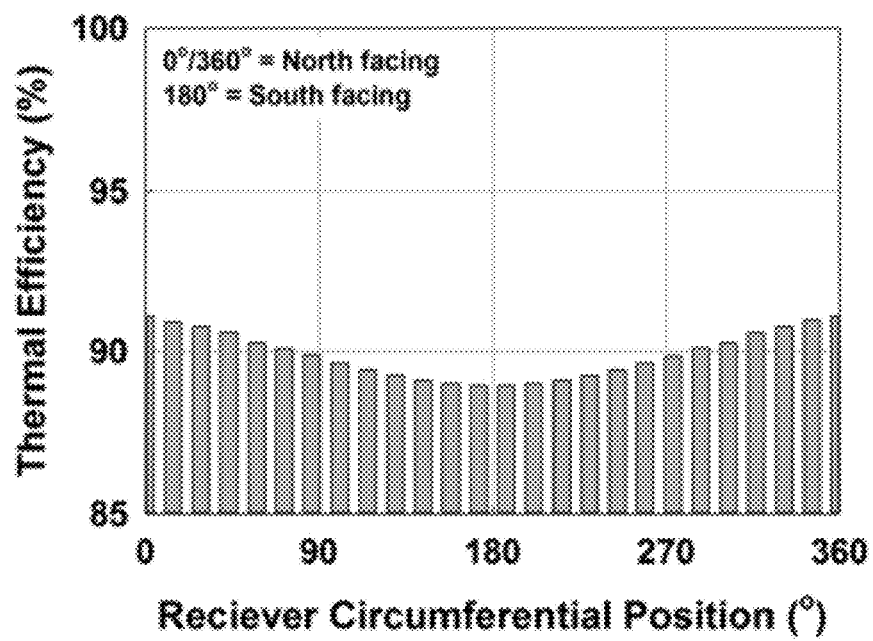
FIG. 76 provides data concerning thermal efficiency (%) versus receiver circumferential position)(° for 3 different receiver designs.

The thermal performances of the three designs were evaluated using a scaled representative circumferential variation developed from Kolb's DELSOL simulation results. The flux distribution assumed a 47% drop in incident flux from the northern to southern panels (circumferentially) with a peak flux of 160 W cm$^{-2}$ and an average flux of 110 W cm$^{-2}$. The vertical change in incident flux was assumed negligible The baseline receiver design was an approximately cylindrical collector [FIG. 75(*a*)] with 25 panels circumferentially subjected to a non-uniform flux distribution as detailed previously. For the baseline design, the module level thermal efficiency as a function of compass direction is shown in FIG. 76. Since a uniform flux distribution was assumed in the vertical direction, a single layer of modules is sufficient for evaluating the global trend. The northern-facing panels have the highest panel efficiencies of 91.1% while the southern-facing panels have the lowest panel efficiencies with 88.9%. Overall, the cylindrical receiver is able to absorb 264 MW into the sCO2 with an overall efficiency of 90.0%. A comparison of the baseline receiver with the other two receiver designs is provided in Table 5 and FIG. 77.

TABLE 5

Comparison of Full-Scale Receiver Design Performance

|  | units | Design #1 (baseline) | Design #2 | Design #3 |
|---|---|---|---|---|
| Receiver incident power | MW | 264.3 | 276.9 | 287.9 |
| sCO2 heat duty | MW | 237.9 | 249.7 | 260.0 |
| Receiver reflection losses | MW | 13.21 | 13.85 | 14.40 |
| Receiver thermal losses | MW | 13.15 | 13.33 | 13.48 |
| Receiver efficiency | % | 90.01 | 90.18 | 90.34 |

Figure 77:
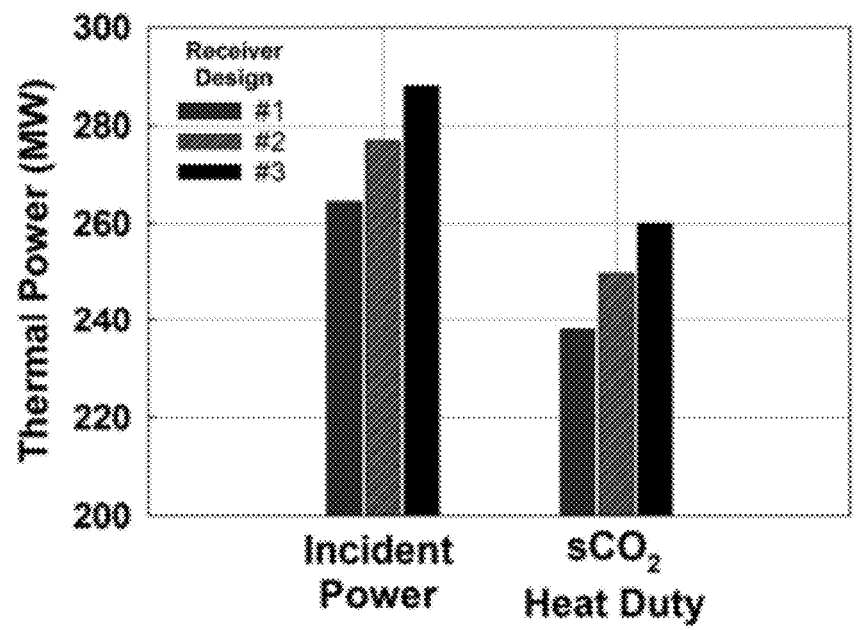
FIG. 77 illustrates thermal power (MW) for incident power for 3 different receiver designs and sCO2 heat duty for the 3 different receiver designs to compare incident energy and thermal energy transferred to sCO$_2$ for three central receiver designs considered.

As can be seen from Table 5 and FIG. 77, modifying the receiver to increase the north-facing surface area (higher local incident flux), an increase in absorbed thermal energy (5% and 9% more than baseline for design #2 and #3, respectively) at a higher efficiency can be achieved. Assuming that surface area is a proxy for receiver cost, this suggests that significant savings can be realized by applying the numbering-up concept to a modular receiver. The full receiver model introduced here also allows the effect of changes in geometry at various scales (from the micropin unit cell to the layout of the full receiver) on the global thermal performance to be understood. The model can be used as a first design tool to tailor the central receiver shape to different heliostat fields.

Examples 1 and 2 concern using microscale devices as the building blocks for a megawatt-scale open receiver for solar thermal power generation. A network-type model was used to account for the multimode effects of heat transfer in a single unit cell. A comparison with the experimental results of a 2 centimeter×2 centimeter unit cell showed agreement within experimental uncertainty. The unit cell model was then numbered up to simulate the performance of a multiple unit cell module and full-scale receiver. Numbering up multiple unit cells in parallel together to create an approximately 1 m² module allows for high thermal efficiency with reasonable pressure loss (<2% of operating pressure). A full module without the use of individual unit cells would have an unrealistic pressure drop in a commercial-scale device, which would be detrimental to system performance.

Three central receiver configurations have been investigated (multisided cylinder and two four-sided polygons), and the variation in the global and local thermal efficiency of each unit was explored. At the design non-uniform incident flux and surface emissivity, a global receiver thermal efficiency of ~90% can be achieved for all three designs. With an increase in northern-facing panels, while still keeping the total surface area constant, the absorbed solar thermal energy can be increased while also increasing the receiver efficiency, suggesting a reduction in cost per kW of electrical power produced. Overall, a receiver built with individual modules has shown the ability to be tailored to adapt to a non-uniform field flux to achieve consistent efficiency and sCO2 delivery temperature throughout the receiver.

Example 3

This example concerns a test article designed for operation at 720° C. with a thermal efficiency of 95% using molten salt as the heat transfer fluid. One example, without limitation, of a suitable molten salt is a NaCl—KCl—ZnCl$_2$ eutectic salt comprising, by mole fraction, 13.3% NaCl, 41.9% KCl, and 44.3% ZnCl$_2$.

The top plate for this example was about 400 microns thick, had an incident flux of 200 W cm$^{-2}$, a pin-fin diameter of 300 microns, and having the pin spacing variations shown in Table 6 below.

TABLE 6

Parameters for Molten Salt Embodiment

| Length (m) | Width (m) | Thickness (micron) | Heat Flux (W/cm²) | Diameter (micron) | Span (micron) | Depth/span ratio |
|---|---|---|---|---|---|---|
| 0.02-1.0 | 0.02-1.0 | 400 | 200 | 300 | 300-900 | 0.5-2.0 |

Figure 78:
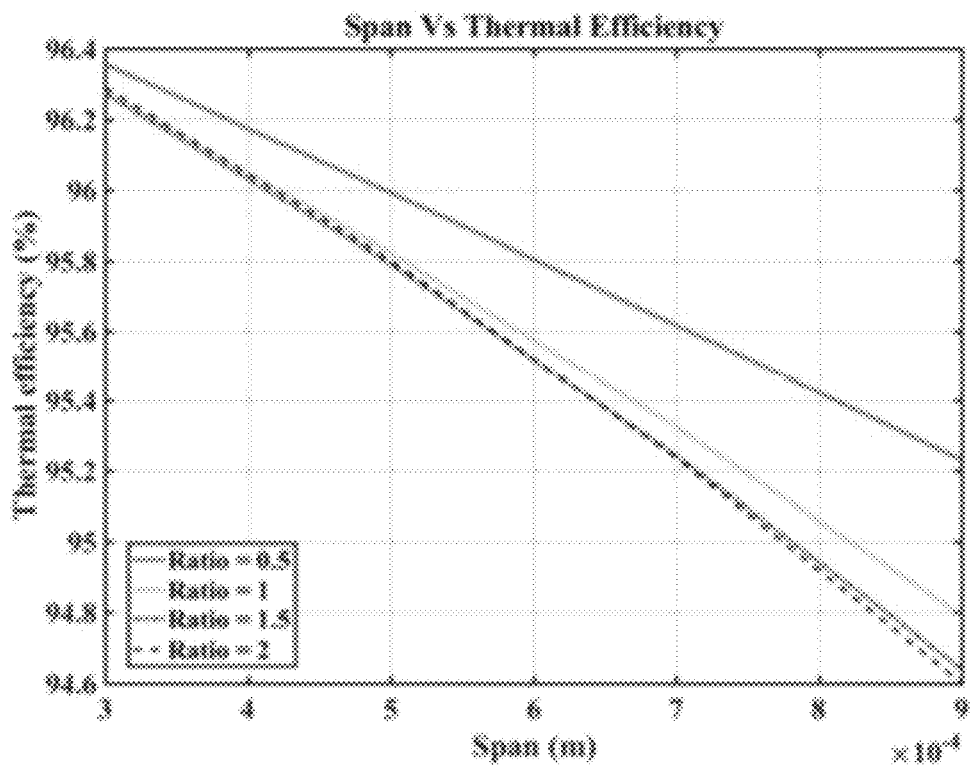
FIG. 78 is a plot of thermal efficiency (%) versus span (m) illustrating variation of thermal efficiency with span and depth-to-span ratio for 2 centimeter channel.
Figure 79:
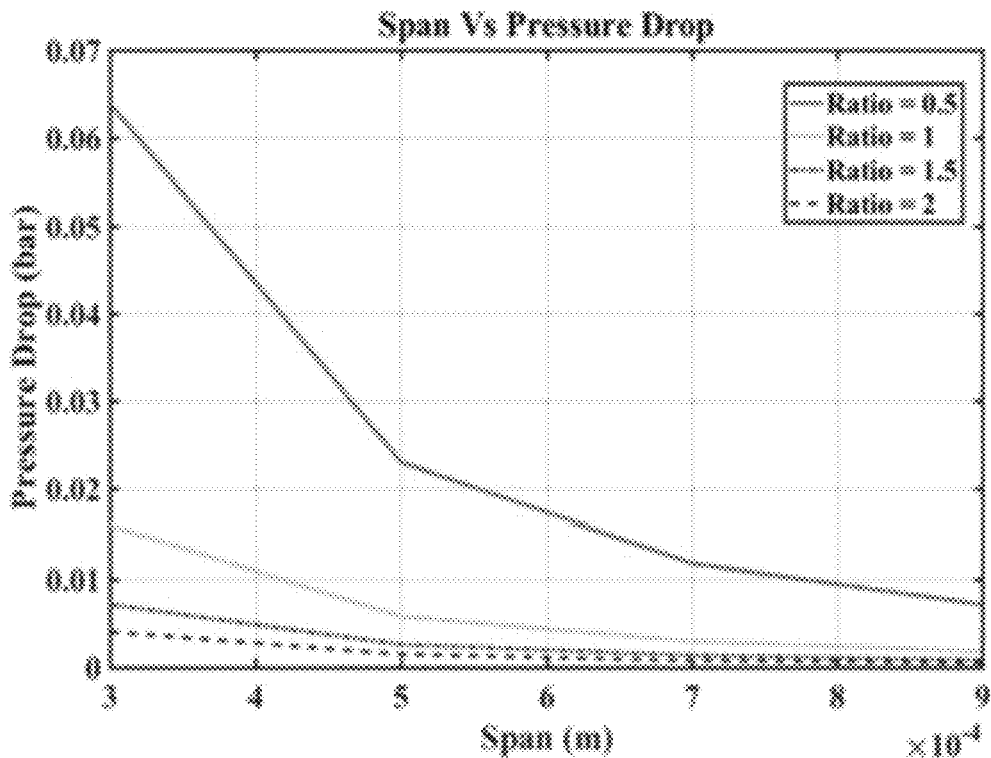
FIG. 79 is a plot of pressure drop (bar) versus span (meters) illustrating variation of pressure drop with span and depth to span ratio for 2 centimeter channel.
Figure 80:
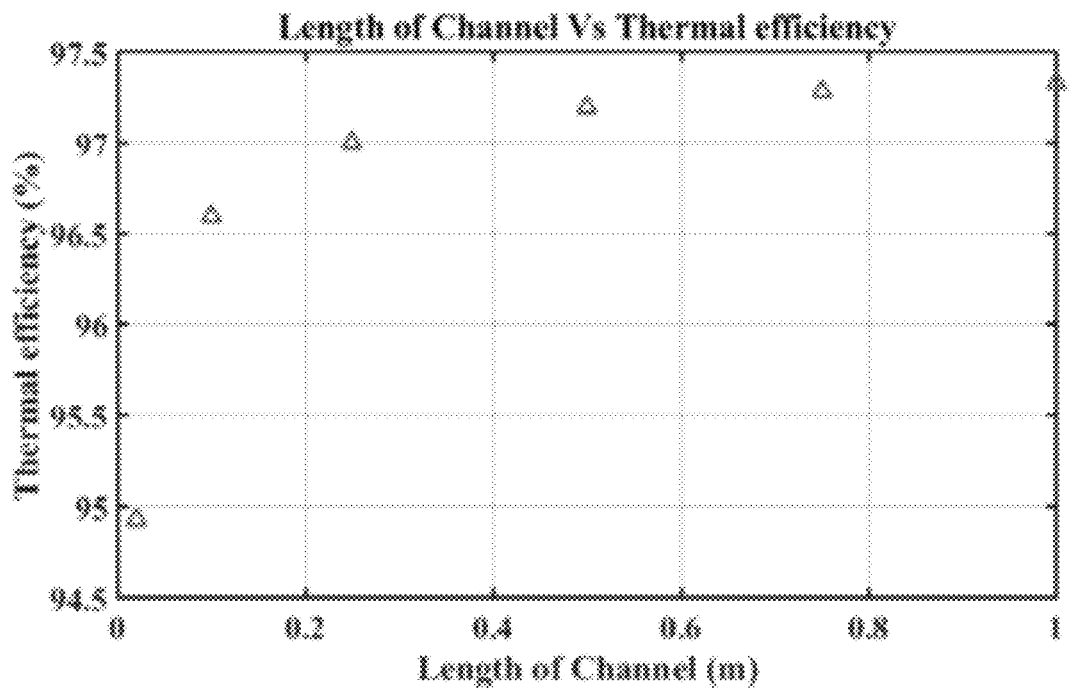
FIG. 80 is a plot of thermal efficiency (%) versus channel length (meters).
Figure 81:
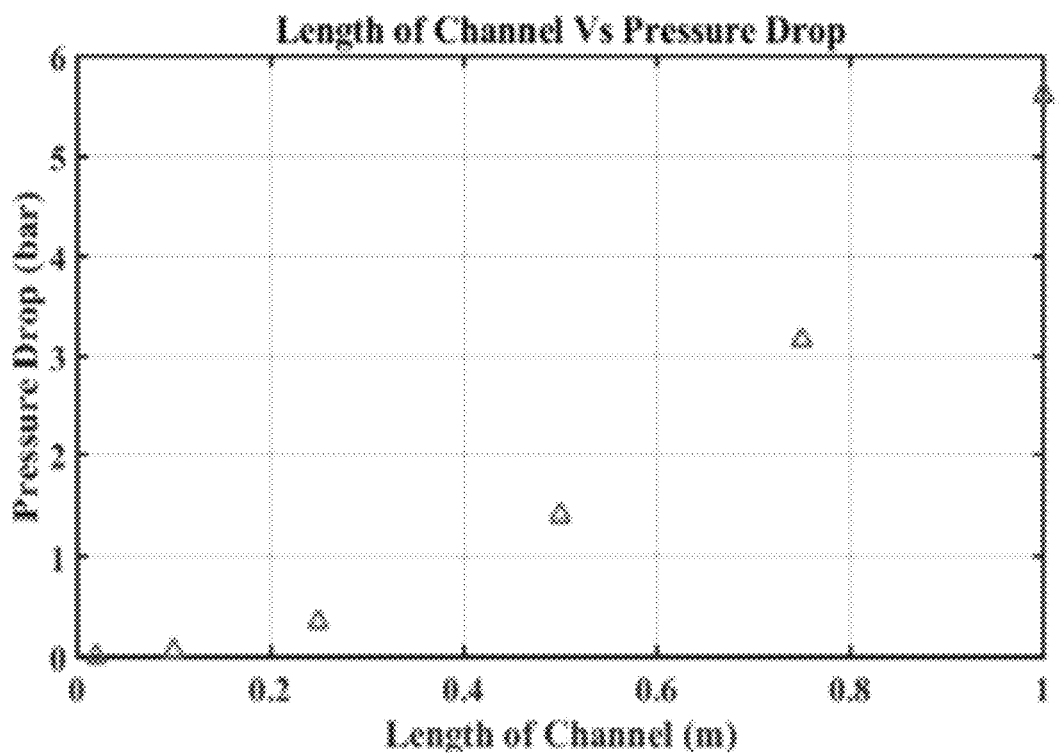
FIG. 81 is a plot of pressure drop (bar) versus channel length (meters).

The results of the parametric study are provided by FIGS. 78 and 79 for a circular staggered pin fin array with a 300-μm diameter, depth-to-span ratio of 1, length of channel of 2 centimeter with specific parameter values (Table 6) and a variety of span and depth-to-span ratios. As established by FIGS. 78 and 79, increasing the span decreases efficiency, whereas as span decreases, pressure drop in the channel increases. Based on these results, the span for this example was fixed at 800 μm and the depth-to-span ratio at 2. The length of the channel was then varied with incident heat flux, pin diameter and top plate thickness as in the previous case. As shown by FIGS. 80 and 81, increasing length increases pressure drop and efficiency.

Example 4

Figure 82:
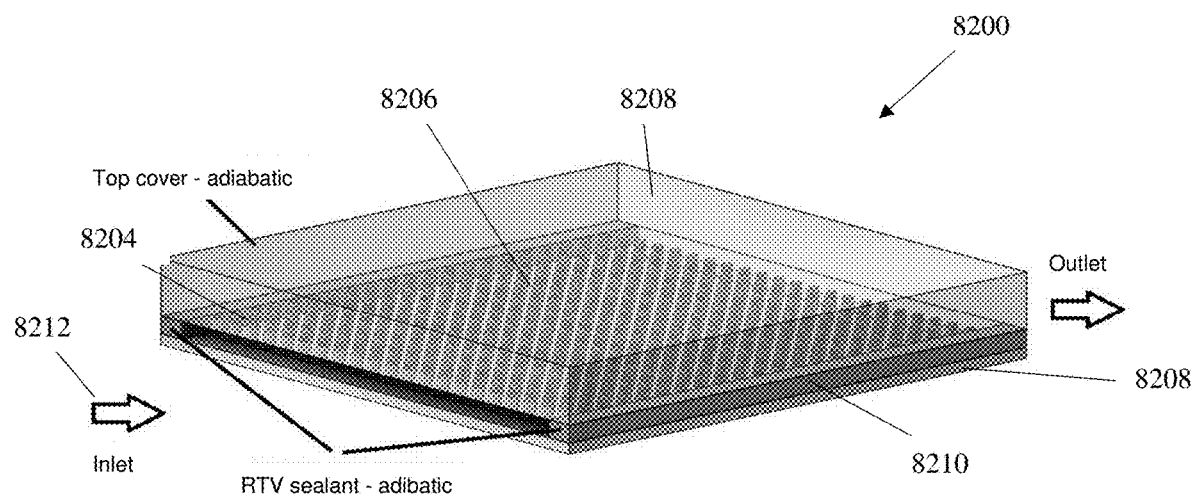
FIG. 82 is a schematic perspective drawing of a top cover for one embodiment of a solar receiver for Example 4.
Figure 83:
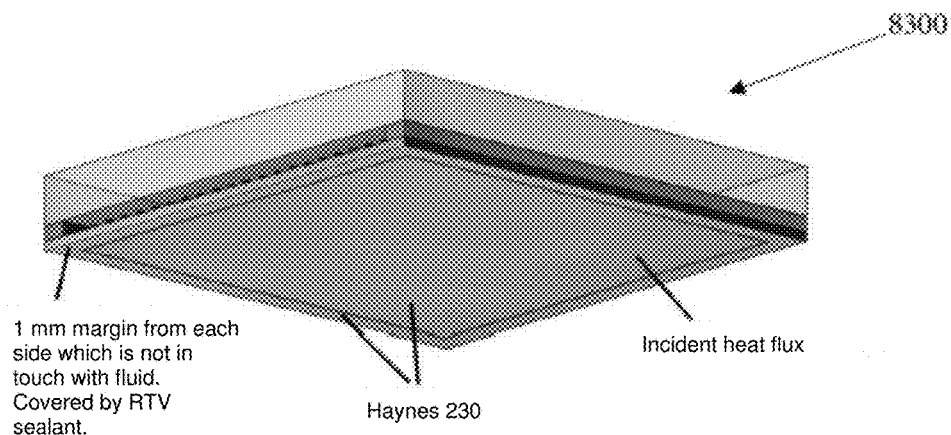
FIG. 83 is a schematic perspective drawing of a bottom plate for receiving incident heat flus for one embodiment of a solar receiver for Example 4.

This example concerns validation studies for heat transfer and (no heat flux) pressure drop. The selected design 8200 for this particular validation study is depicted in FIGS. 82 and 83, produced by EDM design, with a unit cell length of 18 millimeters, a diameter of 331 microns and a span of 269 microns. Design 8200 included a top plat 8202, a plate 8204 comprising plural micropins 8206 and a flux absorber plate 8208. An adiabatic sealant 8210 was positioned between plates. Fluid inlet flow is illustrated by fluid inlet arrow 8212. The fluid used for these studies was PF-5060. The incident heat flux plate thickness was 374 microns. The operating pressure was 107 kPa for heat transfer case and 109.36 kPa for pressure drop case.

Table 7 below compares the values from CFD simulations using Star-CCM+ software and experimental data obtained. Table 7 establishes that both CFD simulations and experimental data predict similar values and are in reasonable agreement for outlet temperature, average surface temperature, pressure drop and thermal efficiency for the case with incident heat flux. Pressure drop values for the cold case (no heat flux) are also predicted reasonably well.

TABLE 7

Validation study for Heat Transfer and Pressure Drop EDM Design

| Simulation goal | Mass flow rate (g/s) | Heat flux (W/m²) | Inlet temp. (C.) | Outlet temp. (C.) | Average surface temp. (C.) | Pressure drop (Pa) | Thermal efficiency (%) |
|---|---|---|---|---|---|---|---|
| Heat transfer validation (experimental) | 3.73 | 55379 | 20.74 | 25.33 | 33.40 | 5388 | 96.84 |
| Heat transfer validation (CFD) | 3.73 | 55379 | 20.74 | 25.32 | 32.25 | 5501 | 97.08 |
| Pressure drop validation (experimental) | 3.84 | — | 22.71 | 22.98 | 23.09 | 5768 | — |
| Pressure drop validation (CFD) | 3.84 | — | 22.71 | 22.71 | 22.71 | 5907 | — |

Example 5

This example concerns a computational model that was used to predict joint failure in a receiver under cyclic temperatures and mechanical loads experienced during operation. This information was then combined with thermal fluid flow models to design certain disclosed geometries of a microchannel receiver. Joint failure behavior was predicted using Finite Element Analysis (FEA) using a linear Manson-Coffin law approach. A linear Manson-Coffin relationship was used to characterize the failure of the joint along with the elastic-plastic properties obtained from the first cycle of the LCF test. This Manson Coffin relationship was obtained from the plastic strain and the number of cycles to failure at a given temperature from the LCF tests at different temperatures. Including the elastic-plastic properties of the joint material in the unit cell simulations ensured that the joint material and base material stays elastic in nature.

Force-Displacement data was used to calibrate FEA models to LCF data. The first cycle of LCF data for room temperature and 760° C. tests were compared to FEA models at respective temperatures. Calibration of the FEA model was done by adjusting the material properties of the bond layer while keeping base material properties constant. The yield strength of the bond layer in FEA was iteratively changed to see how well force-displacement data corresponded to LCF data. These results showed that the bond layer elasto-plastic properties were close to that of the base material. This does not mean that the fatigue failure properties of the joint are also the same as that of the base material. In fact, as shown by the Manson-Coffin law derived here (below) they are different.

Figure 84:
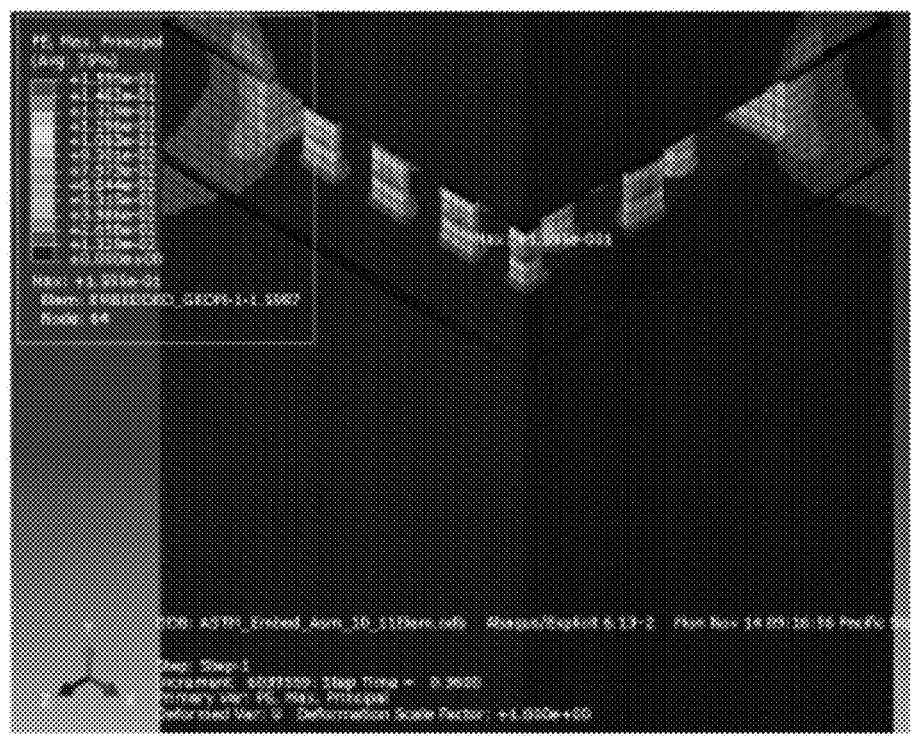
FIG. 84 provides information concerning maximum plastic strain of non-embedded and embedded tensile FEA models as discussed in Example 5.
Figure 85:
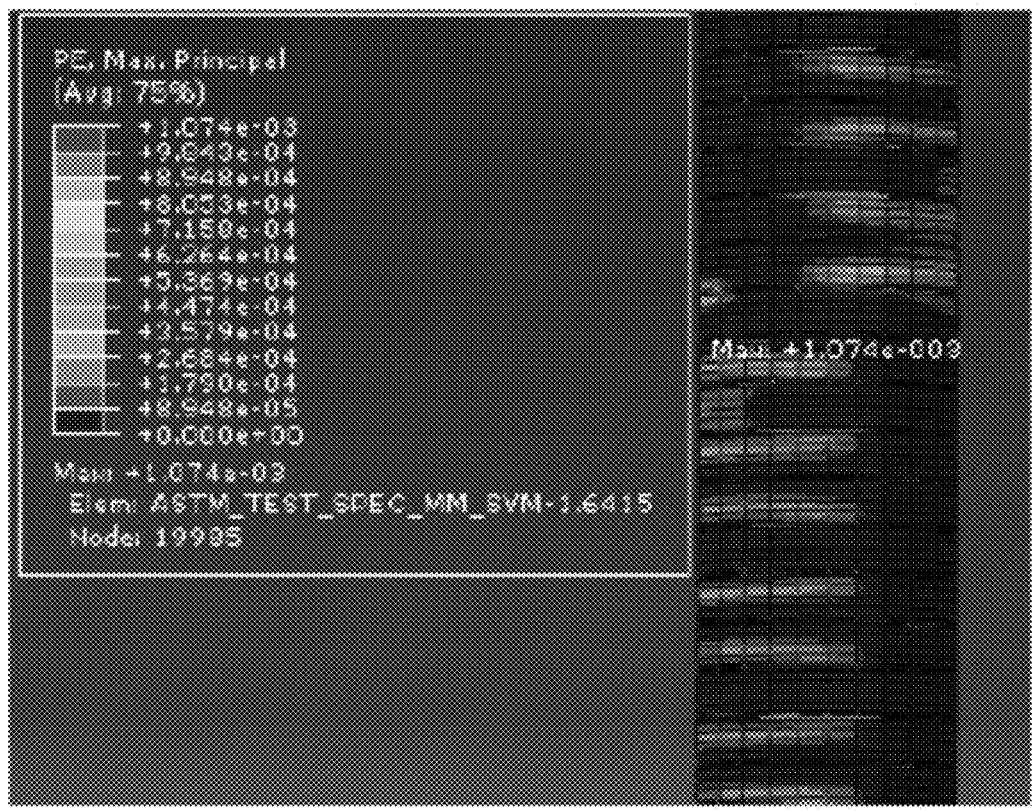
FIG. 85 provides information concerning maximum plastic strain of non-embedded and embedded tensile FEA models as discussed in Example 5.
Figure 86:
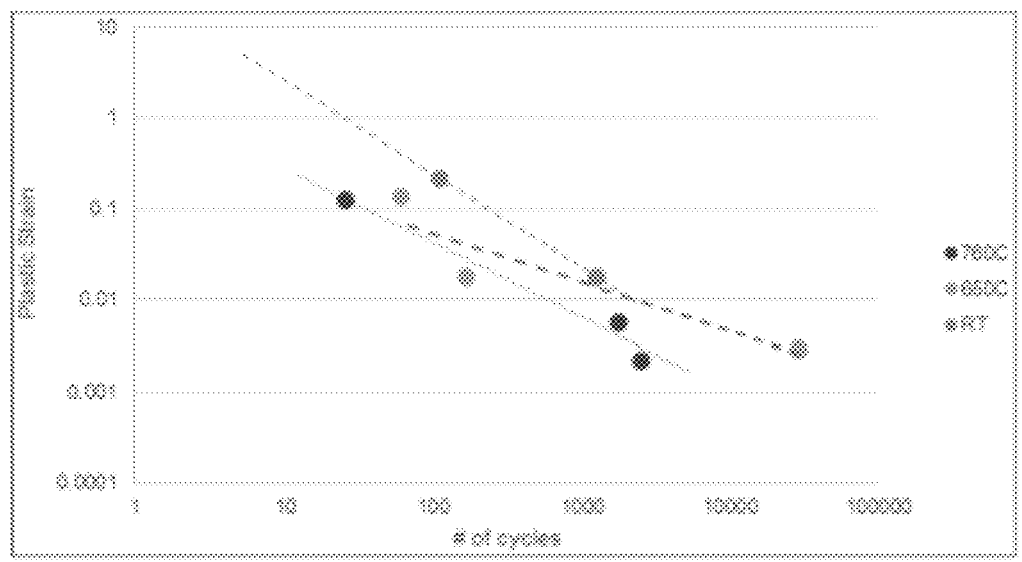
FIG. 86 provides the number of cycles to failure versus the respective maximum plastic strain to find the Manson-Coffin Relationship for failure of the joint at three different temperatures ranging from room temperature to 760° C. as discussed in Example 5.

To find the Manson-Coffin relation, data from LCF tests both with and without embedded microchannel geometry were used. The total strain range calculated in the LCF data was used with the gauge length to find the displacement range. The calculated displacement range was used to find the maximum plastic strain found at those points in FEA. Maximum plastic strain of non-embedded and embedded tensile FEA models are shown in FIGS. 84 and 85. The number of cycles to failure was plotted versus the respective maximum plastic strain to find the Manson-Coffin Relationship for failure of the joint at three different temperatures ranging from room temperature to 760° C. (FIG. 86). At the validation point for 760° C., the R2 value obtained was 0.97.

Additional data points can be used to validate or refine these Manson-Coffin law relationships. This will be performed via fatigue tests on non-embedded corroded test specimens. (In earlier testing corroded test specimens showed similar fatigue behavior as un-corroded samples.)

Example 6

Figure 87:
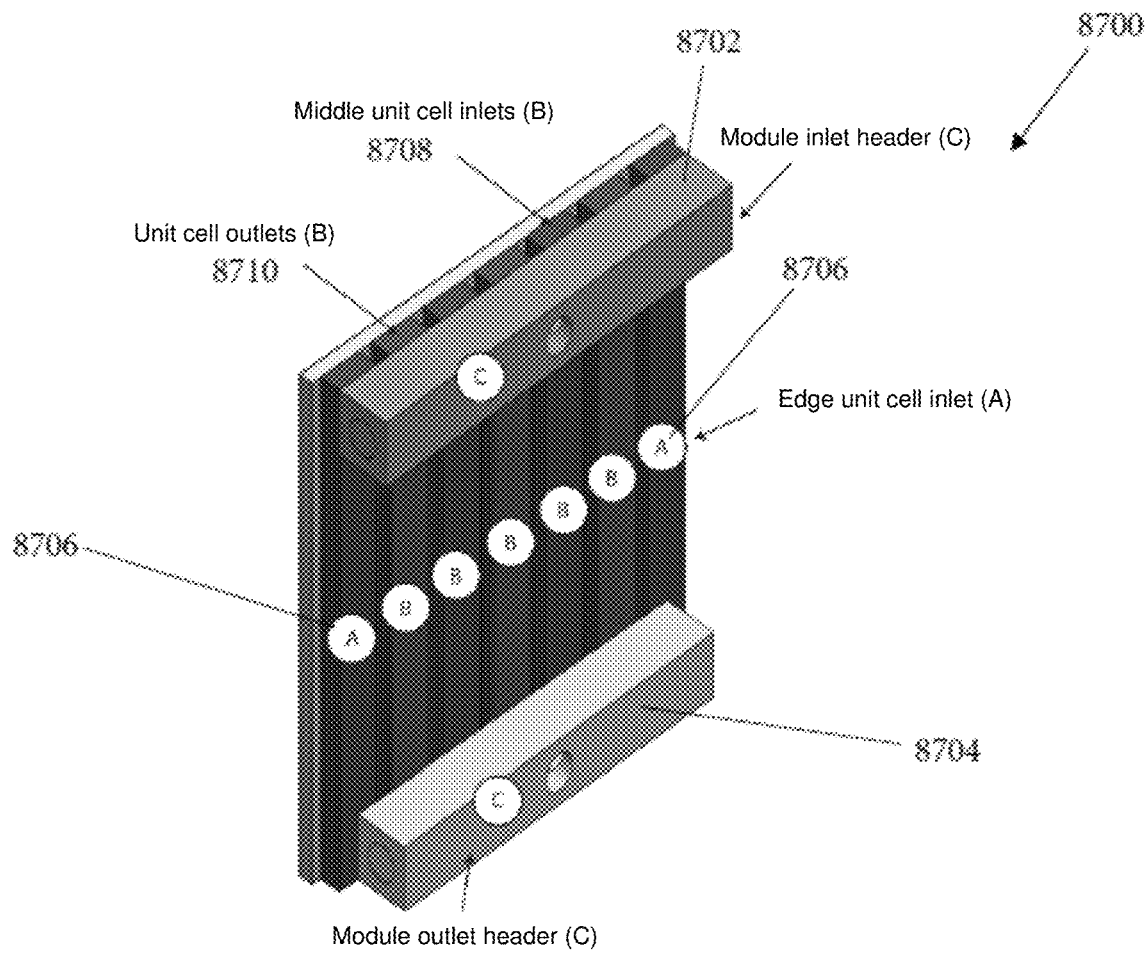
FIG. 87 is a schematic perspective drawing of module having edge unit cell headers, middle unit cell headers, and module level headers as discussed in Example 6.

This example concerns a module design comprising multiple unit cells in parallel using a 15×15 cm test article, as illustrated by FIG. 87. Test article 8700 included plural unit cells, a module inlet header 8702, a module outlet header 8704, edge unit cell inlets 8706, middle cell inlets 8708 and unit cell outlets 8710. $sCO_2$ was used as a working fluid. The dimensions of this design, shown in Table 8 below, were set using a pressure drop network model.

TABLE 8

Final Inner Diameter (In Mm) Of Unit Cell and Module Headers Showing Comparison of $sCO_2$ and Compressed Air Designs

|  | Edge Unit Cell Header (A) | Middle Unit Cell Inlet Header (B) | Middle Unit Cell Outlet Header (B) | Module Inlet/Outlet Header (C) |
|---|---|---|---|---|
| $sCO_2$ | 5.75 mm | 6.25 mm | 6.25 mm | 12.7 mm |
| Air | 8.13 mm | 8.90 mm | 8.13 mm | 12.7 mm |
| Δ | −2.38 mm | −2.65 mm | −1.88 mm | 0 |

The test conditions were supercritical carbon dioxide at 200 bar with inlet and outlet temperatures of 550° C. and 720° C., respectively. The design flow rate for 80 W cm² is 84.3 g s$^{-1}$ with a maximum maldistribution in flow of 5%. This condition is the worst case scenario (lowest flow rate) to ensure proper flow distribution for all cases.

The unit cell headers (shown in FIG. 87) are manufactured from machined Haynes 230. The unit cell headers are brazed to the backside of the micro-pin plate, as shown. An FEA analysis of the brazed joint presented in the previous quarterly report verified that the minimum header thickness of 5 mm was sufficient to handle the design pressure. In an ongoing effort, 5 centimeter test articles are being fabricated to undergo pressure testing to evaluate different aspects of the fabrication process. Several of these articles will include headers brazed using the same approach that will be used in the subscale design and pressure tested to verify the FEA models and brazing process.

To conduct these tests, ASME hydrostatic pressure testing standard was investigated in preparing for pressure testing of the 5 centimeter test articles. According to ASME Section VIII Div. 1, article UG-99(b) requires the minimum test pressure of pressure vessels to be 1.3 times the maximum allowable working pressure (MAWP) or design pressure multiplied by the lowest stress ratio (LSR) of the materials. The LSR is the allowable stress at test temperature (room temperature) divided by the allowable stress at design temperature (720° C.). Thus, the minimum hydrostatic test pressure for Haynes 230 test articles is:

$P=1.3\times220$ (bars)$\times(207$ (MPa)/65 (MPa))=910 bars=13,390 psig

A potential manual hydraulic pump capable of reaching 15,000 psi was identified for use in the pressure testing part of this task.

The main inlet and outlet headers (shown in FIG. 87) that will supply flow to the unit cell headers will be manufactured from square bar stock of Haynes 230. The circular flow paths will be drilled from one end to another and then capped. To ensure that a straight flow path can be machined in the ~15-cm long header, a small stock of Haynes 230 was drilled using representative fixturing as a test sample. The final manufacturing process required in the headers is tungsten inert gas (TIG) welding of tube stubs to the main inlet/outlet header of each module.

Example 7

This example concerns fatigue testing of un-patterned, corroded, TLP-bonded LCF test specimens to at least 12,000 cycles. The primary objective of this task was to experimentally determine the fatigue life of as-heat-treated test articles exposed to an sCO2 environment for 1,000 hours at 760° C. Subsequently, the samples were exposed in an sCO2 autoclave at 720° C., 250 bar, conditions close to those expected in an MSR, for 1,000 hours.

For fatigue testing, the test temperature was 760° C. The strain range of 0.145% was determined based on the representative MSR conditions. This particular strain range is more than 50% of the strain experienced by the MSR geometry.

Table 9 summarizes the fatigue testing results of un-patterned corroded samples and shows that all 4 samples at a minimum sustained the 12,000-cycle milestone.

TABLE 9

Fatigue Test Results for Un-patterned Corroded Samples

| Sample # | Strain Range (%) | Strain Ratio (R) | Test Temperature (° C.) | # of cycles |
|---|---|---|---|---|
| R3 | 0.145 | 0.033 | 760 | 12,000 |
| R4 | 0.145 | 0.033 | 760 | 28,800 |
| S3 | 0.145 | 0.033 | 760 | 12,000 |
| S4 | 0.145 | 0.033 | 760 | 22,847* |

*Fractured

The 12,000-cycle milestone is based on the 30-year lifetime of a typical MSR. Samples R3 and S3 were stopped as soon as the milestone was met at 12,000 cycles. Sample R4 was continued out to 28,800 cycles, specifically to demonstrate that these corroded samples can attain the same number of cycles as un-corroded, un-patterned sample under similar conditions. This comparison demonstrates that the mechanical properties of the bond do not change substantially after exposure to sCO2 for 1,000 hours. Sample S4 was the only one to fracture at approximately 23,000 cycles, which is the equivalent of a 57-year lifetime.

Test specimens with internal geometry mimicking the bond joint in the MSR were also tested, and test articles were used to collect the data presented in Table 10 for validation of computational models.

TABLE 10

Fatigue Test Results for Patterned Corroded Samples

| Sample # | Strain Range (%) | Test Temperature (° C.) | # of cycles to failure |
|---|---|---|---|
| T2 | 0.040 | 760 | 2503 |
| T3 | 0.600 | Room | 109 |
| T4 | 0.400 | 650 | 60 |
| T5 | 0.043 | 650 | 28800* |
| T6 | 0.471 | 760 | 25 |

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A microscale thermal receiver unit cell, comprising: a flux absorber plate for receiving impinging thermal flux; a receiver plate positioned adjacent to the flux absorber plate, the receiver plate comprising a pin array, microchannels, or both a pin array and microchannels, the pin array comprising plural pins, each pin having a diameter, a height, and defining a span between two adjacent pins; and
a header plate having distributor channels to distribute a heat transfer working fluid uniformly to the pin array and/or microchannels of the receiver plate without recombining working fluid flows on the receiver plate, wherein the working fluid flows adjacent the flux absorber plate to transfer heat from the flux absorber plate.

2. The receiver unit cell according to claim 1 where the thermal flux is a solar flux.

3. The receiver unit cell according to claim 2 comprising a heat transfer working fluid selected from a molten salt, a supercritical fluid or a molten metal.

4. The receiver unit cell according to claim 3 where the molten salt is selected from metal halides, metal nitrates, and combinations thereof.

5. The receiver unit cell according to claim 4 wherein the molten salt comprises potassium nitrate, sodium nitrate, lithium nitrate, calcium nitrate, sodium chloride, potassium chloride, zinc chloride, and combinations thereof.

6. The receiver unit cell according to claim 3 configured for use with a molten salt working fluid and having a unit cell length of from about 1 centimeter to about 50 centimeters.

7. The receiver unit cell according to claim 3 configured for use with supercritical carbon dioxide and having a unit cell length of from about 0.01 centimeter to about 16 centimeters.

8. The receiver unit cell according to claim 2 having a heat flux of from about 100 to about 400 W/cm².

9. The receiver unit cell according to claim 2 configured for use with supercritical carbon dioxide and having a heat flux of from about 100 W/cm² to about 130 W/cm².

10. The receiver unit cell according to claim 2 configured for use with a molten salt and having a heat flux of from about 200 W/cm² to about 400 W/cm².

11. The receiver unit cell according to claim 2 wherein the flux absorber plate comprises from 1 to 50 optical coating layers.

12. A solar receiver, comprising plural modules comprising the receiver unit cell according to claim 11.

13. The receiver according to claim 12 comprising 2 to 1,000 modules.

14. The solar receiver according to claim 12, having a receiver surface area tuned to a solar flux profile of a specific heliostat field.

15. The receiver unit cell according to claim 2 having an efficiency of greater than 95%.

16. The microscale solar receiver unit cell according to claim 2 configured as an sCO₂ or molten salt receiver and defining a unit cell length of from about 1 centimeter to about 10 centimeters and having an efficiency of 95% or greater, the receiver unit cell comprising:
a solar flux absorber plate comprising from 1 to 50 layers of an optical coating on at least a portion of the solar flux absorber plate;
the receiver plate being positioned adjacent to the solar flux absorber plate and comprising a pin array comprising plural pins, each pin having a pin diameter of from about 100 μm to about 1100 μm, a pin height of from 20 μm to about 600 μm, and defining a span between two adjacent pins of from about 100 μm to about 400 μm, the pin array receiving an inlet flow of the heat transfer working fluid that flows adjacent the flux absorber plate for heat transfer, the working fluid flowing out of the receiver though a receiver outlet;
a fluid flow plenum to receive inlet fluid flow and direct fluid flow to the pin array;
a top cover plate; and
wherein components of the receiver are fabricated as a unitary device from a material selected from Inconel 740H, 800H, 800HT, 750, 751, 718, Haynes 214, Haynes 230, Haynes 25, Haynes R41, Wasapaloy, 282, alloy 617, 316 stainless steel, and combinations thereof.

17. A module, comprising plural unit receiver cells according to claim 2 arranged in parallel.

18. The receiver unit cell according claim 1 further comprising a top cover plate and fluid distribution headers to distribute working fluid between plates and to the microchannels or pin array, and wherein the plates are bonded together by brazing, diffusion bonding, or a combination thereof, to form a unitary device.

19. The receiver unit cell according to claim 1 wherein the fabrication material is selected from Inconel 740H, 800H, 800HT, 750, 751, 718, Haynes 214, Haynes 230, Haynes 25, Haynes R41, Wasapaloy, 282, alloy 617, 316 stainless steel, and combinations thereof.

20. The receiver unit cell according to claim 1 wherein the pins have a pin diameter of from about 100 to about 1100 μm, and a pin height of from 50 to about 1200 μm.

21. The receiver unit cell according to claim 1 wherein the device is:
configured for use with a supercritical carbon dioxide working fluid and has a pin height of from 200 μm to 600 μm; or
configured for use with a molten salt working fluid and having a pin height of from 50 to 1200 μm.

22. The receiver unit cell according to claim 1, wherein:
the inlet working fluid is selected from a molten salt or a supercritical fluid; and
the flux absorber plate is configured to receive impinging solar flux for heat transfer of solar energy to the working fluid flowing through the receiver plate.

23. The receiver unit cell according to claim 1, further comprising:
a top plate having a fluid inlet port to receive the heat transfer working fluid and to flow the heat transfer working fluid to a top plate flow distributor to bifurcate the fluid into two fluid streams, and a working fluid outlet port;
a flow distribution plate that receives inlet flow from the two fluid streams from the top plate flow distributer and flows the two fluid streams to distributer headers located on opposite sides of the flow distribution plate;
wherein the receiver plate receives fluid flow from the distributer headers to flow the working fluid through the pin array and/or microchannels to a centrally located exit conduit; and
wherein the flux absorber plate is positioned adjacent the flow distribution plate, the flux absorber plate receiving impinging solar flux for heat transfer of solar energy to the fluid flowing through the receiver plate.

24. A method for making the receiver unit cell according to claim 1, comprising:
forming a flux absorber plate for receiving impinging thermal flux;
forming a receiver plate configured to receive a flow of heat transfer working fluid, the receiver plate comprising a pin array or microchannels, the pin array comprising plural pins, each pin having a diameter, a height, and defining a span between two adjacent pins;
positioning the receiver plate in operative association with the flux absorber plate; and
bonding the flux absorber plate and the receiver plate together to form a unitary device.

25. A microscale thermal receiver unit cell, comprising:
a flux absorber plate for receiving impinging thermal flux;
a receiver plate positioned adjacent to the flux absorber plate, the receiver plate comprising a pin array, wherein the pins have a pin span of from about 100 μm to about 1200 μm; and
a header plate having distributor channels to distribute a heat transfer working fluid to the pin array of the receiver plate, wherein the working fluid flows adjacent the flux absorber plate to transfer heat from the flux absorber plate to the working fluid.

26. The receiver unit cell according to claim 25 wherein the device is:
configured for use with a supercritical carbon dioxide working fluid and has a pin span of from about 100 μm to about 400 μm; or
configured for use with a molten salt working fluid and has a pin span of from about 100 μm to about 1200 μm.

27. The receiver unit cell according to claim 25 wherein the pins have a pin diameter and span, and the diameter and span define a desired diameter-span ratio.

28. The receiver unit cell according to claim 25 wherein the pins have a cross-sectional shape selected from circular, triangular, square, rectangular, parallelogram, or combinations thereof, and the pins define a pin density that is constant throughout a pin array, varies across the pin array, or defines a selected density gradient through the pin array.

* * * * *